US012750780B2

(12) United States Patent
Reial et al.

(10) Patent No.: US 12,750,780 B2
(45) Date of Patent: Sep. 29, 2026

(54) SSB-ALIGNED TRANSMISSION OF PAGING-RELATED SIGNALS

(71) Applicant: Telefonaktiebolaget LM Ericsson (publ), Stockholm (SE)

(72) Inventors: Andres Reial, Lomma (SE); Sina Maleki, Malmö (SE); Ajit Nimbalker, Fremont, CA (US); Niklas Andgart, Södra Sandby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 656 days.

(21) Appl. No.: 18/040,019

(22) PCT Filed: Jul. 30, 2021

(86) PCT No.: PCT/EP2021/071448
§ 371 (c)(1),
(2) Date: Jan. 31, 2023

(87) PCT Pub. No.: WO2022/029039
PCT Pub. Date: Feb. 10, 2022

(65) Prior Publication Data
US 2023/0276362 A1 Aug. 31, 2023

Related U.S. Application Data

(60) Provisional application No. 63/061,881, filed on Aug. 6, 2020, provisional application No. 63/061,238, filed on Aug. 5, 2020.

(51) Int. Cl.

| | |
|---|---|
| ***H04W 52/02*** | (2009.01) |
| ***H04W 56/00*** | (2009.01) |
| *H04W 68/02* | (2009.01) |

(52) U.S. Cl.
CPC ... *H04W 52/0235* (2013.01); *H04W 56/0015* (2013.01); *H04W 68/02* (2013.01)

(58) Field of Classification Search
CPC ......... H04W 52/0235; H04W 52/0229; H04W 52/0216; H04W 56/0015; H04W 68/02; H04W 68/025; Y02D 30/70
See application file for complete search history.

(56) References Cited

U.S. PATENT DOCUMENTS

| | | | | |
|---|---|---|---|---|
| 10,356,752 | B1 * | 7/2019 | Menon .............. | H04W 52/0225 |
| 2009/0245230 | A1 * | 10/2009 | Sampath ........... | H04W 52/0274 455/458 |

(Continued)

FOREIGN PATENT DOCUMENTS

| | | | | |
|---|---|---|---|---|
| CN | 1792071 A | * | 6/2006 | ......... H04L 27/0014 |
| CN | 104717725 A | * | 6/2015 | |

(Continued)

OTHER PUBLICATIONS

International Search Report and Written Opinion dated Jan. 21, 2022 for International Application No. PCT/EP2021/078736 filed on Oct. 18, 2021, consisting 10 pages.

(Continued)

*Primary Examiner* — Sujoy K Kundu
*Assistant Examiner* — Vladislav Y Agureyev
(74) *Attorney, Agent, or Firm* — Weisberg I.P. Law, P.A.

(57) ABSTRACT

A method, in a network node configured to communicate wirelessly with wireless devices, includes transmitting a synchronization signal block, SSB, having one or more synchronization signals and transmitting a wake-up signal, WUS, the WUS indicating whether a wireless device or group of wireless devices should monitor a physical channel during at least one paging opportunity associated with the WUS transmission. Transmitting the WUS includes trans- (Continued)

mitting the WUS in conjunction with the SSB. The WUS may be a tracking reference signal, TRS, for example.

10 Claims, 22 Drawing Sheets

(56) References Cited

U.S. PATENT DOCUMENTS

| | | | | |
|---|---|---|---|---|
| 2012/0122495 | A1 | 5/2012 | Weng et al. | |
| 2016/0270015 | A1* | 9/2016 | Lin | H04W 56/0015 |
| 2019/0020433 | A1* | 1/2019 | Pitigoi-Aron | H04W 56/001 |
| 2019/0159165 | A1* | 5/2019 | Agiwal | H04B 7/088 |
| 2019/0191373 | A1* | 6/2019 | Mudulodu | H04W 40/244 |
| 2020/0053670 | A1* | 2/2020 | Jung | H04W 56/0015 |
| 2020/0092814 | A1* | 3/2020 | Zhou | H04W 52/0235 |
| 2020/0092846 | A1* | 3/2020 | Deng | H04W 68/025 |
| 2020/0146095 | A1* | 5/2020 | Hsieh | H04W 76/28 |
| 2021/0044394 | A1* | 2/2021 | Beale | H04W 72/121 |
| 2021/0105722 | A1* | 4/2021 | Tsai | H04W 52/0235 |
| 2021/0105739 | A1* | 4/2021 | Lin | H04L 5/005 |
| 2021/0153120 | A1* | 5/2021 | Atungsiri | H04L 27/2655 |
| 2021/0176029 | A1* | 6/2021 | Tsai | H04B 7/0626 |
| 2021/0314866 | A1* | 10/2021 | Lee | H04W 52/0229 |
| 2021/0321413 | A1* | 10/2021 | Shin | H04W 72/23 |
| 2021/0329611 | A1* | 10/2021 | Karjalainen | H04W 48/12 |
| 2022/0039012 | A1* | 2/2022 | Kwon | H04W 68/005 |
| 2022/0070780 | A1* | 3/2022 | Tie | H04W 56/0015 |
| 2022/0116876 | A1* | 4/2022 | Sun | H04L 1/203 |
| 2022/0167270 | A1* | 5/2022 | Ye | H04W 68/02 |
| 2022/0191733 | A1* | 6/2022 | Ali | H04L 41/0806 |
| 2022/0217636 | A1* | 7/2022 | Shrivastava | H04W 72/23 |
| 2022/0232476 | A1* | 7/2022 | Reial | H04W 24/10 |
| 2022/0279445 | A1* | 9/2022 | Shrivastava | H04W 52/0254 |
| 2022/0286964 | A1* | 9/2022 | Peng | H04W 52/0219 |
| 2022/0303897 | A1* | 9/2022 | Xu | H04W 76/28 |
| 2022/0303941 | A1* | 9/2022 | Xu | H04W 52/0229 |
| 2022/0312327 | A1* | 9/2022 | Xu | H04W 52/0274 |
| 2022/0338121 | A1* | 10/2022 | Fei | H04W 52/0216 |
| 2022/0346014 | A1* | 10/2022 | Fei | H04L 5/0051 |
| 2022/0346017 | A1* | 10/2022 | Frederiksen | H04L 5/0098 |
| 2022/0369284 | A1* | 11/2022 | Gonzalez | H04W 68/025 |
| 2023/0145663 | A1* | 5/2023 | Kwon | H04L 5/0057<br>370/318 |
| 2023/0389125 | A1* | 11/2023 | Islam | H04W 72/23 |

FOREIGN PATENT DOCUMENTS

| | | | | |
|---|---|---|---|---|
| CN | 110463285 | A * | 11/2019 | H04W 68/02 |
| EP | 3771257 | A1 | 1/2021 | |
| EP | 3833114 | A1 | 6/2021 | |
| EP | 3836634 | B1 * | 10/2023 | H04W 72/23 |
| EP | 3834502 | B1 * | 7/2024 | H04W 72/23 |
| WO | 2018175760 | A1 | 9/2018 | |
| WO | WO-2018175442 | A1 * | 9/2018 | H04W 68/025 |
| WO | 2019063479 | A1 | 4/2019 | |
| WO | 2019190205 | A1 | 10/2019 | |
| WO | 2020020050 | A1 | 1/2020 | |
| WO | 2020025061 | A1 | 2/2020 | |
| WO | 2020060696 | A1 | 3/2020 | |
| WO | 2020145869 | A1 | 7/2020 | |
| WO | 2020204804 | A1 | 10/2020 | |
| WO | WO-2020060890 | A9 * | 2/2021 | H04W 72/535 |

OTHER PUBLICATIONS

3GPP TSG RAN WG1 #97 R1-1906980; Title: PDCCH-based power saving signal/channel; Source: Samsung; Agenda Item: 7.2.9.1; Document for: Discussion and Decision; Location and Date: Reno, USA, May 13-17, 2019, consisting of 12 pages.

International Search Report and Written Opinion dated May 28, 2021 for International Application No. PCT/SE2021/050120 filed Feb. 12, 2021; consisting of 14 pages.

3GPP TSG RAN WG1 Meeting #95 R1-1812422; Title: Considerations on triggering for UE power saving; Source: ZTE; Agenda item: 7.2.9.2.2; Document for: Discussion/Decision; Date and Location: Nov. 12-16, 2018, Spokane, USA; consisting of 7 pages.

3GPP TSG-RAN WG1 Meeting #95 R1-1813448; Title: Triggering Adaption of UE Power Consumption Characteristics; Agenda item: 7.2.9.2.2; Source: Qualcomm Incorporated; Document for: Discussion/Decision; Date and Location: Nov. 12-16, 2018, Spokane, Washington, USA; consisting of 17 pages.

3GPP TSG-RAN WG1 #97 R1-1907294; Title: PDCCH-based power saving channel design; Agenda item: 7.2.9.1; Source: Qualcomm Incorporated; Document for: Discussion/Decision; Date and Location: May 13-17, 2019, Reno, USA; consisting of 16 pages.

3GPP TSG RAN WG1 meeting #97 R1-1907375; Title: PDCCH-based power saving signal/channel; Agenda item: 7.2.9.1; Source: Nokia, Nokia Shanghai Bell; Document for: Discussion and Decision; Date and Location: May 13-17, 2019; consisting of 8 pages.

3GPP TSG RAN meeting #83 RP-190336; Status Report to TSG; WI / SI Name: Additional enhancements for NB-IoT; Source: Huawei; Agenda Item: 10.3.2; Location and Date: Shenzhen, China, Mar. 18-21, 2019, consisting of 14 pages.

3GPP TSG RAN WG1 Meeting #94 R1-180XXXX; Title: NRS on non-anchor carrier in NB-IoT; Source: MediaTek Inc.; Agenda Item: 6.2.2.6; Document for: Discussion and Decision; Location and Date: Gothenburg, Sweden, Aug. 20-24, 2018, consisting of 4 pages.

International Search Report and Written Opinion dated Dec. 8, 2021 for International Application No. PCT/EP2021/073286 filed on Aug. 23, 2021, consisting of 16 pages.

3GPP TSG RAN WG1 Meeting #103-e R1-2008361; Title: Enhancements on HARQ for NTN; Source: Sony; Agenda Item: 8.4.3; Document for: Discussion; Location and Date: E-meeting, Oct. 26-Nov. 13, 2020, consisting of 6 pages.

3GPP TSG RAN WG1 #102 R1-2006157 (downloaded as R1-2006159); Title: on potential paging enhancements; Source: Samsung; Agenda Item: 8.7.1.1; Document for: Discussion and decision; Location and Date: e-Meeting, Aug.17-Jun. 28, 2020, consisting of 10 pages.

3GPP TSG-RAN2 Meeting #111-e R2-2007260; Title: Paging enhancement to reduce unnecessary UE paging receptions; Source: Ericsson; Agenda Item: 8.9.2 Idle/Inactive-mode UE power saving; Document for: Discussion and Decision; Location and Date; eMeeting, Aug. 17-28, 2020, consisting of 5 pages.

3GPP TSG RAN WG1 #103-e Tdoc R1-2009200; Title: Discussion on potential paging enhancements for UE power savings; Source: Ericsson; Agenda Item: 8.7.1.1; Document for: Discussion and Decision; Location and Date: e-Meeting, Oct 26-Nov. 13, 2020, consisting of 11 pages.

3GPP TSG RAN WG1 #106-e R1-2107998; Title: Design of Paging Enhancements; Source: Ericsson; Agenda Item: 8.7.1.1; Document for: Discussion and Decision; Location and Date: e-Meeting, Aug. 16-27, 2021, consisting of 16 pages.

EPO Communication and Supplementary Search Report dated Jun. 16, 2023 for Patent Application No. 21754032.7, consisting of 12 pages.

International Search Report and Written Opinion dated Jan. 11, 2022 for International Application No. PCT/EP2021/071448 filed Jul. 30, 2021, consisting of 18-pages.

3GPP TSG RAN WG1 #96 R1-1902342; Title: Consideration on resource of power saving signal for paging monitoring; Agenda Item: 7.2.9.4; Source: CMCC; Document for: Discussion & Decision; Date and Location: Feb. 25-Mar. 1, 2019, Athens, Greece, consisting of 4-pages.

* cited by examiner

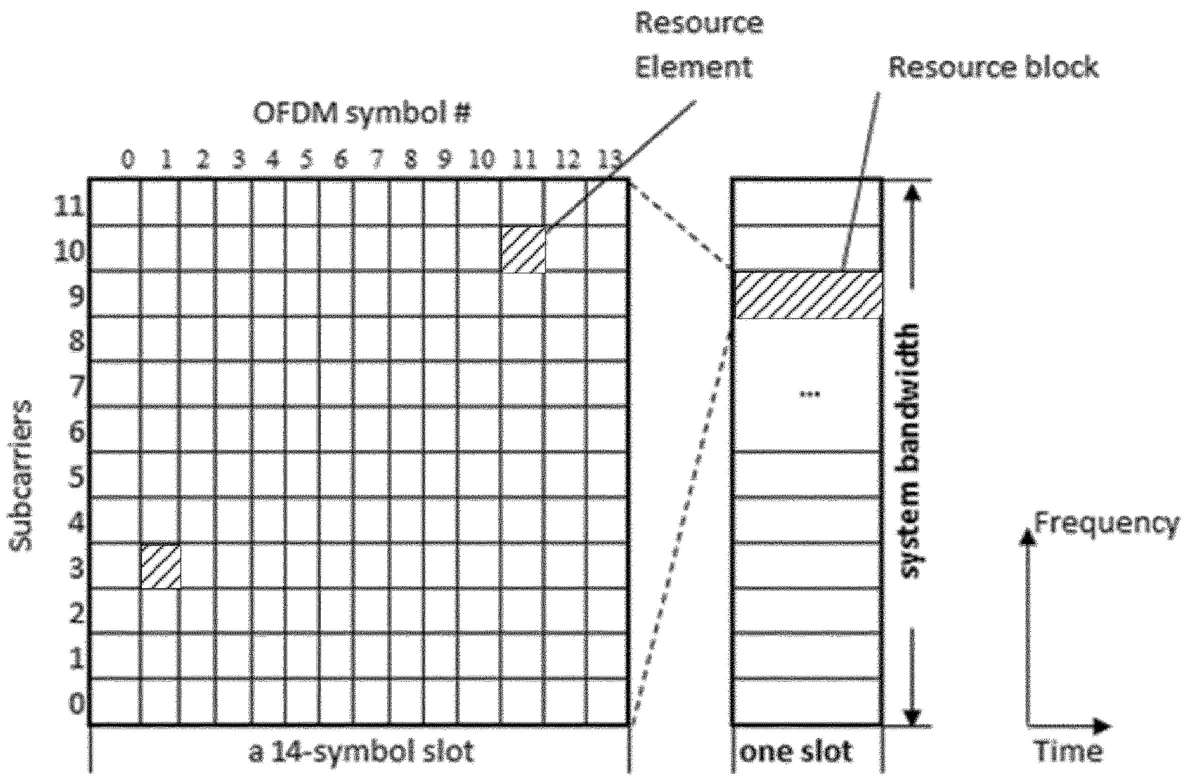
*FIG. 14*
*FIG. 15A*
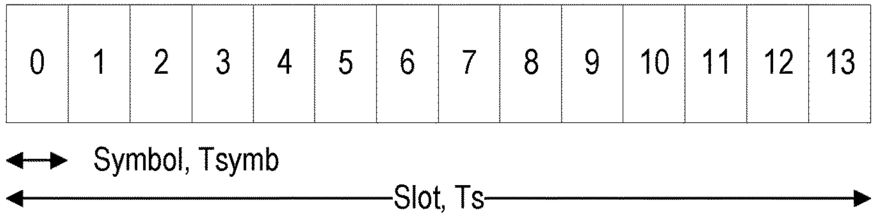
*FIG. 15B*
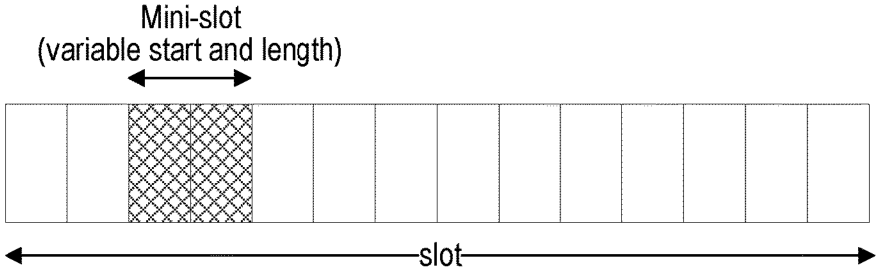
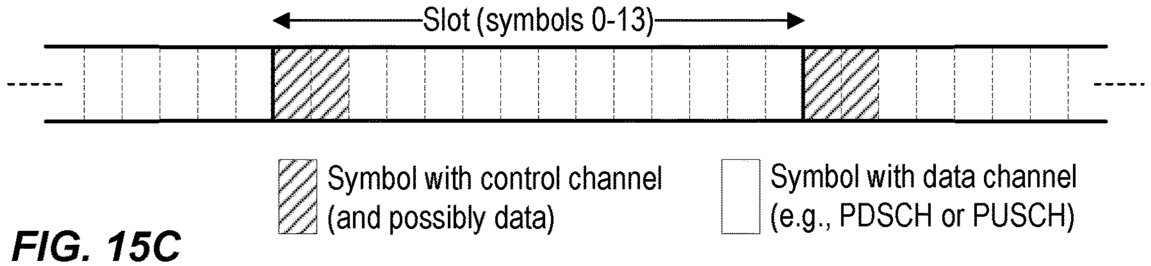
*FIG. 15C*

```
-- ASN1START
-- TAG-NZP-CSI-RS-RESOURCE-START
NZP-CSI-RS-Resource ::=            SEQUENCE {
    nzp-CSI-RS-ResourceId              NZP-CSI-RS-ResourceId,
    resourceMapping                    CSI-RS-ResourceMapping,
    powerControlOffset                 INTEGER (-8..15),
    powerControlOffsetSS               ENUMERATED{db-3, db0, db3, db6}    OPTIONAL,   -- Need R
    scramblingID                       ScramblingId,
    periodicityAndOffset               CSI-ResourcePeriodicityAndOffset   OPTIONAL,   -- Cond PeriodicOrSemiPersistent
    qcl-InfoPeriodicCSI-RS             TCI-StateId                        OPTIONAL,   -- Cond Periodic
    ...
}
-- TAG-NZP-CSI-RS-RESOURCE-STOP
-- ASN1STOP
```

FIG. 17A

```
-- ASN1START
-- TAG-NZP-CSI-RS-RESOURCESET-START
NZP-CSI-RS-ResourceSet ::=         SEQUENCE {
    nzp-CSI-ResourceSetId              NZP-CSI-RS-ResourceSetId,
    nzp-CSI-RS-Resources               SEQUENCE (SIZE (1..maxNrofNZP-CSI-RS-ResourcesPerSet)) OF NZP-CSI-RS-ResourceId,
    repetition                         ENUMERATED { on, off }         OPTIONAL,   -- Need S
    aperiodicTriggeringOffset          INTEGER(0..6)                  OPTIONAL,   -- Need S
    trs-Info                           ENUMERATED {true}              OPTIONAL,   -- Need R
    ...
}
-- TAG-NZP-CSI-RS-RESOURCESET-STOP
-- ASN1STOP
```

FIG. 17B

```
-- ASN1START
-- TAG-CSI-RESOURCECONFIG-START
CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
           nzp-CSI-RS-ResourceSetList  SEQUENCE (SIZE (1..maxNrofNZP-CSI-RS-ResourceSetsPerConfig)) OF
                                                 NZP-CSI-RS-ResourceSetId                      OPTIONAL, -- Need R
           csi-SSB-ResourceSetList     SEQUENCE (SIZE (1..maxNrofCSI-SSB-ResourceSetsPerConfig)) OF CSI-SSB-ResourceSetId
                                                                                               OPTIONAL  -- Need R
        },
        csi-IM-ResourceSetList      SEQUENCE (SIZE (1..maxNrofCSI-IM-ResourceSetsPerConfig)) OF CSI-IM-ResourceSetId
    },
    bwp-Id                      BWP-Id,
    resourceType                ENUMERATED { aperiodic, semiPersistent, periodic },
    ...
}
-- TAG-CSI-RESOURCECONFIG-STOP
-- ASN1STOP
```

FIG. 17C

FIG. 17D

```
-- ASN1START
-- TAG-CSI-RESOURCEPERIODICITYANDOFFSET-START
CSI-ResourcePeriodicityAndOffset ::=    CHOICE {
    slots4                              INTEGER (0..3),
    slots5                              INTEGER (0..4),
    slots8                              INTEGER (0..7),
    slots10                             INTEGER (0..9),
    slots16                             INTEGER (0..15),
    slots20                             INTEGER (0..19),
    slots32                             INTEGER (0..31),
    slots40                             INTEGER (0..39),
    slots64                             INTEGER (0..63),
    slots80                             INTEGER (0..79),
    slots160                            INTEGER (0..159),
    slots320                            INTEGER (0..319),
    slots640                            INTEGER (0..639)
}
-- TAG-CSI-RESOURCEPERIODICITYANDOFFSET-STOP
-- ASN1STOP
```

FIG. 17E

```
-- ASN1START
-- TAG-CSI-RS-RESOURCEMAPPING-START
CSI-RS-ResourceMapping ::=          SEQUENCE {
    frequencyDomainAllocation           CHOICE {
        row1                                BIT STRING (SIZE (4)),
        row2                                BIT STRING (SIZE (12)),
        row4                                BIT STRING (SIZE (3)),
        other                               BIT STRING (SIZE (6))
    },
    nrofPorts                           ENUMERATED {p1,p2,p4,p8,p12,p16,p24,p32},
    firstOFDMSymbolInTimeDomain         INTEGER (0..13),
    firstOFDMSymbolInTimeDomain2        INTEGER (2..12)                             OPTIONAL,   -- Need R
    cdm-Type                            ENUMERATED {noCDM, fd-CDM2, cdm4-FD2-TD2, cdm8-FD2-TD4},
    density                             CHOICE {
        dot5                                ENUMERATED {evenPRBs, oddPRBs},
        one                                 NULL,
        three                               NULL,
        spare                               NULL
    },
    freqBand                            CSI-FrequencyOccupation,
    ...
}
-- TAG-CSI-RS-RESOURCEMAPPING-STOP
-- ASN1STOP
```

```
-- ASN1START
-- TAG-CSI-RS-RESOURCECONFIGMOBILITY-START
CSI-RS-ResourceConfigMobility ::=   SEQUENCE {
    subcarrierSpacing                   SubcarrierSpacing,
    csi-RS-CellList-Mobility            SEQUENCE (SIZE (1..maxNrofCSI-RS-CellsRRM)) OF CSI-RS-CellMobility,
    ... ,
    [[
    refServCellIndex-v1530              ServCellIndex    OPTIONAL    -- Need S
    ]]
}
CSI-RS-CellMobility ::=     SEQUENCE {
    cellId                      PhysCellId,
    csi-rs-MeasurementBW        SEQUENCE {
        nrofPRBs                   ENUMERATED { size24, size48, size96, size192, size264},
        startPRB                   INTEGER(0..2169)
    },
    density                     ENUMERATED {d1,d3}          OPTIONAL,   -- Need R
    csi-rs-ResourceList-Mobility SEQUENCE (SIZE (1..maxNrofCSI-RS-ResourcesRRM)) OF CSI-RS-Resource-Mobility
}
CSI-RS-Resource-Mobility ::=        SEQUENCE {
    csi-RS-Index                        CSI-RS-Index,
    slotConfig                          CHOICE {
        ms4                                 INTEGER (0..31),
        ms5                                 INTEGER (0..39),
        ms10                                INTEGER (0..79),
        ms20                                INTEGER (0..159),
        ms40                                INTEGER (0..319)
    },
    associatedSSB                       SEQUENCE {
        ssb-Index                           SSB-Index,
        isQuasiColocated                    BOOLEAN
    }                                                           OPTIONAL, -- Need R
    frequencyDomainAllocation           CHOICE {
        row1                                BIT STRING (SIZE (4)),
        row2                                BIT STRING (SIZE (12))
    },
    firstOFDMSymbolInTimeDomain         INTEGER (0..13),
    sequenceGenerationConfig            INTEGER (0..1023),
    ...
}
CSI-RS-Index ::=                    INTEGER (0..maxNrofCSI-RS-ResourcesRRM-1)
-- TAG-CSI-RS-RESOURCECONFIGMOBILITY-STOP
-- ASN1STOP
```

FIG. 18

SSB-ALIGNED TRANSMISSION OF PAGING-RELATED SIGNALS

CROSS-REFERENCE TO RELATED APPLICATIONS

This application is a Submission Under 35 U.S.C. § 371 for U.S. National Stage Patent Application of International Application No.: PCT/EP2021/071448, filed Jul. 30, 2021 entitled "SSB-ALIGNED TRANSMISSION OF PAGING-RELATED SIGNALS," which claims priority to U.S. Provisional Application No. 63/061,881, filed Aug. 6, 2020, entitled "SSB-ALIGNED TRANSMISSION OF PAGING-RELATED SIGNALS," and U.S. Provisional Application No. 63/061,238, filed Aug. 5, 2020, entitled "ADDITIONAL REFERENCE SIGNALS FOR UES INNON-CONNECTED STATES," the entireties of all of which are incorporated herein by reference.

TECHNICAL FIELD

The present disclosure generally relates to the field of wireless network communications, and, more particularly, to the transmission and reception of paging-related signals in wireless networks, as well as to relates to techniques for reducing energy consumption of wireless devices operating in non-connected states in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. Some of the techniques described herein relate to NR, but the following description of Long-Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz. One important requirement on Rel-10 is to assure backward compatibility with LTE Rel-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface, labelled "Radio") and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

As such, the eNB is unaware, in advance, whether a particular UE is in the eNB's cell where it is being paged. Typically several UEs are assigned to the same paging occasion (PO) on the PDCCH. As a result, if is a paging message for any of the UEs listening to the same PO, all of those UEs will have to decode the contents of the PDSCH to see whether the paging message was intended for them.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of Ns, OFDM subcarriers. Exemplary values of $N^{DL}_{symb}$ can be 7 (with a normal CP) or 6 (with an extended-length CP) for subcarrier spacing (SCS) of 15 kHz. The value of Ns, is configurable based upon the available channel bandwidth. Since persons of ordinary skill in the art are familiar with the principles of OFDM, further details are omitted in this description. An exemplary uplink slot can be configured in similar manner as discussed above, but comprising $N^{UL}_{symb}$ OFDM symbols, each of which includes Ns, subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS).

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above. Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

The fifth generation (5G) NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

Furthermore, time-frequency resources can be configured much more flexibly for an NR cell than for an LTE cell. For example, rather than a fixed 15-kHz SCS as in LTE, NR SCS can range from 15 to 240 kHz, with even greater SCS considered for future NR releases.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

In wireless networks such as those operating according to specifications developed by members of the Third-Generation Partnership Project (3GPP), discontinuous reception (DRX) during idle and inactive operating modes of the user equipment (UE) is a key energy saving mechanism allowing the UE to remain in deep sleep for a dominant fraction of the time when no data transmission is ongoing. DRX operation by a UE entails monitoring a control channel for paging measurements and performing Radio Resource Management (RRM) measurements to determine an appropriate cell for camping. The network configures the UE with a DRX period that determines the paging monitoring rate; typically, RRM measurements are performed at the same rate, i.e., during the same active times specified by the DRX configuration.

For LTE Machine-Type (LTE-M) devices, massive Machine-Type Communications (mMTC) devices, and narrow-band Internet-of-Things (NB-IoT) devices, for which DRX activities are a dominant source of energy consumption, a wake-up signal (WUS) solution for idle mode was specified in Release 15 of the 3GPP specifications. The approach specified therein defined a sequence-based signal design and addressed primarily the use case associated with PDCCH coverage extension, i.e., paging PDCCH repetition in a paging opportunity (PO). This approach may be referred to as mMTC-WUS.

In connected mode, a connected-mode DRX (cDRX) framework can be used to reduce unnecessary monitoring for scheduling messages carried by the Physical Downlink Control Channel (PDCCH), when no new data is available for transmission in Layer 1. A WUS solution for cDRX has been specified in Release 16 of the 3GPP specifications, using a PDCCH-based WUS design. This may be referred to as connected mode-WUS.

In deployments of NR, a particular cell is identified using one or more (up to 64 in FR2) synchronization signal block (SSB) beams. FIG. 3 illustrates details of the SSB's structure. An SSB occupies twenty resource blocks (RBs) and contains three components: a primary synchronization signal (PSS) for coarse synchronization and cell group identification, a secondary synchronization signal (SSS) for cell identification, and a physical broadcast channel (PBCH) for primary system information (SI) delivery, i.e., for delivery of the information block known as the Master Information Block (MIB). The PSS and SSS are sequence-based, while the PBCH is encoded and includes a demodulation reference signal (DMRS) for channel estimation, to enable decoding of the SI carried by the PBCH. FIG. 4 illustrates how candidate SSB positions might be located within an NR signal structure, for several different numerologies.

FIG. 5 illustrates how multiple SSB beams (up to L=64) may be distributed in time. SS block time locations are indexed from 0 to L−1 in increasing order within a half radio frame according to the following:

L=4
- SS block time indices are indicated by the two least significant bits (LSBs) of the three bits corresponding to the eight different possible PBCH-DMRS sequences. The MSB is used for a half-frame index.

L=8
- SS block time indices are indicated by eight different PBCH-DMRS sequences.

L=64
- LSBs of the SS block time indices are indicated by the eight different PBCH-DMRS sequences.
- MSBs of SS block time index are indicated in the NR-PBCH payload.
- Three bits in the NR-PBCH payload in below 6 GHz case may be used for one or more other purposes.

This joint usage of NR-PBCH DMRS sequences and explicit bits in the NR-PBCH payload (in the L=64 case) to indicate the SS block time index follows the following principles:

- MSB bits (b5, . . . , b3) for SS block time index in NR-PBCH payload only in case of above 6 GHz
- These same three bits in below-6 GHz case are used for other purpose (two reserved bits and 1 MSB bit for SSB-subcarrier-offset).
- Two or three LSB bits of SSB index are indicated by four or eight DMRS sequences.

For example, for a numerology with 120-kHz subcarrier spacing (SCS), FIG. 6 shows the indication of SSB time index from 0 to 63. Note that each smallest box in the figure means a slot, each of which includes two SSBs. Thus, eight DM-RS sequences map to 4 boxes, within each group of slots identified by the three bits in the NR-PBCH payload. These bits are shown above each such group of slots, in FIG. 6.

SUMMARY

3GPP has specified two wake-up signal (WUS) frameworks—for enhanced mobile broadband (eMBB) connected mode and for mMTC/IoT idle mode. These solutions address certain extremes in terms of PDCCH monitoring frequency and energy cost. In some cases addressed by these frameworks, the overhead due to radio resource management (RRM) measurements in conjunction with PDCCH monitoring and/or WUS monitoring is not a strong concern. In other scenarios, however, some of which are detailed below, there is a need for an improved WUS solution for non-coverage expanded scenarios in idle mode.

In addition, NR, a UE in RRC_CONNECTED state is provided with periodic, semi-periodic, and/or aperiodic CSI-RS/TRS, which may be also referred to as "tracking reference signals" (TRS) or "CSI RS for tracking." The UE uses these RS to measure channel quality and/or to adjust the UE's time and frequency synchronization with the serving network node (e.g., gNB). When a UE transitions to a non-connected state (i.e., RRC_IDLE or RRC_INACTIVE), the network may or may not turn off such RSs for that particular UE. Nevertheless, the non-connected UE is not aware of whether the connected-state RS are also available in the non-connected state. This uncertainty can create various problems, issues, and/or difficulties for NR UEs operating in a non-connected state.

Various embodiments of the techniques, apparatuses, and systems described herein address these problems.

Disclosed herein is a wake-up signal (WUS) transmission scheme where paging WUS is transmitted in conjunction with SSB transmission, e.g., in the same symbols as the SSB burst and frequency-multiplexed in the vicinity of the SSB PRBs, or in adjacent/nearby symbols or adjacent slots.

The WUS signal design may be PDCCH-based, reference signal (RS)-based (e.g., based on the CSI-RS), SSB-like, or a special-purpose sequence design. The WUS may apply to all UEs whose paging opportunities fall between the current SSB and the next SSB, or to a subgroup of such UEs, where one or more subgroup indices are embedded in the WUS.

An example method according to several of the techniques described herein is implemented in in a network node configured to communicate wirelessly with wireless devices. This method comprises transmitting a synchronization signal block (SSB) comprising one or more synchronization signals. This method further comprises transmitting a wake-up signal (WUS), the WUS indicating whether a wireless device or group of wireless devices should monitor a physical channel during at least one paging opportunity associated with the WUS transmission, where this transmitting of the WUS comprises transmitting the WUS in conjunction with the SSB.

Another example method in accordance with several of the techniques described herein is implemented in a wireless device, and complements the method summarized above. This method includes the step of receiving, from a network node, a synchronization signal block (SSB) comprising one or more synchronization signals. This method further comprises receiving a wake-up signal (WUS), the WUS indicating whether the wireless device should monitor a physical channel during at least one paging opportunity associated with the WUS transmission. This WUS is received in conjunction with the SSB.

Other embodiments described herein include apparatuses corresponding to and configured to carry out the methods summarized above, and variants thereof.

Thus, some of the techniques detailed herein allow for reductions in idle mode energy consumption without requiring additional hardware support in the UE. This improves standby time, most clearly in scenarios and network configurations where false paging is limited. Overall UE energy consumption is improved in use cases where idle mode dominates over connected mode, e.g., in use cases involving infrequent and small data transmissions.

Other techniques described herein include methods (e.g., procedures) to receive reference signals (RS) transmitted by a network node in a wireless network. These exemplary methods can be performed by a user equipment (UE, e.g., wireless device) in communication with the network node (e.g., base station, eNB, gNB, ng-eNB, etc., or component thereof) in the wireless network (e.g., E-UTRAN, NG-RAN).

Other embodiments include methods (e.g., procedures) for transmitting reference signals (RS) to one or more user equipment (UEs). These exemplary methods can be performed by a network node (e.g., base station, eNB, gNB, etc., or component thereof) serving a cell in a wireless network (e.g., E-UTRAN, NG-RAN).

These exemplary methods can include receiving, from the network node, a configuration for transmissions by the network node while the UE is in a non-connected state. The configuration can include one or more of the following:

- a first characteristic indicating that the connected-state RS will be available for a validity duration,
- a second characteristic indicating that the connected-state RS is not guaranteed to be available after an expiration time, and
- a third characteristic indicating that paging information, for the UE, will be transmitted during a paging duration.

These exemplary methods can also include, while the UE is in a non-connected state, detecting at least one of the first, second, and third characteristics in connected-state RS transmitted by the network node. These exemplary methods can also include, while the UE is in a non-connected state, selectively receiving further transmissions by the network node based on the detected at least one characteristic.

In some embodiments, the selectively receiving operations can include: selectively receiving further connected-state RS transmitted by the network node based on detecting at least one of the first and second characteristics; and selectively receiving a paging indicator and/or a paging message, for the UE, based on detecting the third characteristic.

In some embodiments, the configuration can be received in one or more of the following: a unicast message while the UE is operating in the connected state; a unicast connection release message triggering UE entry into a non-connected state; and broadcast system information.

In some embodiments, each of the first, second, and third characteristics for connected-state RS can include one or more of the following parameters: scrambling code, slot timing offset, initial resource block in frequency domain, number of resource blocks in the frequency domain, and initial symbol in time domain.

In some embodiments, the validity duration can be one of the following after a transmission of a connected-state RS that includes the first characteristic: one or more paging occasions (POs) for the UE; an amount of time; or a number of subframes. In some embodiments, the validity duration is indicated according to one or more of the following: by the configuration, preconfigured such that it is known to both the UE and the network node, or by the transmitted connected-state RS.

In some embodiments, the first characteristic can include first and second parameters. The first parameter indicates that the connected-state RS will be available for a validity duration, while the second parameter can take on a plurality of values, each indicating a particular validity duration for which the connected-state RS will be available. In some of these embodiments, the first parameter is a particular scrambling code applied to the transmitted connected-state RS and the second parameter is a slot timing offset for the transmitted connected-state RS.

In some embodiments, the expiration time can be one of the following after a transmission of a connected-state RS that includes the second characteristic: one or more paging occasions (POs) for the UE; an amount of time; or a number of subframes. In some embodiments, the expiration time can be indicated according to one or more of the following: by the configuration, preconfigured such that it is known to both the UE and the network node, and by the transmitted connected-state RS.

In some embodiments, the second characteristic can include first and second parameters. The first parameter indicates that the connected-state RS is not guaranteed to be available after an expiration time, while the second parameter can take on a plurality of values, each indicating a particular expiration time after which the connected-state RS is not guaranteed to be available. In some of these embodiments, the first parameter is a particular scrambling code applied to the transmitted connected-state RS and the second parameter is a slot timing offset for the transmitted connected-state RS.

In some embodiments, the paging duration can be indicated according to one or more of the following: by the configuration, preconfigured such that it is known to both the UE and the network node, or by the transmitted connected-state RS. In some embodiments, the third characteristic can include first and second parameters. The first parameter indicates that paging information, for the UE, will be transmitted during a paging duration after transmission of a connected-state RS that includes the third characteristic. The second parameter can take on a plurality of values, each indicating a particular paging duration during which the paging information will be transmitted.

In some of these embodiments, a first value of the second parameter indicates that paging information will be transmitted at the UE's next paging occasion (PO), a second value of the second parameter indicates that paging information will be transmitted during at least one of the UE's next two POs, and a third value of the second parameter indicates that paging information will be transmitted in the PO after the UE's next PO. In some of these embodiments, the first parameter is a particular scrambling code applied to the transmitted connected-state RS and the second parameter is a slot timing offset for the transmitted connected-state RS.

In some embodiments, the configuration can also include a monitoring period during which the UE should monitor for connected-state RS having at least one of the first, second, and third characteristics. In such embodiments, the connected-state RS that include at least one of the first, second, and third characteristics is detected during the monitoring period. In some of these embodiments, the monitoring period is indicated relative to one of the following: a paging occasion for the UE, one or more non-connected-state RS transmissions, or a particular frame number.

In some embodiments, each of the first, second, and third characteristics is indicated by a different value of a single transmission parameter associated with the connected-state RS. An example based on parameter nrofPRBs was discussed above.

Other embodiments include exemplary methods (e.g., procedures) to transmit reference signals (RS) to one or more user equipment (UEs). These exemplary methods can be performed by a network node (e.g., base station, eNB, gNB, ng-eNB, etc., or component thereof) serving a cell in a wireless network (e.g., E-UTRAN, NG-RAN).

These exemplary methods can include transmitting, to a UE, a configuration for transmissions by the network node while the UE is in a non-connected state. The configuration can include one or more of the following:

- a first characteristic indicating that the connected-state RS will be available for a validity duration,
- a second characteristic indicating that the connected-state RS is not guaranteed to be available after an expiration time, and
- a third characteristic indicating that paging information, for the UE, will be transmitted during a paging duration.

These exemplary methods can also include, while the UE is in a non-connected state, transmitting connected-state RS that include at least one of the first, second, and third characteristics. These exemplary methods can also include, while the UE is in a non-connected state, selectively transmitting further signals or channels, to the UE, based on the at least one characteristic included in the transmitted connected-state RS.

In some embodiments, the selectively transmitting operations can include one or more of the following: transmitting further connected-state RS during the validity period based on the transmitted connected-state RS including the first characteristic; selectively transmitting further connected-state RS after the expiration time based on the transmitted connected-state RS including the second characteristic; and transmitting a paging indicator and/or a paging message for the UE, during the paging duration, based on the transmitted connected-state RS including the third characteristic.

In various embodiments, the first, second, and third characteristics can have any of the properties discussed above in relation to the UE embodiments. In various embodiments, the validity duration, expiration time, and paging duration can have any of the properties discussed above in relation to the UE embodiments. More generally, various network node embodiments can be cooperative with the UE embodiments described above.

Other embodiments include user equipment (UEs, e.g., wireless devices) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE FIGURES

FIG. 14 shows an exemplary time-frequency resource grid for an NR (e.g., 5G) slot.

FIG. 15, which includes FIGS. 15A-15C, shows exemplary NR slot and mini-slot configurations.

FIG. 16, which includes

FIG. 17, which includes FIGS. 17A-17E, shows various exemplary ASN.1 data structures for message fields and/or information elements (IEs) used to provide CSI-RS resource set configurations to an NR UE.

FIG. 18 shows an exemplary ASN.1 data structure for a CSI-RS-ResourceConfig-Mobility IE, by which an NR network can configure a UE for CSI-RS-based radio resource management (RRM) measurements.

FIGS. 19 and 20, which include

DETAILED DESCRIPTION

Figure 1:
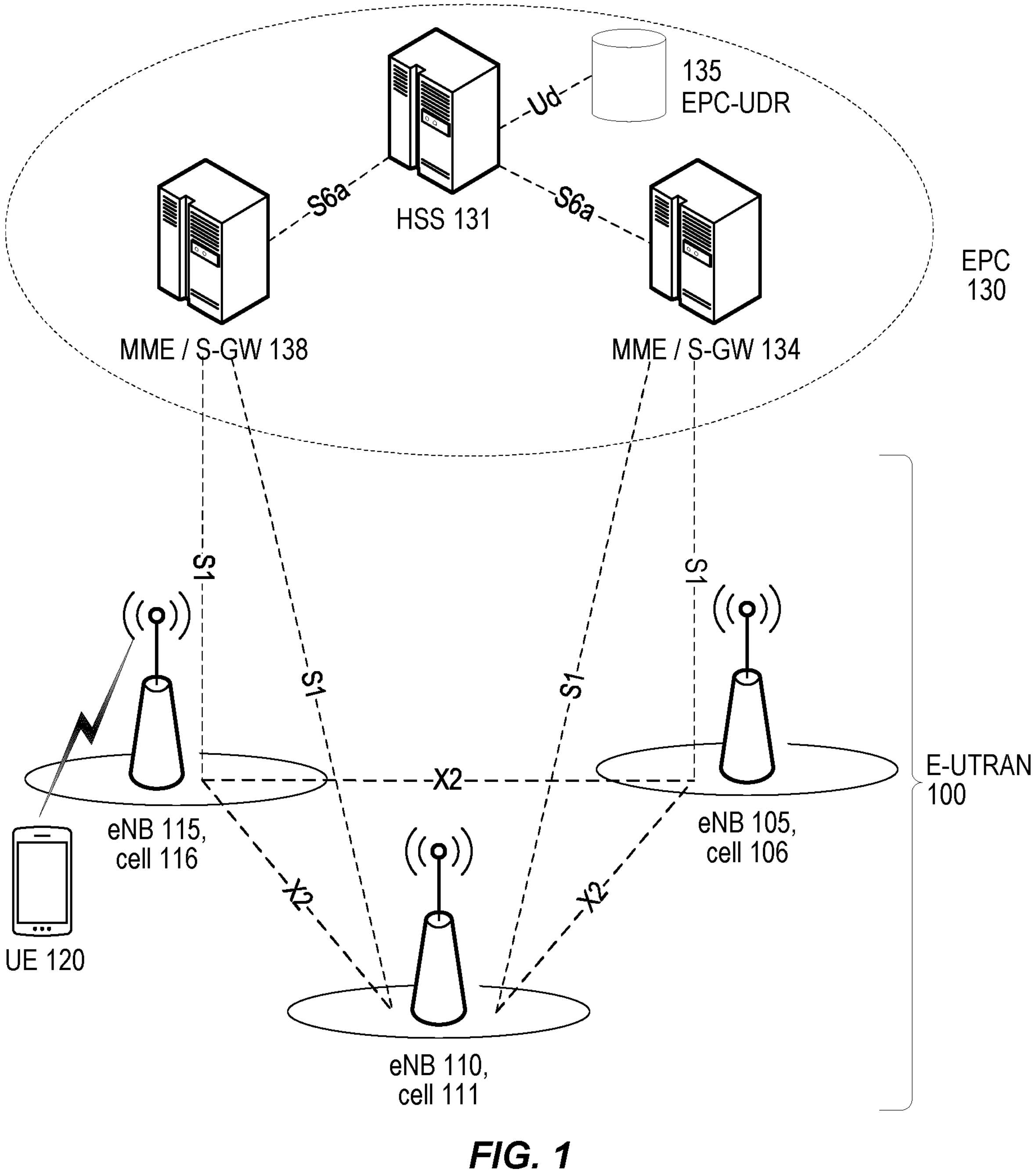
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
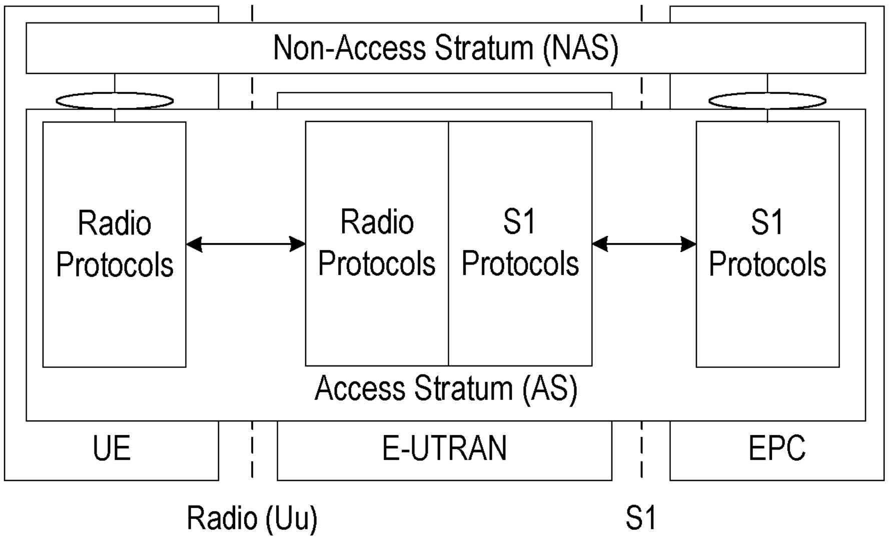
FIG. 2A is a high-level block diagram of an exemplary E-UTRAN architecture in terms of its constituent components, protocols, and interfaces.
Figure 2B:
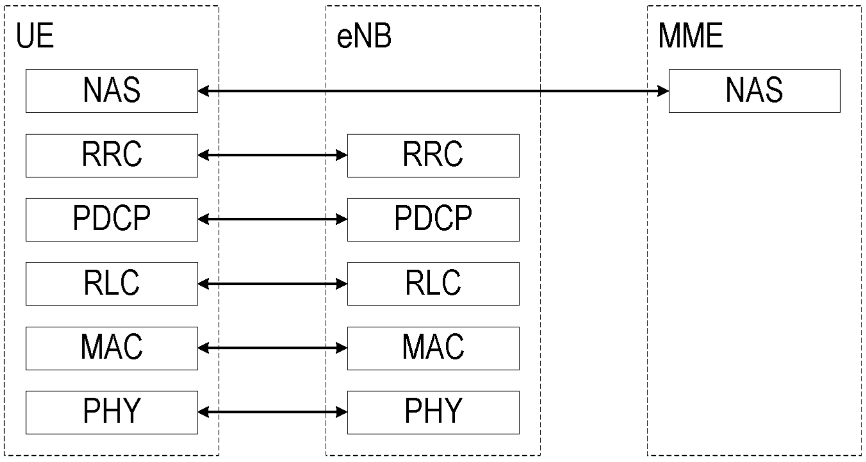
FIG. 2B is a block diagram of exemplary protocol layers of the control-plane portion of the radio (Uu) interface between a user equipment (UE) and the E-UTRAN.
Figure 3:
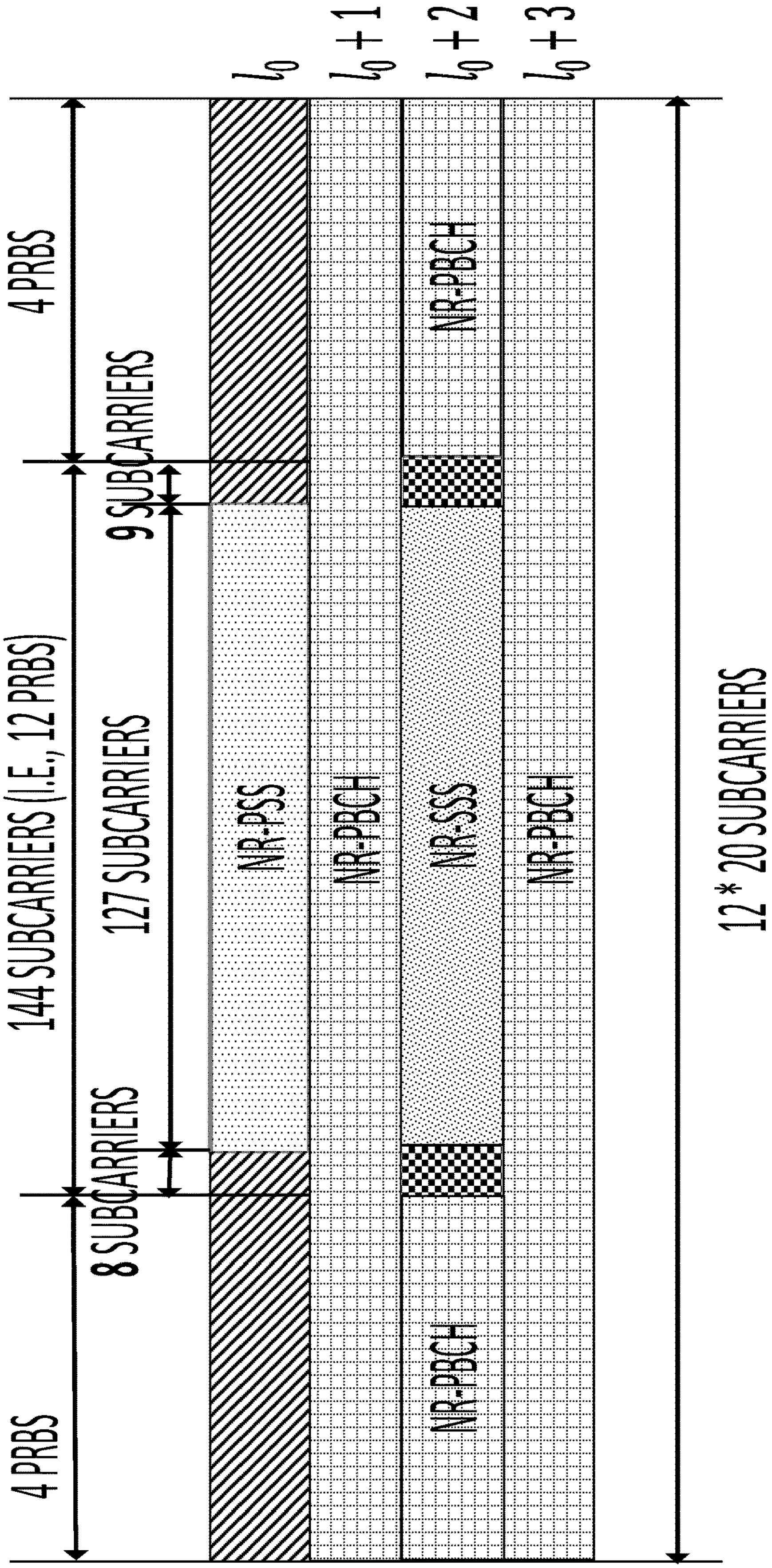
FIG. 3 illustrates the structure of an example synchronization block (SSB).
Figure 4:
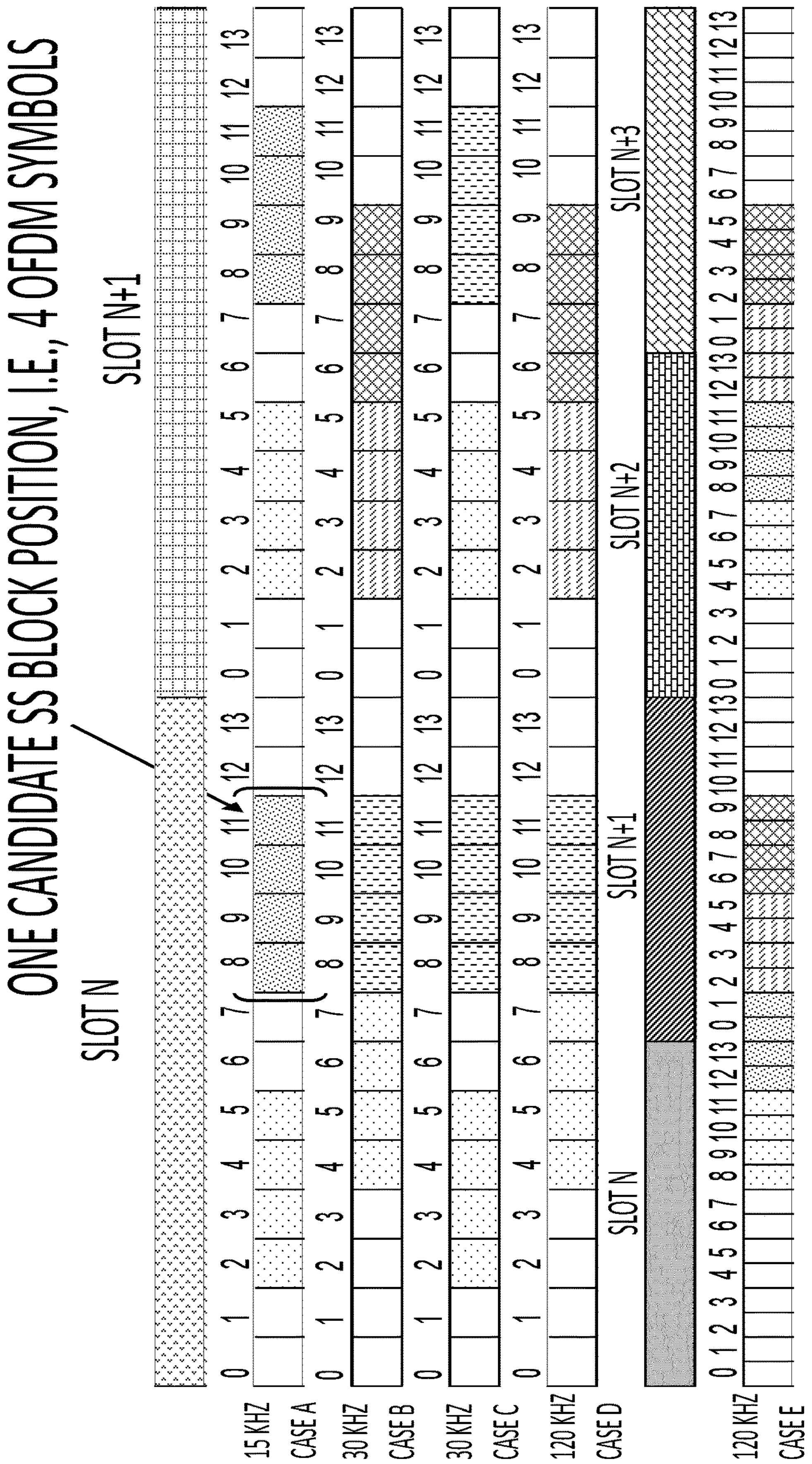
FIG. 4 shows how candidate SSB positions might be located in an NR signal structure.
Figure 5:
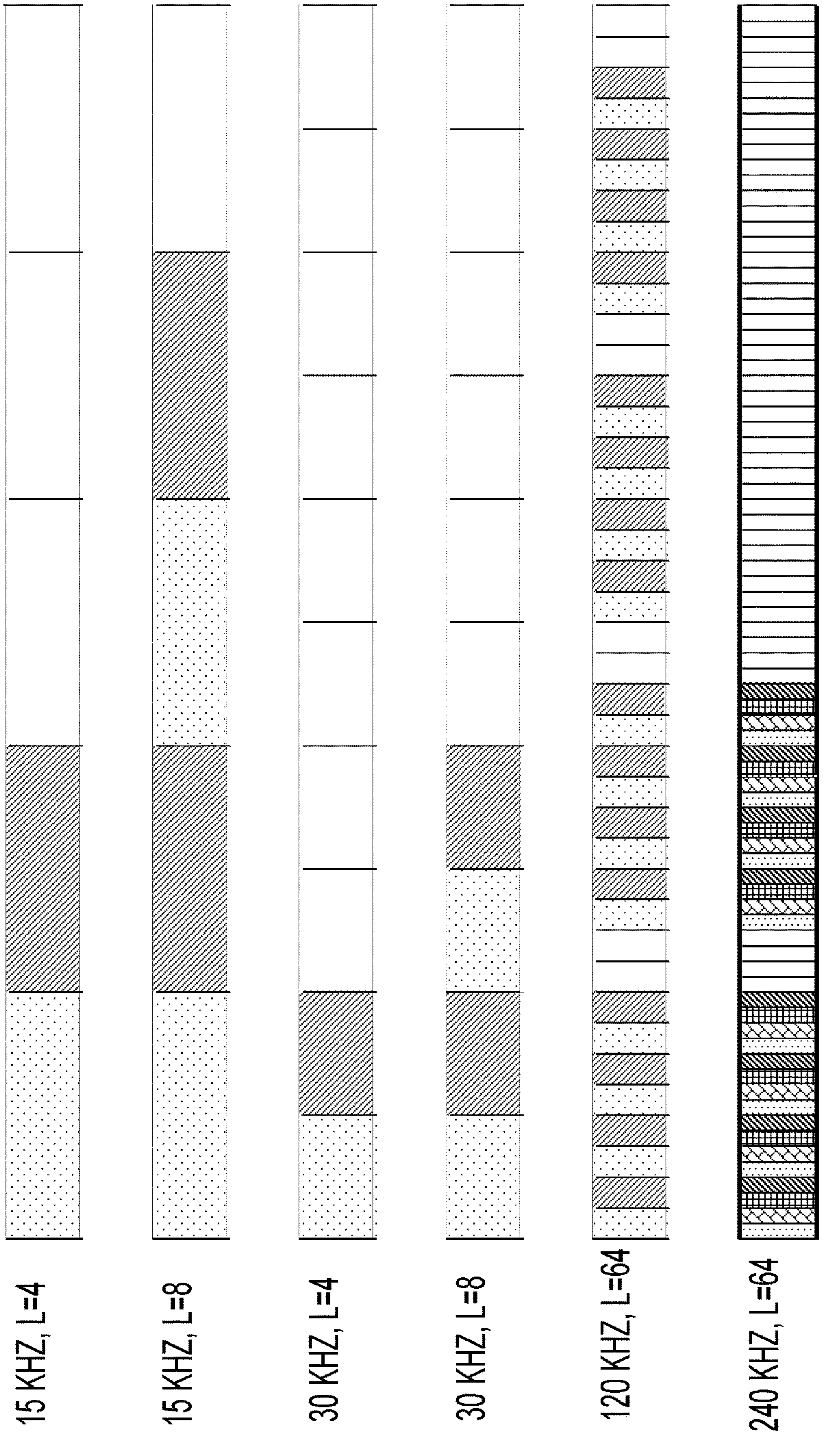
FIG. 5 illustrates how multiple SSB beams may be distributed in time.
Figure 6:
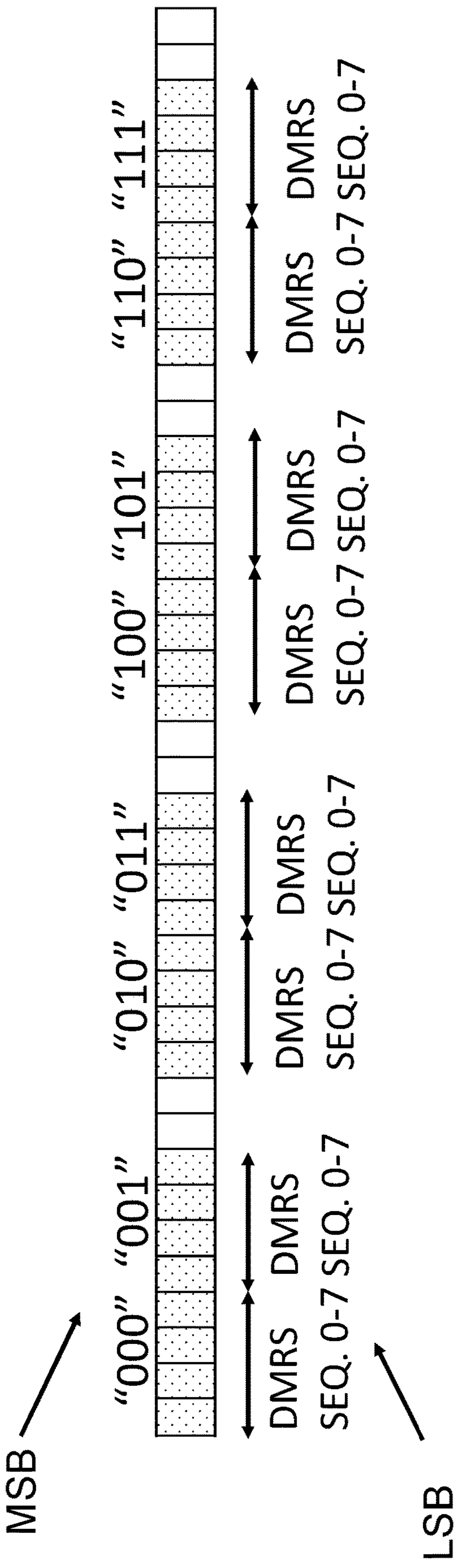
FIG. 6 illustrates the indication of SSB time indices, using demodulation reference signal sequences and physical broadcast channel payload bits.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate.

Likewise, any advantage of any of the embodiments may apply to any other embodiments, and vice versa. Other objectives, features, and advantages of the enclosed embodiments will be apparent from the following description.

Furthermore, the following terms may be used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

- Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).
- Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the descriptions herein focus on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly noted above, 3GPP has specified two wake-up signal (WUS) frameworks—for enhanced mobile broadband (eMBB) connected mode and for mMTC/IoT idle mode. These solutions address certain extremes in terms of PDCCH monitoring frequency and energy cost. The connected-mode WUS framework addresses relatively frequent onDurations (e.g., with 80-160 millisecond periods) and aims at shortening the effective PDCCH monitoring window at each monitoring occasion, from about 8-10 milliseconds to less than one millisecond. The mMTC-WUS framework primarily addresses the issue that the paging PDCCH is repeated for coverage extension, resulting in a very long monitoring window. Thus, the WUS in this framework effectively replaces a long PDCCH monitoring interval with a short WUS monitoring at each DRX period (up to multiple hours). In both those cases, the overhead due to radio resource management (RRM) measurements in conjunction with PDCCH monitoring and/or WUS monitoring is not a strong concern.

In some non-mMTC scenarios, the paging PDCCH is not extended, but constitutes only 1-2 PDCCH symbols, which is an interval well below 1 millisecond. Therefore, existing approaches that focus on shortening the paging indication reception do not offer the UE power savings opportunities. Furthermore, the need to perform RRM measurements in conjunction with DRX wake-ups further reduces UE power savings gains from paging procedure modifications. There is thus a need for an improved WUS solution for non-coverage expanded scenarios in idle mode.

In other scenarios, the network may configure paging without cross-slot scheduling, leading the UE to sample and buffer both the paging PDCCH symbols and the possible following Physical Downlink Shared Channel (PDSCH) symbol positions to avoid data loss during the PDCCH decoding duration. This leads to a longer effective on-time for the UE's radio-frequency (RF) circuitry during each paging opportunity (PO) for the UE, and increased UE energy consumption. Again, an improved solution is required.

Disclosed herein is a WUS transmission scheme where paging WUS is transmitted in conjunction with SSB transmission, e.g., in the same symbols as the SSB burst and frequency-multiplexed in the vicinity of the SSB PRBs, or in adjacent/nearby symbols or adjacent slots, e.g., within a certain relatively small number of symbols/slots.

The WUS signal design may be PDCCH-based, reference signal (RS)-based (e.g., based on the CSI-RS), SSB-like, or a special-purpose sequence design. The WUS may apply to all UEs whose paging opportunities fall between the current SSB and the next SSB, or to a subgroup of such UEs, where one or more subgroup indices are embedded in the WUS.

The frequency allocation used for the WUS signal is determined to minimize UE receiver bandwidth, while still providing sufficient reliability. The time allocation for the signal is determined to avoid extension of RF circuitry on-time compared to SSB measurements, or at least to make such extension relatively small.

The network may signal the availability and configuration of the WUS, as well as information relevant to grouping, in the system information (SI), in some embodiments.

From the UE perspective, the UE may determine whether it is advantageous to monitor the WUS, perhaps requiring the use of a wider receive (RX) bandwidth, or to instead perform regular paging PDCCH monitoring. If the WUS is detected frequently, and/or the paging PDCCH is detected frequently, WUS monitoring may be omitted, for at least a certain period of time, to reduce the RX bandwidth needed.

The techniques detailed herein allow for reductions in idle mode energy consumption without requiring additional hardware support in the UE. This improves standby time, most clearly in scenarios and network configurations where false paging is limited. Overall UE energy consumption is improved in use cases where idle mode dominates over connected mode, e.g., in use cases involving infrequent and small data transmissions.

In this document, including in the detailed description that follows, the term "idle," in the 3GPP context, refers to both RRC_IDLE and RRC_INACTIVE modes. "Idle" mode may refer to similar operating modes in other wireless networks. The term "wake-up signal," or "WUS," should also be understood as referring broadly to a signal designed to bring a UE or group of UEs from a deep or light sleep mode into a mode in which a paging message or other message directed to the UE can be received, whether or not the signal carries that specific name. Thus, the term WUS should be understood as interchangeable with other possible terminology for signaling aimed at informing UEs about paging transmission in an upcoming paging opportunity, e.g. advance paging indication, paging early indication, etc.

WUS Transmission in Conjunction with SSB Transmission

The purpose of transmitting a paging WUS is to provide an advance warning that an upcoming paging opportunity (PO) will contain a paging indication and message to one or more UEs monitoring the WUS. If a WUS is configured but no WUS is detected, the UE can omit a "light sleep" segment after SSB measurement and sync update, as well as omitting PDCCH sample collection and processing, and instead return to deep sleep immediately.

In scenarios where the paging rate in the PO is low and few POs are occupied, then a separate WUS monitoring action combined with the paging PDCCH monitoring that follows detection of the WUS has a low overhead and provides an advantageous trade-off, since many paging PDCCH monitoring occasions can be ignored. Omitting the PDCCH monitoring in those cases where the WUS is not detected provides a power savings gain that is not compromised by the additional WUS reception.

However, in scenarios where the UE is frequently alerted by WUS to perform PO monitoring, the additional power/energy expense due to additional WUS monitoring may become an overhead that is not justified.

Figure 7:
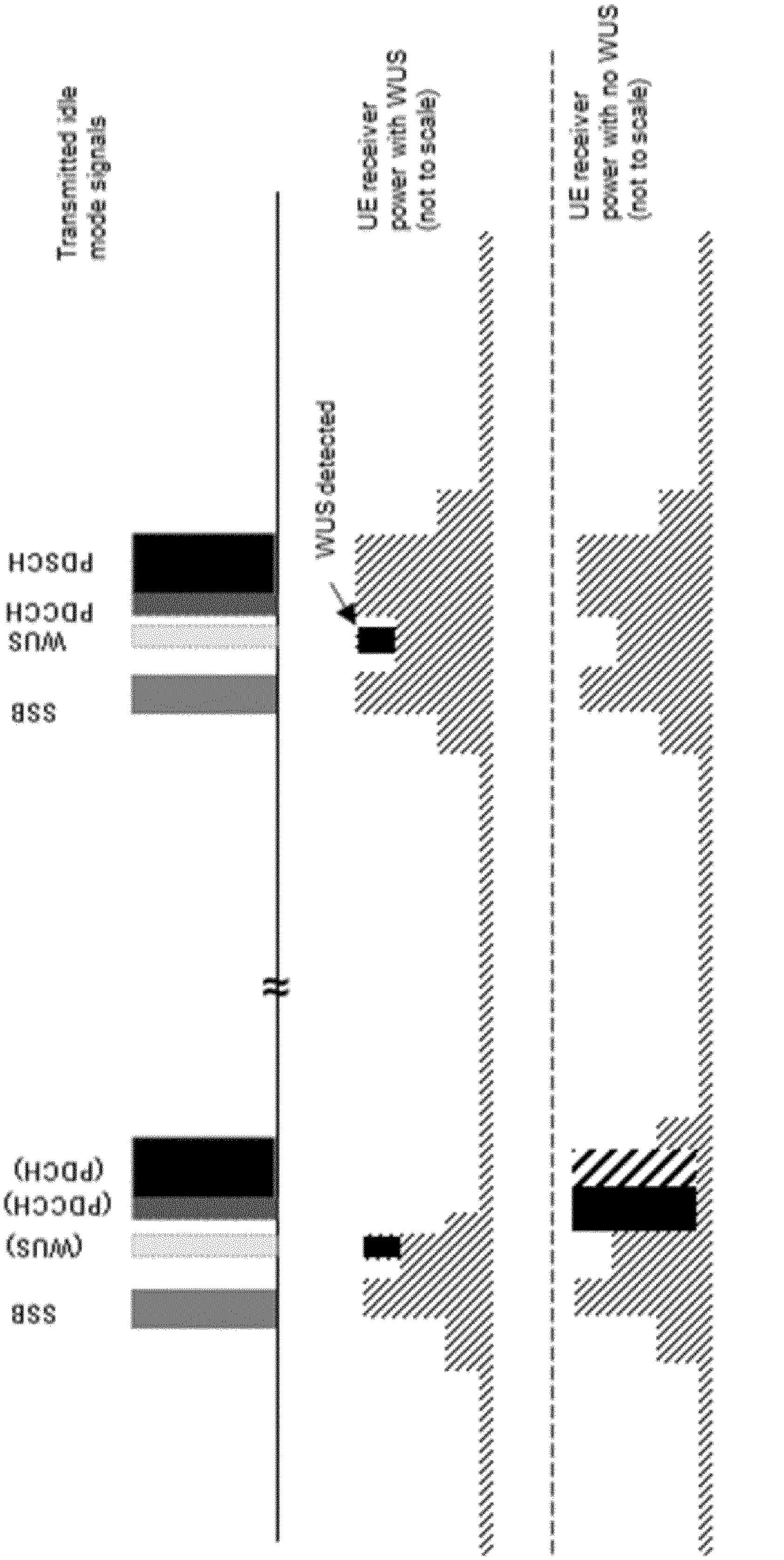
FIG. 7 illustrates an example wake-up signaling approach.

FIG. 7 illustrates a possible PDCCH-based WUS approach, in which a PDCCH-based WUS is transmitted ahead of a PDCCH interval, such that a UE that detects the WUS monitors the PDCCH immediately following the WUS. The top portion of FIG. 7 illustrates the timing of various signal components, including the SSB, WUS, the PDCCH, and the Physical Downlink Shared Channel (PDSCH). The middle portion of FIG. 7 shows the additional monitoring overhead (performing PDCCH-based WUS monitoring instead of light sleep), shown in solid black. In this scenario, the first WUS is not targeted to the UE, and the UE thus returns quickly to a deeper sleep. In the second instance, the WUS is detected, and the UE remains "awake" and receives the subsequent PDCCH and, if applicable, one or more subsequent PDSCH symbols.

The bottom portion of FIG. 7 shows the monitoring overhead for a UE that does not monitor this WUS. In this case, the UE must monitor every PDCCH (and possibly the following PDSCH). The power savings achieved by the WUS-monitoring UE by omitting the paging monitoring can be seen in the bold and bold striped region of this figure (PDCCH monitoring solid, PDSCH monitoring striped). With this technique, to obtain overall power savings benefits, the occurrences of no-WUS cannot be too infrequent, otherwise, the accumulated overhead from monitoring the WUS will lead to a negative overall energy consumption impact.

The approach shown in FIG. 7 can be improved by recognizing that, to provide more reliable power savings, the overhead due to WUS monitoring should be minimized and the gains from omitting paging monitoring should be increased. To that end, an improved paging WUS transmission scheme is presented here, where the WUS is transmitted simultaneously with or in close proximity to an SSB that the UE would use for loop convergence. This provides the following benefits:

- Compared to baseline: Avoids paging PDCCH/PDSCH monitoring.
- Compared to the technique shown in FIG. 7: Reduces additional WUS reception overhead.
- Compared to baseline and the technique shown in FIG. 7: Maximizes deep sleep opportunity, by returning the UE to deep sleep immediately after the SSB when no WUS detected.

Figure 8:
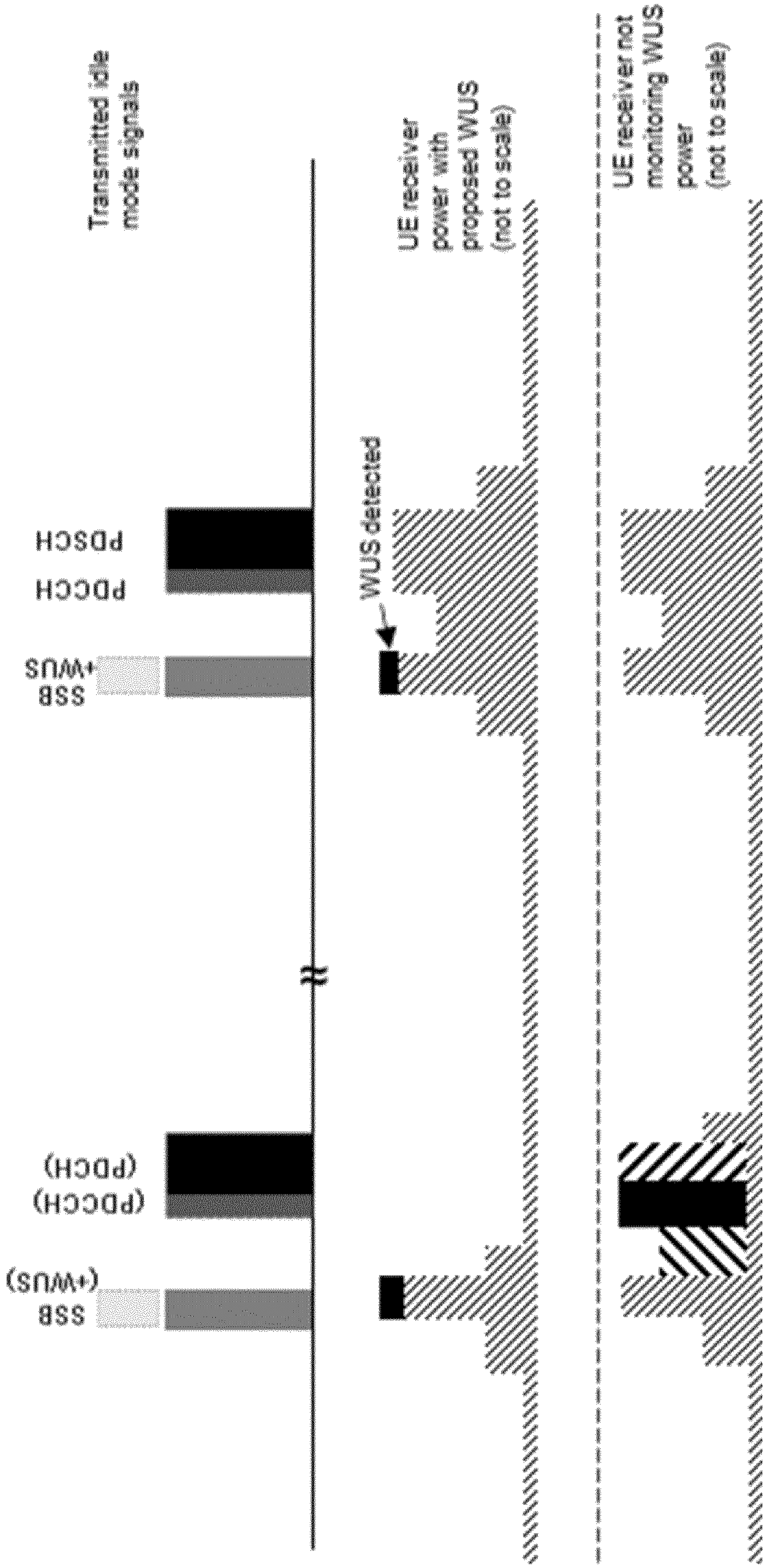
FIG. 8 illustrates an improved wake-up signaling approach.

This is depicted in FIG. 8. As seen in the top portion of the figure, the WUS is transmitted at the same time as the SSB. It may be frequency-multiplexed with the SSB, in which case additional receiver bandwidth may be required to receive the WUS. In variations of this approach, the WUS may be signaled in close proximity to, e.g., in adjacent symbols to, the SSB, or in overlapping symbols. Note that the timing of the other signal components, e.g., the SSB, the PDCCH, and the PDSCH remain unchanged. The middle portion of FIG. 8 shows the additional monitoring overhead (performing WUS monitoring instead of light sleep), shown in solid black. Note that this overhead may arise from the need to use a wider bandwidth to monitor for the WUS, or from a need to monitor one or a few extra symbols, but in either case may be relatively small. In the illustrated scenario, the first WUS is not targeted to the UE, and the UE thus returns quickly to a deep sleep. In the second instance, the WUS is detected, and the UE remains "awake" and receives the subsequent PDCCH and, if applicable, one or more subsequent PDSCH symbols.

The bottom portion of FIG. 8 shows the monitoring overhead for a UE that does not monitor this WUS. In this case, the UE must monitor every PDCCH (and possibly the following PDSCH). The power savings achieved by the WUS-monitoring UE by omitting the paging monitoring can be seen in the bold and bold striped regions of this figure. Note that with this approach, the overhead associated when no WUS is smaller than in the approach illustrated in FIG. 7, and the power savings compared to the legacy approach are higher.

WUS Transmission in Conjunction with SSB Transmission

The details of the WUS itself may vary, in various embodiments. In some embodiments, the WUS may be a PDCCH, e.g., similar to the connected mode power-saving signal design specified in 3GPP Release 16, using DCI format 2-6 or another or new DCI format. The Search Space (SS) for the idle-PDCCH-WUS monitoring described here may be provided in SI, e.g., in the Remaining Minimum System Information (RMSI) or Other System Information (OSI).

In some embodiments, WUS functionality is provided by transmitting a RS, e.g., CSI-RS or tracking reference signal (TRS) or any other sequence-based RS. One or more CSI-RS sequences may be assigned to WUS signaling, where the number of such sequences may be configurable. A CSI-RS according to a predetermined CSI-RS resource set configuration (code, time-frequency location, etc.) may be detected by a UE as an indication of a pending paging transmission in a PO. The RS-WUS may consist of one or more symbols transmitted in the same or different slots.

As an example when using TRS, the Release-15 TRS has a minimum bandwidth restriction of min(52RB,UE BWP). The frequency-domain resources for TRS-based WUS may be explicitly configured and may be different from the regular TRS.

In one example realization, the WUS for paging can be based on a TRS. The TRS configuration can be provided to the idle UE either through SI broadcasting, e.g., SIB2, or as part of the RRC release. The UE may be provided with a TRS with a one or more parameters from the default TRS connected mode TRS configuration. For example, the TRS may be configured with a specific scrambling code in additional to the default scrambling code as the distinguishing characteristics. The same TRS can also be used by the connected mode UEs, nevertheless, the specific idle mode characteristic can be used as a paging WUS for the UE. In one approach, the network further, as part of the idle mode specific TRS, defines a certain time range before a PO, within which the UE can expect the specific idle mode TRS to arrive, e.g., 50 milliseconds before the PO, or aligned with SSBs, e.g., 5 ms before or after, or aligned with multiple specific SSBs or a fraction of the SSBs, or aligned with a specific SFN. In this case the UE monitors the TRS, in one approach, in case the TRS is sent with the idle mode specific characteristic instead of the default one, the UE monitors PO, otherwise, it skips the PO. Note that this may be implemented the other way around, such that if the specific characteristics is detected the UE skips PO, but if the default mode is detected, the UE monitors PO. The UE behavior considering the specific idle mode TRS indication can be configured by the network as part of the SI or RRC release configuration, or it can be specified in the standard. In a related realization, in case the UE does not detect a TRS in the idle mode, or that the network does not configure TRS for the idle UEs, or it is not guaranteed to the UE that TRS will be present in the idle mode, the UE monitors PO.

In some embodiments, the WUS may be implemented as a non-cell-defining SSB-like transmission in a predetermined time-frequency location outside the cell-defining SSB grid. The network may reuse a signaling construction similar to SSB transmissions for RRM measurement objects. These SSBs are located off the SSB grid defined for initial access search by UEs connecting to the network. A structure similar to first two symbols of the conventional SSB may be used. For example, a single PSS code may be used and one or more possible SSS codes. The multiple SSS code options may be used for inserting grouping info; a UE may monitor an SSS code corresponding to its group allocation. Alternatively, PBCH may also be transmitted and the payload may be used for grouping info.

In some embodiments, the WUS may be a new, special-purpose signal. For example, one or more symbols or physical resource blocks (PRBs) outside the SSB may be used to convey WUS information. In one example, the assigned REs may be filled with a single predetermined pattern for WUS-on/off detection, to minimize the required resources. Alternatively, multiple patterns may be used to convey group-specific WUS info.

In some embodiments, the WUS may be not a separate signal but an additional signaling field in the SSB itself, e.g., one or more bits in the PBCH.

WUS Alignment with SSB

In some embodiments, the WUS may be transmitted in same symbols as the SSB burst, frequency-multiplexed in PRBs next to, or in the vicinity of, the SSB PRBs. The vicinity may preferably refer to same slot/PRB or an immediately adjacent slot. Alternatively, the WUS can be aligned with SSB within a number of slots, or other time units, e.g., ms from the SSB.

Frequency allocation of the WUS is preferably determined so as to minimize the required Rx receive bandwidth, while still providing sufficient detection performance.

In some embodiments, the WUS may be transmitted time-multiplexed in symbols immediately or closely preceding or following the SSB, or in adjacent slots. Time allocation of the WUS is preferably determined to avoid significantly extending RF on-time compared to SSB measurements, or to make such extension relatively small. For example, the acceptable extension may be comparable to TRS which, for FR1, is five OFDM symbols wide.

In some embodiments, if the PO itself is aligned (e.g., simultaneous and frequency-multiplexed) with SSB, the WUS need not be transmitted.

WUS Contents and Interpretation

The paging WUS may include indicators as to whether UEs need to be monitoring PDCCH in upcoming POs, e.g., from the current SSB to until the next SSB, or equivalently indicate whether paging will be sent or not sent in the upcoming POs. In a typical deployment configuration where the SSB period is 20 milliseconds and each frame (10 milliseconds) contains one PO, each SSB-aligned WUS transmission indicates presence for paging signals for the next 2 POs, for example.

In an alternative, when the WUS is related to multiple POs, a payload of the WUS may be configured by the network with a bitfield indicating which paging occasions will contain a paging message. There can be additional bits in the payload of the idle-PDCCH-WUS to further indicate the group for which the paging message is intended, in some embodiments.

For example, if there are four paging occasions, then the network can configure four bits in the idle-PDCCH-WUS to indicate which of the four paging occasions contain paging message. The network can additionally configure two (or more) bits per PO to indicate any grouping information—for example, bit0 indicates UE with odd UEID (or within a first group) have paging message in the PO, and bit1 indicates whether UE with even UEID (or within a second group) have paging message in the PO.

In some embodiments, the indication simply a wake-up indication—if the WUS is detected, the UE should monitor its upcoming PO. If the UE chooses to rely on WUS indications for PO monitoring, it is critical that WUS reception quality is sufficiently robust, since missed WUS will lead to a missed paging transmission. This solution may also be selected when most POs are empty. The WUS configuration, e.g., resource allocation and MCS selection, is then optimized to minimize the missed detection probability.

To reduce the risk of missed paging and/or reduce network resources associated with WUS transmission, the WUS may instead be defined as a don't-wake-up indication—if the WUS is detected, the UE needs not monitor its upcoming PO. Note that this approach may be selected, via network configuration, in some embodiments, or a fixed solution, in other embodiments.

This solution may be selected, for example, for scenarios or times when most POs are occupied. WUS configuration for this don't-wake-up signal may then be optimized to minimize the false alarm probability.

The interpretation of the indicator (e.g., as a wake-up or don't-wake-up signal) can be configured by the network as part of the paging WUS configuration through SI or RRC release, or it can be pre-defined in the standard. In one example, an explicit indicator can be a specific bit in a DCI, or a specific type of 0-bit payload DCI associated with a specific RNTI for paging WUS. Alternatively, an implicit indicator can be transmission of a specific signal, or a signal with a specific characteristic, e.g., a TRS with a specific scrambling code.

In embodiments where the paging WUS is DCI-based, additional commands, such as the time-frequency resource allocation of paging PDSCH can also be included in the same DCI. In this case, the DCI size, payload and its content including configuration of specific bitfields for specific operations can be done through higher layer signaling.

Common and Group WUS

The WUS may apply to all UEs whose POs fall between the current and next SSB, in some embodiments. Alternatively, the WUS may apply to a subgroup of such UEs, where subgroup index or indices are embedded in the WUS. Various grouping criteria are possible, e.g. UE ID-based, operational criteria (e.g. mobility), or other criteria specified in the standard.

Grouping may be indicated via payload contents in encoded transmission (e.g., DCI) or via sequence selection otherwise (SSB-like, RS, or special-purpose signals).

The grouping info embedded in WUS may reflect the grouping info conveyed in the group paging (PDCCH grouping) solution that is embedded, e.g., in the DCI or via a bitmap or a group-specific P-RNTI. It may also have a different granularity, e.g., coarser where group indication in WUS may invoke PDCCH monitoring for multiple groups, including some groups that are not paged.

WUS Configuration Info Provision

The network may signal the presence of the WUS, as well as information relevant to grouping, in the SI, in some embodiments. In one class of embodiments, WUS configuration may be provided in SI (e.g., RMSI, OSI, SIBn). Configuration info may include DCI format, RS code/sequence, TRS configuration, offset, SS; T/F location, etc.

WUS configuration info may also include the current WUS polarity. In one embodiment, the NW may signal WUS indication="wake up" if paging is infrequent (low PO occupancy) and WUS indication="sleep on" if a large fraction of POs are occupied and/or if maximal paging robustness is desired."

WUS activation indication may be explicit, via an indicator bit in the SI, or implicit through presence or absence of configuration info in SI. It can also be based on Layer 1 (L1) indications, e.g., the current paging DCI can activate/deactivate idle mode WUS.

In another class of embodiments, WUS may be provided only to UEs that last connected in the camping cell. Configuration info may be provided via dedicated RRC while the UE is in connected mode.

In another example, the idle mode WUS configuration is part of the RRC release message.

In another example, the idle mode WUS is only valid for a specific amount of time, determined by a validity timer. The validity timer can be in units of slots, POs, milliseconds. The network may further configure the UE with specific indications to extend or stop the validity timer. For example, reception of idle mode WUS may extend the validity timer, or an indication, e.g., in paging DCI, can stop the timer.

In some embodiments, the network may further provide a link quality limit for WUS reception. Camping UEs whose link quality exceeds the threshold are allowed to rely on WUS, while other UEs shall monitor the PDCCH in their POs.

UE Aspects

In the embodiments discussed below, a scenario is considered where the UE has received a paging WUS configuration based on one or more of the methods described above.

In one aspect, the UE chooses a reception strategy for SSB and WUS reception. In some embodiments, the UE may collect samples of SSB and WUS, perform time-frequency synchronization based on SSB, and use the obtained time-frequency correction to correct time-frequency offsets in WUS samples before signal detection. If a WUS is detected, the UE may proceed to monitor the upcoming PO.

In another aspect, the UE can determine whether it is advantageous to monitor the WUS and, based on WUS detection, subsequently monitor PDCCH or omit WUS monitoring and always monitor PDCCH. In some embodiments, for example, the UE estimates the rate or probability of receiving a WUS indication, e.g., which fraction f ($0<f<1$) of POs are preceded by a WUS. It also estimates Ps, the power saved from omitting PDCCH/PDSCH monitoring (omitting light sleep and paging reception, blue areas above) and Pa, additional power spent on WUS monitoring (e.g., operation with a wider-BW receiver during SSB reception). If the additional power spent exceeds the power saved, $Pa>f\cdot Ps$, the UE may decide to omit WUS monitoring and always monitor paging PDCCH.

In another aspect, the UE may determine the bandwidth during SSB+WUS monitoring. If the WUS may be transmitted at multiple bandwidth (e.g., different frequency-span of an RS sequence or different aggregation level of PDCCH), the UE may limit its WUS bandwidth, based on its downlink signal-to-interference-plus-noise ratio (SINR). If the downlink quality is high, the UE may choose to receive only a fraction of the total WUS bandwidth, to limit the receiver bandwidth and thus save power. The UE determines the required bandwidth based on the actual SINR estimate (e.g., from SSB or CSI-RS measurement) and estimates required reception SINR In yet another aspect, the UE may, based on its SINR estimate, determine its WUS detection reliability. If the reliability is below a threshold, the UE may omit WUS monitoring and always monitor paging signaling directly.

Additional Aspects

In scenarios with low paging load, if one PO per SSB period (e.g., 20 milliseconds, every second frame) is sufficient, the network may align the POs with SSBs and enable PO monitoring with a minor energy consumption overhead for UEs. WUS is not required in this scenario. Thus, a network node may determine, based on an estimate of paging load, to use only a single paging opportunity per SSB and, in response to this determination, align each PO with a corresponding SSB. The network node may further configure one or more wireless devices to monitor the paging opportunities in conjunction with the SSBs.

In an alternative embodiment, the WUS is based on a paging DCI transmitted earlier along the SSB. In this case, the WUS paging can either replace the paging DCI, or indicate a subset of it, e.g., a zero bit payload DCI associated with P-RNTI, or a function of P-RNTI, or any other paging related RNTI, e.g. a group P-RNTI, where a group of UEs are associated with a specific paging RNTI. Alternatively, the payload may be configured by the NW with a bitfield indicating which UEs in a corresponding POs should monitor paging. In case the WUS paging replaces the paging DCI, the indications regarding the PDSCH resource allocation also includes in the WUS for paging, and thus the UE just need to wake up to buffer paging PDSCH if it has received the WUS paging.

Methods and Apparatuses

Following are descriptions of specific apparatuses and generalized methods reflecting embodiments of the techniques described above. It should be appreciated that while the description below may in some instances use generalized language or terminology that varies from the examples and description above, it is intended that all of the techniques described above are encompassed by the methods described below. Thus, minor variations in terminology should be understood as being equivalent to or encompassing similar terms used above, depending on the context.

Figure 9:
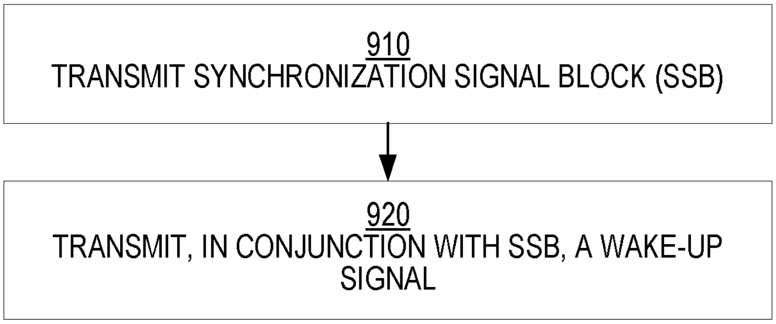
FIG. 9 is a process flow diagram illustrating an example method carried out by a network node.

First, FIG. 9 illustrates an example method, according to several of the techniques described above, as implemented in in a network node configured to communicate wirelessly with wireless devices. As shown at block 910, the method comprises transmitting a synchronization signal block (SSB) comprising one or more synchronization signals. As shown at block 920, the method further comprises transmitting a wake-up signal (WUS), the WUS indicating whether a wireless device or group of wireless devices should monitor a physical channel during at least one paging opportunity associated with the WUS transmission, wherein this transmitting of the WUS comprises transmitting the WUS in conjunction with the SSB.

Transmitting the WUS in conjunction with the SSB means that the WUS is closely associated with the SSB, in such a way that little or no extra overhead is associated with receiving the WUS along with the SSB, as compared to receiving the SSB alone. This extra overhead may come from using an extended bandwidth to receive both signals, in some embodiments. As discussed above, this transmitting of the WUS in conjunction with the SSB may comprise transmitting the WUS in at least some of the same symbols in which the SSB is transmitted. Thus, the WUS may partially or completely overlap the SSB, in time. In these embodiments, transmitting the WUS may comprise frequency multiplexing the WUS with the SSB. In some embodiments, transmitting the WUS in conjunction with the SSB may comprise transmitting the WUS in one or more symbols immediately adjacent in time to symbols in which the SSB is transmitted. In these embodiments, the WUS may or may not be frequency multiplexed with respect to the SSB.

In some embodiments, the WUS may carry a payload of one or more bits, and may comprise an index identifying a group of wireless devices. In some embodiments, transmitting the WUS may comprise selecting one of a plurality of search spaces in which to transmit the WUS, each search space corresponding to a respective group of wireless devices. Thus, the selected search space identifies a group of wireless devices to which the WUS is targeted.

As was discussed above, the WUS may be interpreted, in some embodiments, as an indication that a wireless device or group of wireless devices should monitor the physical channel during the at least one of the associated paging opportunities. In other embodiments, the WUS is instead interpreted to indicate that the wireless device or group of wireless devices need not monitor the physical channel during the at least one paging opportunity associated with the WUS transmission.

The at least one paging opportunity associated with the WUS may include all predetermined paging opportunities between the SSB and a following SSB, in some embodiments. In some embodiments, the at least one paging opportunity associated with the WUS comprises two or more paging opportunities, and the WUS comprises two or more respective bits or other indications indicating whether each paging opportunity should be monitored.

In various embodiments, the WUS may take the form of any of the following: a Physical Downlink Control Channel (PDCCH) message; a predetermined sequence-based signal; a predetermined reference signal; a synchronization signal; a channel-state information reference signal (CSI-RS); and a tracking reference signal (TRS).

Figure 10:
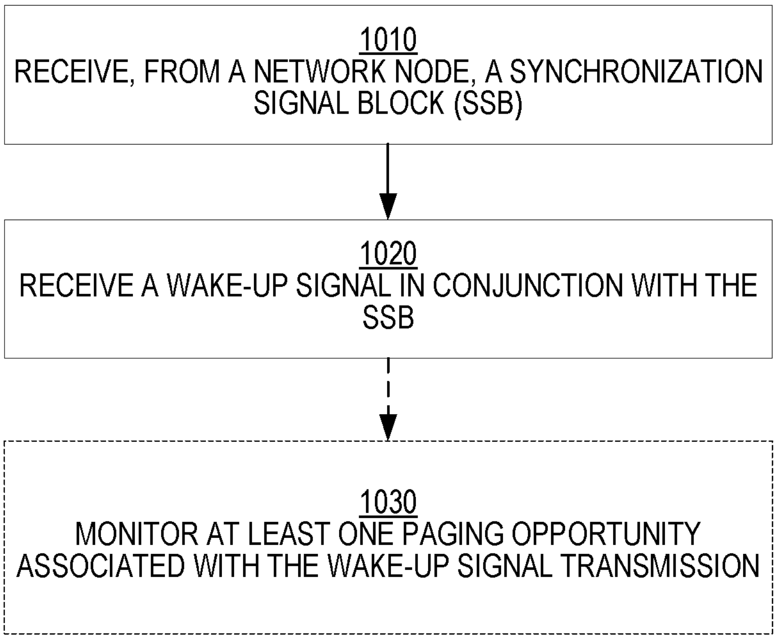
FIG. 10 is a process flow diagram illustrating an example method carried out by a wireless device.

FIG. 10 illustrates an example method as implemented in a wireless device, in accordance with several of the techniques described herein. This method may be understood as being complementary to the method shown in FIG. 9.

As shown at block 1010, the method illustrated in FIG. 10 includes the step of receiving, from a network node, a synchronization signal block (SSB) comprising one or more synchronization signals. The wireless device may be operating in an idle mode or inactive mode when it performs this receiving. As shown at block 1020, the method further comprises receiving a wake-up signal (WUS), the WUS indicating whether the wireless device should monitor a physical channel during at least one paging opportunity associated with the WUS transmission. This WUS is received in conjunction with the SSB.

Receiving the WUS in conjunction with the SSB means that the WUS is closely associated with the SSB, in such a way that little or no extra overhead is associated with receiving the WUS along with the SSB, as compared to receiving the SSB alone. This extra overhead may come from using an extended bandwidth to receive both signals, in some embodiments. In many embodiments, receiving the WUS in conjunction with the SSB means that the WUS and SSB are both received during a single "awake" time or "light sleep" time, i.e., where the wireless device's receiver circuitry is not transitioned to a different sleep state between receiving the WUS and SSB. In some embodiments, receiving the WUS in conjunction with the SSB comprises receiving the WUS in at least some of the same symbols in which the SSB is transmitted. In some of these embodiments, the WUS is frequency multiplexed with the SSB. In some embodiments, receiving the WUS in conjunction with the SSB comprises receiving the WUS in one or more symbols immediately adjacent in time to symbols in which the SSB is transmitted.

In some embodiments, the WUS may comprise a payload of one or several bits. This payload may comprise, for example, an index identifying a group of wireless devices that includes the wireless device. In some embodiments, receiving the WUS may comprise selecting one of a plurality of search spaces in which to receive the WUS, where the selected search space corresponds to a group of wireless devices that includes the wireless device.

In some instances of the method shown in FIG. 10, the WUS indicates that the wireless device or group of wireless devices should monitor the physical channel during the at least one paging opportunity associated with the WUS transmission. In these instances, the method may further comprises monitoring the at least one paging opportunity associated with WUS transmission. This is shown at block 1030. In other embodiments or instances, the WUS may indicate that the wireless device need not monitor the physical channel during the at least one paging opportunity associated with the WUS transmission.

The at least one paging opportunity associated with the WUS may include all predetermined paging opportunities between the SSB and a following SSB, in some embodiments. In some embodiments, the at least one paging opportunity associated with the WUS comprises two or more paging opportunities, and the WUS comprises two or more respective bits or other indications indicating whether each paging opportunity should be monitored.

As was the case with the method shown in FIG. 9, in various embodiments, the WUS may take the form of any of the following: a Physical Downlink Control Channel (PDCCH) message; a predetermined sequence-based signal; a predetermined reference signal; a synchronization signal;

a channel-state information reference signal (CSI-RS); and a tracking reference signal (TRS).

Additional Reference Signals for UEs in Non-Connected States

As was also briefly mentioned above, in NR, a UE in RRC_CONNECTED state is provided with periodic, semi-periodic, and/or aperiodic CSI-RS/TRS, which are also referred to as "tracking reference signals" (TRS) or "CSI RS for tracking." The UE uses these RS to measure channel quality and/or to adjust the UE's time and frequency synchronization with the serving network node (e.g., gNB). When a UE transitions to a non-connected state (i.e., RRC_IDLE or RRC_INACTIVE), the network may or may not turn off such RSs for that UE. Nevertheless, the non-connected UE is not aware of whether the connected-state RS are also available in the non-connected state. This uncertainty can create various problems, issues, and/or difficulties for NR UEs operating in a non-connected state. This is discussed in more detail below, after the following description of NR network architectures and radio interface.

Figure 11:
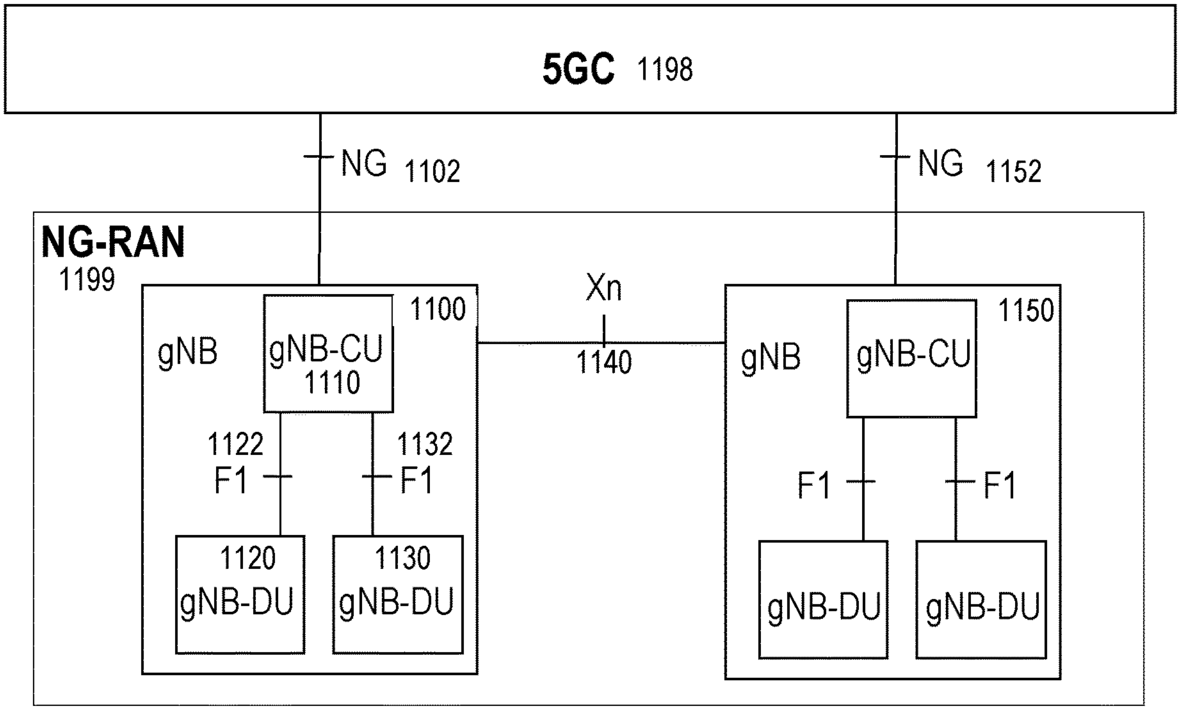
FIGS. 11 and 12 illustrate two high-level views of an exemplary 5G/NR network architecture.

FIG. 11 illustrates a high-level view of the 5G network architecture, consisting of a Next Generation RAN (NG-RAN) 1199 and a 5G Core (5GC) 1198. NG-RAN 1199 can include a set of gNodeB's (gNBs) connected to the 5GC via one or more NG interfaces, such as gNBs 1100, 1150 connected via interfaces 1102, 1152, respectively. In addition, the gNBs can be connected to each other via one or more Xn interfaces, such as Xn interface 1140 between gNBs 1100 and 1150. With respect the NR interface to UEs, each of the gNBs can support frequency division duplexing (FDD), time division duplexing (TDD), or a combination thereof.

NG-RAN 1199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 11 (and described in 3GPP TS 38.301 and 3GPP TR 38.801) include a central (or centralized) unit (CU or gNB-CU) and one or more distributed (or decentralized) units (DU or gNB-DU). For example, gNB 1100 includes gNB-CU 1110 and gNB-DUs 1120 and 1140. CUs (e.g., gNB-CU 1110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 1122 and 1132 shown in FIG. 11. The gNB-CU and connected gNB-DUs are only visible to other gNBs and the 5GC as a gNB. In other words, the F1 interface is not visible beyond gNB-CU.

Figure 12:
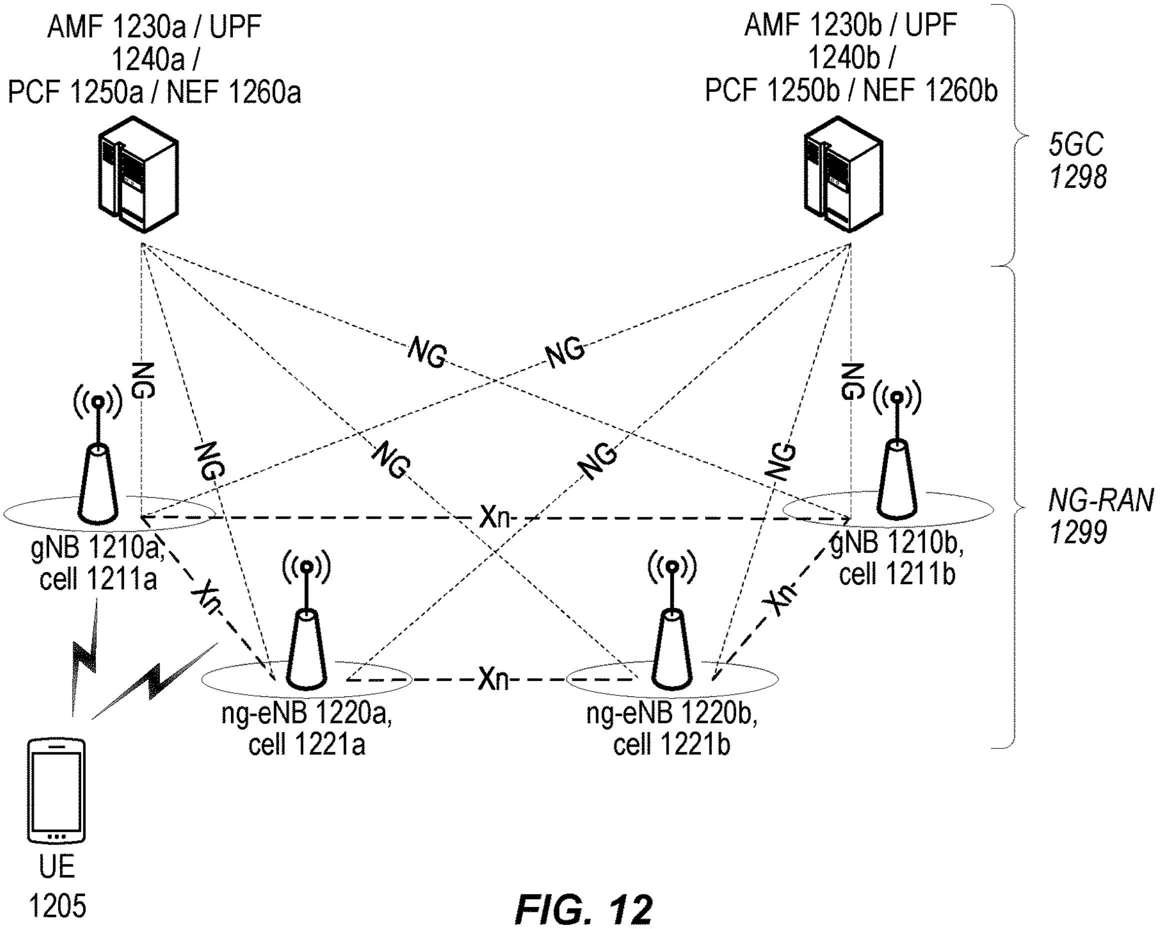

FIG. 12 shows a high-level view of an exemplary 5G network architecture, including a Next Generation Radio Access Network (NG-RAN) 1299 and a 5G Core (5GC) 1298. As shown in the figure, NG-RAN 1299 can include gNBs 1210 (e.g., 1210*a,b*) and ng-eNBs 1220 (e.g., 1220*a, b*) that are interconnected with each other via respective Xn interfaces. The gNBs and ng-eNBs are also connected via the NG interfaces to 5GC 1298, more specifically to the AMF (Access and Mobility Management Function) 1230 (e.g., AMFs 1230*a,b*) via respective NG-C interfaces and to the UPF (User Plane Function) 1240 (e.g., UPFs 1240*a,b*) via respective NG-U interfaces. Moreover, the AMFs 1230*a,b* can communicate with one or more policy control functions (PCFs, e.g., PCFs 1250*a,b*) and network exposure functions (NEFs, e.g., NEFs 1260*a,b*).

Each of the gNBs 1210 can support the NR radio interface including frequency division duplexing (FDD), time division duplexing (TDD), or a combination thereof. In contrast, each of ng-eNBs 1220 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 1211*a-b* and 1221*a-b* shown as exemplary in FIG. 12. As mentioned above, the gNBs and ng-eNBs can also use various directional beams to provide coverage in the respective cells. Depending on the particular cell in which it is located, a UE 1205 can communicate with the gNB or ng-eNB serving that particular cell via the NR or LTE radio interface, respectively.

Figure 13:
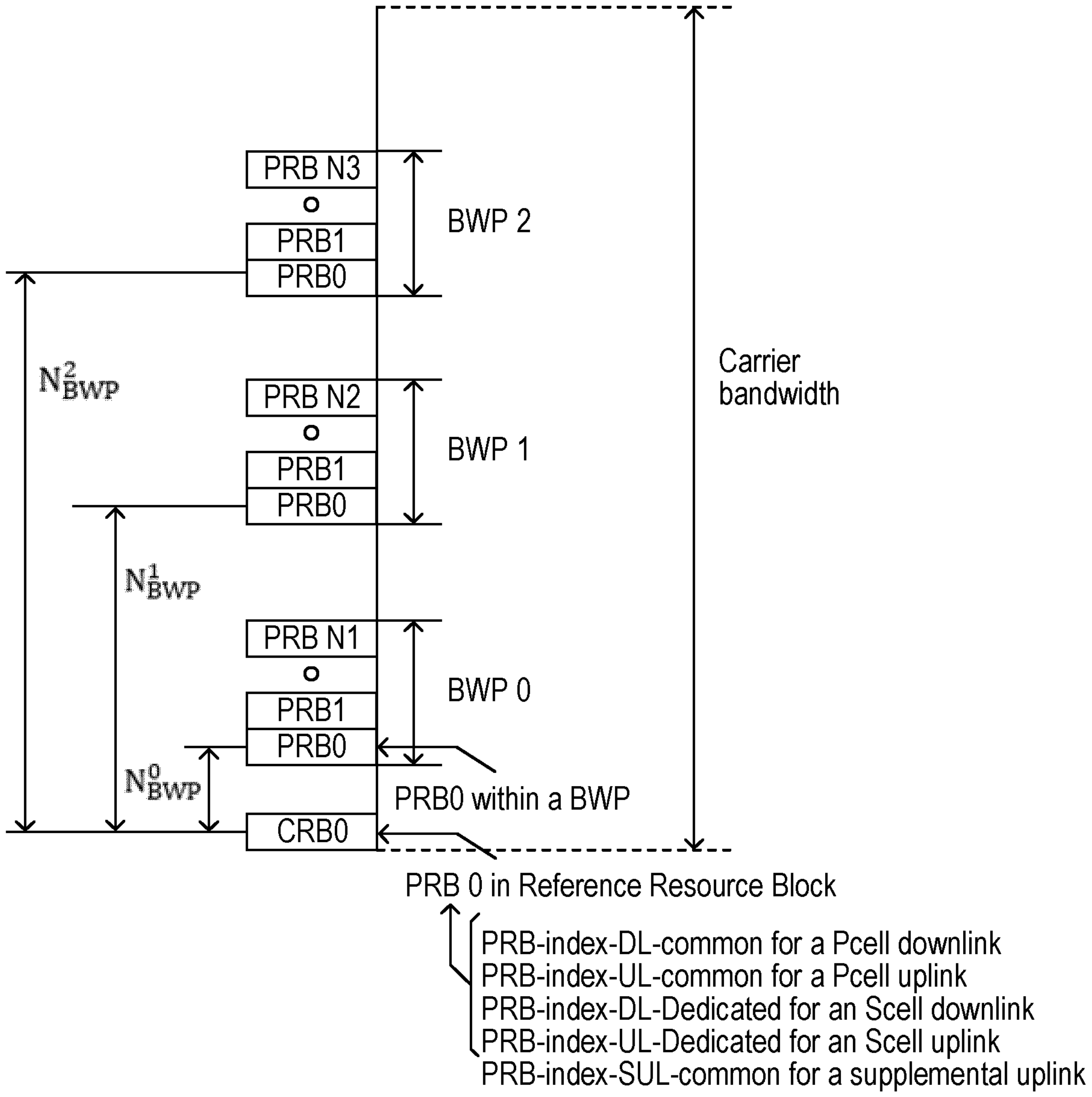
FIG. 13 shows an exemplary frequency-domain configuration for a 5G/NR UE.

FIG. 13 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 13, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 13), such that a configured BWP may start at a CRB greater than zero. CRB0 can be identified by one of the following parameters provided by the network, as further defined in 3GPP TS 38.211 section 4.4:

- PRB-index-DL-common for DL in a primary cell (PCell, e.g., PCell or PSCell);
- PRB-index-UL-common for UL in a PCell;
- PRB-index-DL-Dedicated for DL in a secondary cell (SCell);
- PRB-index-UL-Dedicated for UL in an SCell; and
- PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 13, BWPs 0-2 start at CRBs $N^0_{BWP}$, $N^1_{BWP}$, and $N^2_{BWP}$, respectively. Within a BWP, PRBs are defined and numbered in the frequency domain from 0 to $$N_{BWPi}^{size} - 1,$$

where i is the index of the particular BWP for the carrier. In the arrangement shown in FIG. 13, BWPs 0-2 include PRBs 0 to N1, N2, and N3, respectively.

Similar to LTE, each NR resource element (RE) corresponds to one OFDM subcarrier during one OFDM symbol interval. NR supports various SCS values Δf=(15×2) kHz, where p E (0, 1, 2, 3, 4) are referred to as "numerologies." Numerology μ=0 (i.e., Δf=15 kHz) provides the basic (or reference) SCS that is also used in LTE. The symbol duration, cyclic prefix (CP) duration, and slot duration are inversely related to SCS or numerology. For example, there is one (1-ms) slot per subframe for Δf=15 kHz, two 0.5-ms slots per subframe for Δf=30 kHz, etc. In addition, the maximum carrier bandwidth is directly related to numerology according to 2*50 MHz. Table 1 below summarizes the supported NR numerologies and associated parameters. Different DL and UL numerologies can be configured by the network.

TABLE 1

| μ | Δf = $2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

FIG. 14 shows an exemplary time-frequency resource grid for an NR slot. As illustrated in FIG. 14, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

FIG. 15A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 15B shows an exemplary mini-slot arrangement in which the mini-slot begins in the third symbol of the slot and is two symbols in duration. Applications of mini-slots include unlicensed spectrum and latency-critical transmission (e.g., URLLC). However, mini-slots are not service-specific and can also be used for eMBB or other services.

FIG. 15C shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 15C, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

Figure 16A:
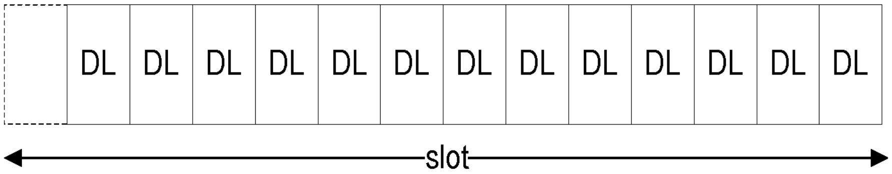
FIGS. 16A-16D, shows various exemplary uplink-downlink (UL-DL) arrangements within an NR slot.
Figure 16B:
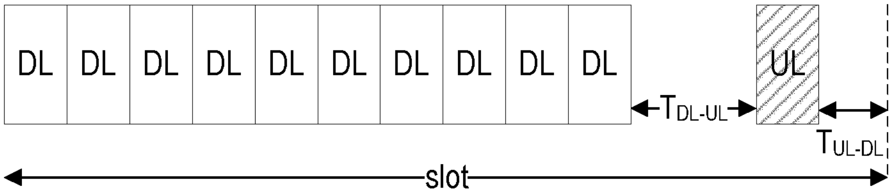
Figure 16C:
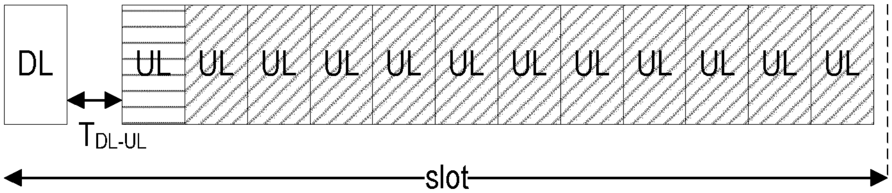
Figure 16D:
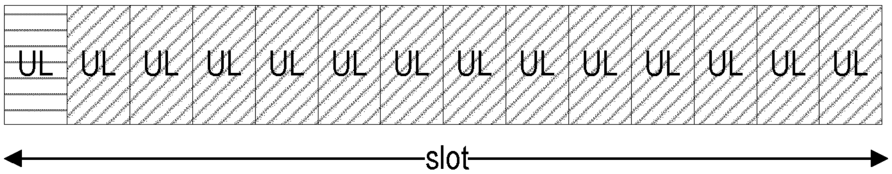

An NR slot can also be arranged with various combinations of UL and DL symbols. FIG. 16, which includes FIGS. 16A-16D, shows various exemplary UL-DL arrangements within an NR slot. For example, FIG. 16A shows an exemplary DL-only (i.e., no UL transmission) slot with transmission starting in symbol 1, i.e., a "late start." FIG. 16B shows an exemplary "DL-heavy" slot with one UL symbol. Moreover, this exemplary slot includes guard periods before and after ($T_{UL-DL}$) the UL symbol to facilitate change of transmission direction. FIG. 16C shows an exemplary "UL-heavy" slot with a single UL symbol that can carry DL control information (i.e., the initial UL symbol, as indicated by a different shading style) and a guard period ($T_{DL-UL}$) after the DL slot. FIG. 16D shows an exemplary UL-only slot with on-time start in symbol 0, with the initial UL symbol also usable to carry DL control information.

A CORESET includes multiple RBs (i.e., multiples of 12 REs) in the frequency domain and 1-3 OFDM symbols in the time domain, as further defined in 3GPP TS 38.211 § 7.3.2.2. The smallest unit used for defining CORESET is resource element group (REG), which spans one PRB in frequency and one OFDM symbol in time. A CORESET is functionally similar to the control region in LTE subframe. In NR, however, each REG consists of all 12 REs of one OFDM symbol in a RB, whereas an LTE REG includes only four REs. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

In addition to PDCCH, each REG in a CORESET contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such, DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (υ) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2.

When a UE is in RRC_IDLE or RRC_INACTIVE states, it monitors PDCCH periodically to check for scheduling of paging requests that will be transmitted on PDSCH. A paging occasion (PO) is a set of S consecutive PDCCH monitoring occasions (MOs) in which a paging DCI can be received, where S represents a number of transmitted SSBs. In other words, the $K^{th}$ PDCCH MO for paging in a PO corresponds to the $K^{th}$ transmitted SSB. A paging frame (PF) is one 10-ms radio frame and may contain zero or more POs for a UE, as explained in more detail below.

In between POs, the UE goes to sleep to reduce energy consumption. This sleep-wake cycle is known as "discontinuous reception" or DRX. The amount of UE power savings is related to wake period ("DRX ON") duration as a fraction of the entire DRX duty cycle. Within a particular cell, the network may configure a certain number of POs per DRX cycle (e.g., during a cycle of 1.28 seconds). This information is broadcast in system information. When a UE registers with the 5GC, it is assigned a UE identity called 5G-S-TMSI. This identity is used by the UE and network in predetermined formulas to derive a system frame number (SFN) of the UE's assigned PF (i.e., within a DRX cycle) and index i_s of assigned PO(s) within the assigned PF, as follows:

$$(\text{SFN}+\text{PF\_offset}) \bmod T=(T \text{ div } N)*(\text{UE\_ID} \bmod N),$$

$$i\_s=\text{floor}(\text{UE\_ID}/N) \bmod Ns,$$

where:
T=UE DRX cycle;
N=total number of PFs in T;
Ns=total number of POs in each PF;
PF_offset=offset used for PF determination; and
UE_ID=5G-S-TMSI mod 1024.

In case the network wants to reach the UE (e.g., for incoming traffic), it pages the UE during these configured POs. The network initially tries to page the UE in its last known location (i.e., cell), but in case the UE does not respond to this initial paging, the network typically repeats the paging message in an expanded paging area (e.g., covering more cells). The paging message from the network can be initiated by the 5GC or the NG-RAN. More specifically, 5GC-Initiated paging is used to reach the UEs in RRC_IDLE state while RAN-Initiated paging (e.g., by serving gNB) is used to reach UEs in RRC_INACTIVE state.

Several UEs can be assigned to the same PO. Each of the assigned UEs that detects a paging DCI (e.g., DCI 10 with P-RNTI-scrambled CRC) then must receive the PDSCH and decode its payload to determine whether their UE identity is present, which indicates that the paging message was intended for them. In general, the PDSCH payload can carry up to 32 identities, such that up to 32 UEs can be paged during the same PO. More UEs will be assigned to each available PO as the number of UEs in non-connected states in a cell increases. The more UEs present in a cell and assigned to the same PO, the more energy is wasted by UEs decoding PDSCH during false paging.

An NR UE can be configured by the network with one or more NZP (non-zero power) CSI-RS resource set configurations by the higher-layer (e.g., RRC) information elements (IEs) NZP-CSI-RS-Resource, NZP-CSI-RS-ResourceSet. and CSI-ResourceConfig. Exemplary ASN.1 data structures representing these IEs are shown in FIGS. 17A-17C, respectively.

In addition, FIGS. 17D-17E show exemplary ASN.1 data structures representing CSI-ResourcePeriodicityAndOffset and CSI-RS-ResourceMapping fields that are included in the NZP-CSI-RS-Resource IE shown in FIG. 17A. The CSI-ResourcePeriodicityAndOffset field is used to configure a periodicity and a corresponding offset for periodic and semi-persistent CSI resources, and for periodic and semi-persistent CSI reporting on PUCCH. Both periodicity and the offset are given in numbers of slots. For example, periodicity value "slots4" corresponds to four (4) slots, "slots5" corresponds to five (5) slots, etc. The CSI-RS-ResourceMapping field is used to configure the mapping of a CSI-RS resource in time and frequency domains (i.e., to REs).

FIG. 18 shows an exemplary ASN.1 data structure for an RRC CSI-RS-ResourceConfig-Mobility IE, by which an NR network can configure a UE for CSI-RS-based radio resource management (RRM) measurements. In addition, Tables 2-6 below further define various fields included in respective ASN.1 data structures shown in FIGS. 17A-17C, 17E, and 18. These fields are described in more detail in the discussion following the tables.

TABLE 2

| | Description |
|---|---|
| Field Name | |
| periodicityAndOffset | Periodicity and slot offset sl1 corresponds to a periodicity of 1 slot, sl2 to a periodicity of two slots, and so on. The corresponding offset is also given in number of slots (see 3GPP TS 38.214 clause 5.2.2.3.1). |
| powerControlOffset | Power offset of PDSCH RE to NZP CSI-RS RE. Value in dB (see 3GPP TS 38.214 clauses 5.2.2.3.1 and 4.1). |
| powerControlOffsetSS | Power offset of NZP CSI-RS RE to SS RE. Value in dB (see 3GPP TS 38.214 clause 5.2.2.3.1). |
| qcl-InfoPeriodicCSI-RS | For a target periodic CSI-RS, contains a reference to one TCI-State in TCI-States for providing the QCL source and QCL type. For periodic CSI-RS, the source can be SSB or another periodic-CSI-RS. Refers to the TCI-state which has this value for tci-StateId and is defined in tci-StatesToAddModList in the PDSCH-Config included in the BWP-Downlink corresponding to the serving cell and to the DL BWP to which the resource belongs to (see 3GPP TS 38.214 clause 5.2.2.3.1). |
| scramblingID | Scrambling ID (see 3GPP TS 38.214 clause 5.2.2.3.1). |
| resourceMapping | OFDM symbol location(s) in a slot and subcarrier occupancy in a PRB of the CSI-RS resource. |
| Conditional Presence | |
| Periodic | The field is optionally present, Need M, for periodic NZP-CSI-RS-Resources (as indicated in CSI-ResourceConfig). The field is absent otherwise |
| PeriodicOrSemiPersistent | The field is mandatory present, Need M, for periodic and semi-persistent NZP-CSI-RS-Resources (as indicated in CSI-ResourceConfig). The field is absent otherwise. |

TABLE 3

| Field Name | Description |
|---|---|
| aperiodicTriggeringOffset | Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0. |
| nzp-CSI-RS-Resources | NZP-CSI-RS-Resources associated with this NZP-CSI-RS resource set (see 3GPP TS 38.214 clause 5.2). For CSI, there are at most 8 NZP CSI RS resources per resource set |
| repetition | Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see 3GPP TS 38.214 clause 5.2.2.3.1 and 5.1.6.1.2). Can only be configured for CSI-RS resource sets which are associated with CSI-ReportConfig with report of L1 RSRP or "no report" |

TABLE 3-continued

| Field Name | Description |
|---|---|
| trs-Info | Indicates that the antenna port for all NZP-CSI-RS resources in the CSI-RS resource set is same. If the field is absent or released the UE applies the value "false" (see 3GPP TS 38.214 clause 5.2.2.3.1). |

TABLE 4

| Field Name | Description |
|---|---|
| bwp-Id | The DL BWP which the CSI-RS associated with this CSI-ResourceConfig are located in (see 3GPP TS 38.214 clause 5.2.1.2). |
| csi-ResourceConfigId | Used in CSI-ReportConfig to refer to an instance of CSI-ResourceConfig |
| csi-RS-ResourceSetList | Contains up to maxNrofNZP-CSI-RS-ResourceSetsPerConfig resource sets if ResourceConfigType is 'aperiodic' and 1 otherwise (see 3GPP TS 38.214 clause 5.2.1.2). |
| csi-SSB-ResourceSetList | List of SSB resources used for beam measurement and reporting in a resource set (see 3GPP TS 38.214). |
| resourceType | Time domain behavior of resource configuration (see 3GPP TS 38.214 clause 5.2.1.2). It does not apply to resources provided in the csi-SSB-ResourceSetList. |

TABLE 5

| Field Name | Description |
|---|---|
| cdm-Type | Code division multiplexing (CDM) type (see 3GPP TS 38.214 clause 5.2.2.3.1). |
| density | Density of CSI-RS resource measured in RE/port/PRB (see TS 38.211 [16], clause 7.4.1.5.3). Values 0.5 (dotS), 1 (one) and 3 (three) are allowed for X = 1, values 0.5 (dot5) and 1 (one) are allowed for X = 2, 16, 24 and 32, value 1 (one) is allowed for X = 4, 8, 12. For density = 1/2, includes 1-bit indication for RB level comb offset indicating whether odd or even RBs are occupied by CSI-RS. |
| firstOFDMSymbolIn-TimeDomain2 | Time domain allocation within a physical resource block. See TS 38.211 [16], clause 7.4.1.5.3. |
| firstOFDMSymbolIn-TimeDomain | Time domain allocation within a physical resource block. The field indicates the first OFDM symbol in the PRB used for CSI-RS. See TS 38.211 [16], clause 7.4.1.5.3. Value 2 is supported only when DL-DMRS-typeA-pos equals 3. |
| freqBand | Wideband or partial band CSI-RS, (see TS 38.214 [19], clause 5.2.2.3.1) |
| frequencyDomain-Allocation | Frequency domain allocation within a physical resource block in accordance with TS 38.211 [16], clause 7.4.1.5.3. The applicable row number in table 7.4.1.5.3-1 is determined by the frequencyDomainAllocation for rows 1, 2 and 4, and for other rows by matching the values in the column Ports, Density and CDMtype in table 7.4.1.5.3-1 with the values of nrofPorts, cdm-Type and density below and, when more than one row has the 3 values matching, by selecting the row where the column (k bar, 1 bar) in table 7.4.1.5.3-1 has indexes for k ranging from 0 to 2*n − 1 where n is the number of bits set to 1 in frequencyDomainAllocation. |
| nrofPorts | Number of ports (see TS 38.214 [19], clause 5.2.2.3.1) |

TABLE 6

| Field Name | Description |
|---|---|
| csi-rs-ResourceList-Mobility | List of CSI-RS resources for mobility. The maximum number of CSI-RS resources that can be configured per frequency layer depends on the configuration of associatedSSB (see 3GPP TS 38.214 clause 5.1.6.1.3). |
| density | Frequency domain density for the 1-port CSI-RS for L3 mobility Corresponds to L1 parameter 'Density'. |
| nrofPRBs | Allowed size of the measurement BW in PRBs Corresponds to L1 parameter 'CSI-RS-measurementBW-size'. |

TABLE 6-continued

| Field Name | Description |
|---|---|
| startPRB | Starting PRB index of the measurement bandwidth Corresponds to L1 parameter 'CSI-RS-measurement-BW-start' (see FFS_Spec, section FFS_Section) FFS_Value: Upper edge of value range unclear in RAN1. |
| csi-RS-CellList-Mobility | List of cells |
| refServCellIndex | Indicates the serving cell providing the timing reference for CSI-RS resources without associatedSSB. The field may be present only if there is at least one CSI-RS resource configured without associatedSSB. In case there is at least one CSI-RS resource configured without associatedSSB and this field is absent, the UE shall use the timing of the PCell. The CSI-RS resources and the serving cell indicated by refServCellIndex for timing reference should be located in the same band. |
| subcarrierSpacing | Subcarrier spacing of CSI-RS. Only the values 15, 30 or 60 kHz (<6 GHz), 60 or 120 kHz (>6 GHz) are applicable. |
| associatedSSB | If this field is present, the UE may base the timing of the CSI-RS resource indicated in CSI-RS-Resource-Mobility on the timing of the cell indicated by the cellId in the CSI-RS-CellMobility. In this case, the UE is not required to monitor that CSI-RS resource if the UE cannot detect the SS/PBCH block indicated by this associatedSSB and cellId. If this field is absent, the UE shall base the timing of the CSI-RS resource indicated in CSI-RS-Resource-Mobility on the timing of the serving cell indicated by refServCellIndex. In this case, the UE is required to measure the CSI-RS resource even if SS/PBCH block(s) with cellId in the CSI-RS-CellMobility are not detected. CSI-RS resources with and without associatedSSB may be configured in accordance with the rules in 3GPP TS 38.214 clause 5.1.6.1.3. |
| csi-RS-Index | CSI-RS resource index associated to the CSI-RS resource to be measured (and used for reporting). |
| firstOFDMSymbol-InTimeDomain | Time domain allocation within a physical resource block. The field indicates the first OFDM symbol in the PRB used for CSI-RS, see 3GPP TS 38.211 clause 7.4.1.5.3. Value 2 is supported only when DL-DMRS-typeA-pos equals 3. |
| frequencyDomain-Allocation | Frequency domain allocation within a physical resource block in accordance with 3GPP TS 38.211 clause 7.4.1.5.3 including table 7.4.1.5.2-1. The number of bits that may be set to one depend on the chosen row in that table. For the choice "other", the row can be determined from the parameters below and from the number of bits set to 1 in frequencyDomainAllocation. |
| isQuasiColocated | The CSI-RS resource is either QCL'd not QCL'd with the associated SSB in spatial parameters (see 3GPP TS 38.214 clause 5.1.6.1.3. |
| sequenceGeneration-Config | Scrambling ID for CSI-RS (see 3GPP TS 38.211 clause 7.4.1.5.2). |
| slotConfig | Indicates the CSI-RS periodicity (in milliseconds) and for each periodicity the offset (in number of slots). When subcarrierSpacingCSI-RS is set to 15 kHZ, the maximum offset values for periodicities ms 4/ms 5/ ms 10/ms 20/ms 40 are 3/4/9/19/39 slots. When subcarrierSpacingCSI-RS is set to 30 kHZ, the maximum offset values for periodicities ms 4/ms 5/ms 10/ms 20/ms 40 are 7/9/19/39/79 slots. When subcarrierSpacingCSI-RS is set to 60 kHZ, the maximum offset values for periodicities ms 4/ms 5/ms 10/ms 20/ms 40 are 15/19/39/79/159 slots. When subcarrierSpacingCSI-RS is set 120 kHZ, the maximum offset values for periodicities ms 4/ms 5/ms 10/ms 20/ms 40 are 31/39/79/159/319 slots. |

Each NZP CSI-RS resource set consists of K≥1 NZP CSI-RS resources. The following parameters are included in the RRC IEs NZP-CSI-RS-Resource, CSI-ResourceConfig, and NZP-CSI-RS-ResourceSet for each CSI-RS resource configuration:

- nzp-CSI-RS-ResourceId determines CSI-RS resource configuration identity. This identifier can have any value from zero up to one less than the maximum number of configured NZP CSI-RS resources (maxNrofNZP-CSI-RS-Resources).
- nzp-CSI-RS-ResourceSetId determines CSI-RS resource set configuration identity. This identifier can have any value from zero up to one less than the maximum number of configured NZP CSI-RS resource sets (maxNrofNZP-CSI-RS-ResourceSets).
- CSI-RS-ResourceConfigId is used to identify a specific CSI-ResourceConfig. This identifier can have any value from zero up to one less than the maximum number of CSI-RS resource configurations (maxNrofCSI-RS-ResourceConfigurations).
- periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.
- resourceMapping defines the number of ports, CDM-type, and OFDM symbol and subcarrier occupancy of the CSI-RS resource within a slot that are given in 3GPP TS 38.211 clause 7.4.1.5.
- nrofPorts in resourceMapping defines the number of CSI-RS ports, where the allowable values are given in 3GPP TS 38.211 clause 7.4.1.5.
- density in resourceMapping defines CSI-RS frequency density of each CSI-RS port per PRB, and CSI-RS PRB offset in case of the density value of ½, where the allowable values are given in 3GPP TS 38.211 clause 7.4.1.5. For density ½, the odd/even PRB allocation indicated in density is with respect to the common resource block grid.

cdm-Type in resourceMapping defines CDM values and pattern, where the allowable values are given in 3GPP TS 38.211 clause 7.4.1.5.

powerControlOffset: the assumed ratio of PDSCH EPRE to NZP CSI-RS EPRE when UE derives CSI feedback and takes values in the range of [−8, 15] dB with 1 dB step size.

powerControlOffsetSS: the assumed ratio of NZP CSI-RS EPRE to SS/PBCH block EPRE.

scramblingID defines scrambling ID of CSI-RS with length of 10 bits.

BWP-Id in CSI-ResourceConfig defines which bandwidth part the configured CSI-RS is located in.

repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Clause 5.1.6.1.2. and can be configured only when the higher layer parameter reportQuantity associated with all the reporting settings linked with the CSI-RS resource set is set to 'cri-RSRP', 'cri-SINR' or 'none'.

qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.

trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement. Furthermore, the UE expects that all the CSI-RS resources of a resource set are configured with the same starting RB and number of RBs and the same cdm-type.

The bandwidth and initial common resource block (CRB) index of a CSI-RS resource within a BWP, as defined in 3GPP TS 38.211 clause 7.4.1.5, are determined based on the RRC-configured parameters nrofPRBs and startingPRB, respectively, within the CSI-FrequencyOccupation IE configured by the RRC parameterfreqBand within the CSI-RS-ResourceMapping IE. Both nrofPRBs and startingPRB are configured as integer multiples of four (4) RBs, and the reference point for startingPRB is CRB 0 on the common resource block grid. If $$startingRB < N_{BWP}^{start},$$

the UE shall assume that the initial CRB index of the CSI-RS resource is $$N_{initial\ RB} = N_{BWP}^{start},$$

otherwise $$N_{initial\ RB} = startingRB.\ \text{If}\ nrofRBs > N_{BWP}^{size} + N_{BWP}^{start} - N_{initial\ RB},$$

the UE assumes that the bandwidth of the CSI-RS resource is $$N_{CSI-RS}^{BW} = N_{BWP}^{size} + N_{BWP}^{start} - N_{initial\ RB}.$$

Otherwise, the UE assumes that $$N_{CSI-RS}^{BW} = nrofRBs.$$

In all cases, the UE expects that $$N_{CSI-RS}^{BW} \geq \min\left(24, N_{BWP}^{size}\right).$$

A UE in RRC_CONNECTED state receives from the network (e.g., via RRC) a UE-specific configuration of a NZP-CSI-RS-ResourceSet including the parameter trs-Info, described in the parameter list above. For NZP-CSI-RS-ResourceSet configured with the RRC parameter trs-Info set to "true", the UE shall assume the antenna port with the same port index of the configured NZP CSI-RS resources in the NZP-CSI-RS-ResourceSet is the same.

For frequency range 1 (FR1, e.g., sub-6 GHz), the UE may be configured with one or more NZP CSI-RS sets, where a NZP-CSI-RS-ResourceSet consists of four periodic NZP CSI-RS resources in two consecutive slots with two periodic NZP CSI-RS resources in each slot. If no two consecutive slots are indicated as DL slots by tdd-UL-DL-ConfigurationCommon or tdd-UL-DL-ConfigDedicated, then the UE may be configured with one or more NZP CSI-RS sets, where a NZP-CSI-RS-ResourceSet consists of two periodic NZP CSI-RS resources in one slot.

For frequency range 2 (FR2, e.g., above 6 GHz), the UE may be configured with one or more NZP CSI-RS sets, where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

In addition, a UE configured with NZP-CSI-RS-ResourceSet(s) including parameter trs-Info may have the CSI-RS resources configured as periodic, with all CSI-RS resources in the NZP-CSI-RS-ResourceSet configured with same periodicity, bandwidth and subcarrier location. As a second option, a UE configured with NZP-CSI-RS-ResourceSet(s) including parameter trs-Info may be configured with periodic CSI-RS resource in one set and aperiodic CSI-RS resources in a second set, with the aperiodic CSI-RS and periodic CSI-RS resource having the same bandwidth (with same RB location) and the aperiodic CSI-RS being "QCL-Type-A" and "QCL-TypeD" (where applicable) with respect to the periodic CSI-RS resources.

In this second option, for FR2, the UE expects that the scheduling offset between the last symbol of the PDCCH carrying the triggering DCI and the first symbol of the aperiodic CSI-RS resources is not smaller than the UE reported ThresholdSched-Offset. The UE shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

In addition, the UE expects not to be configured with any of the following:

a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured';

a CSI-ReportConfig with the higher layer parameter reportQuantity set to other than 'none' for aperiodic NZP CSI-RS resource set configured with trs-Info;

a CSI-ReportConfig for periodic NZP CSI-RS resource set configured with trs-Info; or a NZP-CSI-RS-ResourceSet configured both with trs-Info and repetition.

In addition, according to 3GPP TS 38.211 clause 7.4.1.5.3, each CSI-RS resource is configured by the higher layer parameter NZP-CSI-RS-Resource with the following restrictions:

the time-domain locations of the two CSI-RS resources in a slot, or of the four CSI-RS resources in two consecutive slots (which are the same across two consecutive slots), as defined by higher layer parameter CSI-RS-resourceMapping, is given by:

$l\in\{4,8\}$, $l\in\{5,9\}$, or $l\in\{6,10\}$ for FR1 and FR2; or $l\in\{0,4\}$, $l\in\{1,5\}$, lεE $\{2,6\}$, $l\in\{3,7\}$, $l\in\{7,11\}$, $l\in\{8,12\}$ or $l\in\{9,13\}$ for FR2.

a single port CSI-RS resource with density ρ=3 given by 3GPP TS 38.211 Table 7.4.1.5.3-1 and parameter density configured by CSI-RS-ResourceMapping.

the bandwidth of the CSI-RS resource, as given by the parameterfreqBand configured by CSI-RS-ResourceMapping, is the minimum of 52 and $$N_{BWP,i}^{size}\ RBs,$$

or is equal to $$N_{BWP,i}^{size}\ RBs.$$

For operation with shared spectrum channel access, freqBand configured by CSI-RS-ResourceMapping, is the minimum of 48 and $$N_{BWP,i}^{size}\ RBs,$$

or is equal to $$N_{BWP,i}^{size}\ RBs.$$

the UE is not expected to be configured with the periodicity of $2^{\mu}\times 10$ slots if the bandwidth of CSI-RS resource is larger than 52 RBs.

the periodicity and slot offset for periodic NZP CSI-RS resources, as given by the parameter periodicityAndOffset configured by NZP-CSI-RS-Resource, is one of $2^{\mu}X_p$ slots where $X_p$=10, 20, 40, or 80 and where p is the numerology of the BWP.

same powerControlOffset and powerControlOffsetSS given by NZP-CSI-RS-Resource value across all resources.

In NR, a UE in RRC_CONNECTED state is provided with periodic, semi-periodic, and/or aperiodic CSI-RS/TRS, which are also referred to as "tracking reference signals" (TRS) or "CSI RS for tracking." The UE uses these RS to measure channel quality and/or to adjust the UE's time and frequency synchronization with the UE's serving network node (e.g., gNB). As mentioned above, when a UE transitions to a non-connected state (i.e., RRC_IDLE or RRC_INACTIVE), the network may or may not turn off TRS that were available to the UE in RRC_CONNECTED state. As such, the non-connected UE is not aware of whether the connected-state RS are also available in the non-connected state.

As used herein, a "connected-state RS" is a RS that is transmitted at various occasions by the network but is conventionally and/or normally available for use only by UEs in RRC_CONNECTED state (or a state with similar properties) with an active connection to the network. UEs operating in the connected state can utilize such RS for various purposes, such as radio link monitoring (RLM). Examples of connected-state RS include CSI-RS, TRS, etc.

In conventional operation, however, a connected-state RS is not available to a UE while the UE is in a non-connected state (e.g., RRC_IDLE, RRC_INACTIVE, or a state with similar properties) without an active connection to the network. In particular, even when the network is transmitting the connected-state RS, they may be unavailable to the non-connected-state UEs because such UEs are unaware of the presence and/or configuration of the connected-state RS being transmitted by the network. As such, after a UE is informed about the presence and/or configuration of these connected-state RS, the UE can determine particular timeslots in which the connected-state RS are present, and receive the connected-state RS in these timeslots even while operating in the non-connected state.

In the present disclosure, the terms "presence," "activated," and "available" are used synonymously with respect to TRS; likewise, the terms "absence," "deactivated," and "unavailable" are used synonymously. Also, the term "additional RS" is used synonymously with "connected-state RS" (defined above), at least with respect to non-connected-state UEs.

However, indicating the presence of connected-state RS when they are available may require the network node to transmit the connected-state RS even when no connected-state UEs remain in the cell served by the network node. This can lead to unnecessary energy consumption by the network node. In addition, these unnecessary RS transmissions can interfere with transmissions in neighboring cells operating in overlapping frequencies (e.g., BWPs).

U.S. Appl. 62/976,415, by the current Applicant, discloses a technique whereby a non-connected state UE is provided with a connected-state RS configuration that includes first and second scrambling codes (e.g., identified by respective scramblingIDs). When the network transmits a connected-state RS using the first scrambling code, this indicates to the UE that the connected-state RS will be available for at least a first duration. Similarly, when the network transmits a connected-state RS using the second scrambling code, this indicates to the UE that the connected-state RS will be available for a second duration that is less than the first duration.

While this can provide some degree of assistance to the UE, it does not address all the problems, issues, and/or difficulties discussed herein. Furthermore, the use of two scrambling codes conveys only limited information about the TRS and any subsequent POs for the UE.

Accordingly exemplary embodiments of the present disclosure provide flexible and efficient techniques that enable and/or facilitate a network node serving a cell to configure UEs operating in a non-connected state with one or more characteristics associated with connected-state RS that can indicate subsequent availability of the connected-state RS and/or network activity in a subsequent POs for the respective UEs. For example, a first characteristic can indicate that the connected-state RS will be available at least till the UE's next PO, a second characteristic can indicate that the connected-state RS is not guaranteed to be available after the UE's next PO, and a third characteristic can indicate whether or not the UE can expect a paging DCI in one or more of the UE's upcoming paging occasions (POs). Exemplary first, second, and third characteristics can include scrambling codes, offsets, first OFDM symbol in time domain, starting RB, number of RBs, etc.

Such embodiments can provide various benefits and/or advantages. For example, embodiments can facilitate reduced UE energy consumption while allowing the UE to maintain synchronization and/or AGC while in a non-connected state. This can be done by enabling the UE to receive and/or measure connected-state RS in a non-connected state, such that the UE does not have to remain awake to receive non-connected-state RS (e.g., SSB) to use for similar purposes. Furthermore, embodiments can provide such advantages without requiring additional types of reference signals than what the network already transmits to UEs in RRC_CONNECTED state (e.g., TRS/CSI-RS for tracking). In addition, embodiments can facilitate additional reductions in UE energy consumption by efficiently informing a UE of upcoming paging activities.

In various embodiments, the network can provide and/or configure a UE with one or more periodic, semi-periodic, and/or aperiodic connected-state RS (e.g., CSI-RS for tracking) in various ways. For UEs in RRC_CONNECTED state, the connected-state RS configuration can be provided by the network via unicast RRC signaling when the UE's connection is setup or modified. While in RRC_CONNECTED state, the UE uses these RS to measure channel quality and/or to adjust the UE's time and frequency synchronization with the UE's serving network node (e.g., gNB). Alternately, the network can configure the connected-state UE with connected-state RS when the UE's connection is released and the UE transitions into the non-connected state. As another alternative, the connected-state RS configuration can be provided to non-connected UEs via broadcast SI.

As mentioned above, when the UE is in the non-connected state, the network may turn off these previously configured connected-state RS periodically, occasionally, permanently, or for a specific duration. Various embodiments inform the UE of the network's intentions in various ways.

In various embodiments, the configuration for each of the connected-state RS can include one or more distinguishing characteristics, with each characteristic being associated with network behavior regarding the connected-state RS while the UE is in a non-connected state. For example, the UE may be configured with a connected-state RS having a first characteristic, a second characteristic, and/or a third characteristic. Alternatively, the UE may be configured with multiple connected-state RS, each including a first characteristic associated with a particular network behavior. Examples of first, second, and third characteristics of a connected-state RS include any of the following, individually or in combination:

- scrambling code (SC, e.g., as indicated by scramblingID in Table 2 and FIG. 17A and/or cdm-type in Table 5 and FIG. 17E),
- slot timing offset (e.g., as indicated by periodicityAndOffset in Table 2 and FIG. 17A),
- initial RB in frequency domain (e.g., as indicated by startingPRB in Table 6 and FIG. 18),
- number of RBs in frequency domain (e.g., as indicated by nrofPRBs in Table 6 and FIG. 18), and
- initial time-domain symbol (e.g., as indicated by firstOFDMSymbolInTimeDomain in Table 6 and FIG. 18).

According to various embodiments, various network behavior can be indicated by the various first, second, and/or third characteristics. For example, if a UE receives a connected-state RS transmitted according to a configured first characteristic, this can indicate that the connected-state RS will be available for a specific duration (also referred to as "validity duration"), such as one or more upcoming POs for the UE, a specific amount of time (e.g., 1280 ms), a specific number of subframes, etc. The validity duration can be part of the connected-state RS configuration (e.g., another network-configurable field in the configuration), preconfigured (e.g., specified in 3GPP standard), or otherwise associated with the first characteristic itself.

In a simple example, a first scrambling code can indicate that the connected-state RS is present in the UE's next PO. In some embodiments, a first characteristic can include combinations of configured parameters that further distinguish different types of network behavior. For example, a first scrambling code and a first offset may indicate that the connected-state RS will be available for the UE's next PO, the first scrambling code and a second offset may indicate that the connected-state RS will be available for the UE's next two POs, etc.

In some embodiments, if a UE receives a connected-state RS transmitted according to a configured second characteristic, this can indicate that the connected-state RS is not guaranteed to be available after a specific duration (also referred to as "expiration time"), such as one or more upcoming POs for the UE, a specific expiration time (e.g., 1280 ms), a specific number of subframes, etc. The expiration time can be part of the connected-state RS configuration (e.g., another network-configurable field in the configuration), preconfigured (e.g., specified in 3GPP standard), or otherwise associated with the second characteristic itself.

In a simple example, a second scrambling code can indicate that the connected-state RS is not guaranteed to be available after the UE's next PO. In some embodiments, a second characteristic can include combinations of configured parameters that further distinguish different types of network behavior. For example, a second scrambling code and a first offset may indicate that the connected-state RS is not guaranteed to be available after the UE's next PO, the second scrambling code and a second offset may indicate that the connected-state RS is not guaranteed to be available after the UE's next two POs, etc.

Figure 19A:
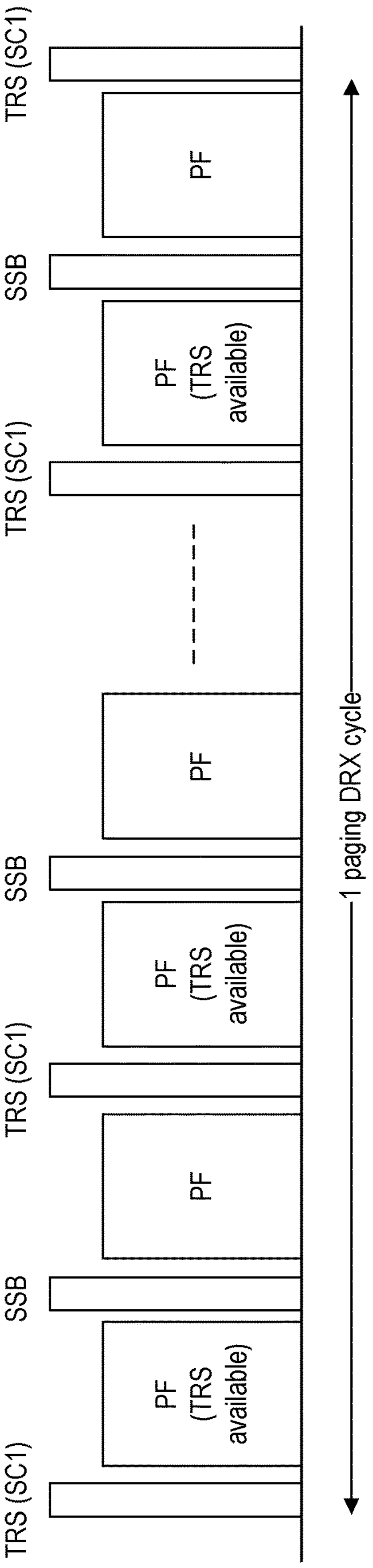
FIGS. 19A-B and 20A-B, illustrate how various first and second characteristics can indicate network behavior regarding subsequent connected-state RS transmission, according to various exemplary embodiments of the present disclosure.
Figure 19B:
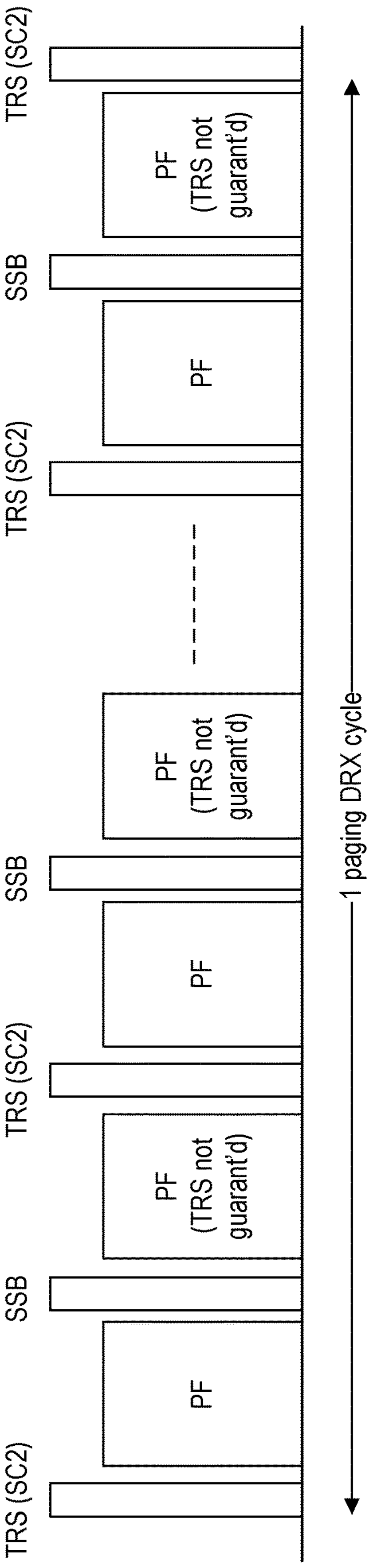

FIGS. 19-20 illustrate various examples of using first and second characteristics to indicate network behavior regarding subsequent connected-state RS transmission. In particular, FIG. 19A shows a configuration in which a first scrambling code (SC1) indicates that the connected-state RS (labelled as "TRS" for convenience) will be available in the next PO for a UE, while FIG. 19B shows a configuration in which a second scrambling code (SC2) indicates that the TRS is not guaranteed to be available after the next PO for the UE.

Note that FIGS. 19A-B show TRS availability in terms of paging frames (PF), which are repeated by the network every 10 ms. However, each UE will not be assigned a PO during every PF; rather, each UE will be assigned one PF (or possibly more) within each DRX cycle and one or more POs in the assigned PF(s), as discussed above. As such, transmitting TRS with SC1 before a PF indicates that the TRS will be available during UE POs that occur in this PF. Likewise, transmitting TRS with SC2 before a PF indicates that the TRS will not be guaranteed for UE POs that occur after this PF, e.g., in the next PF.

Note that transmitting TRS with the first characteristic (e.g., SC1) is not exclusive of transmitting TRS having the second characteristic (e.g., SC2). For example, a network can configure UEs with TRS associated with both SC1 and SC2. Configured in this manner, a UE can monitor for TRS-SC1 and TRS-SC2. If both are detected, this indicates to the UE that TRS will be available during UE POs that occur in the next PF but are not guaranteed to be available during POs that occur in subsequent PFs.

Figure 20A:
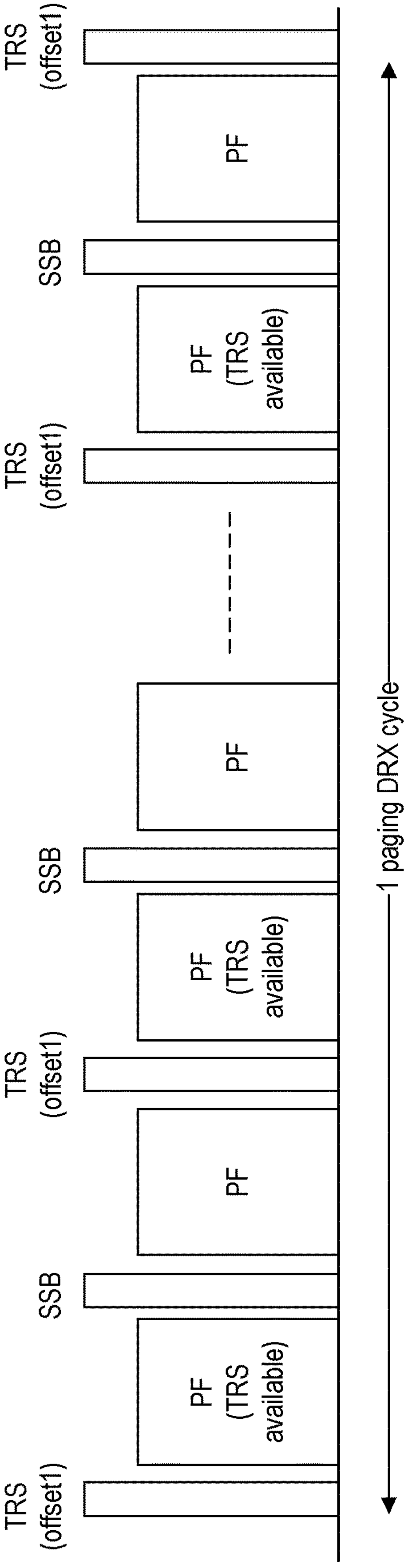
Figure 20B:
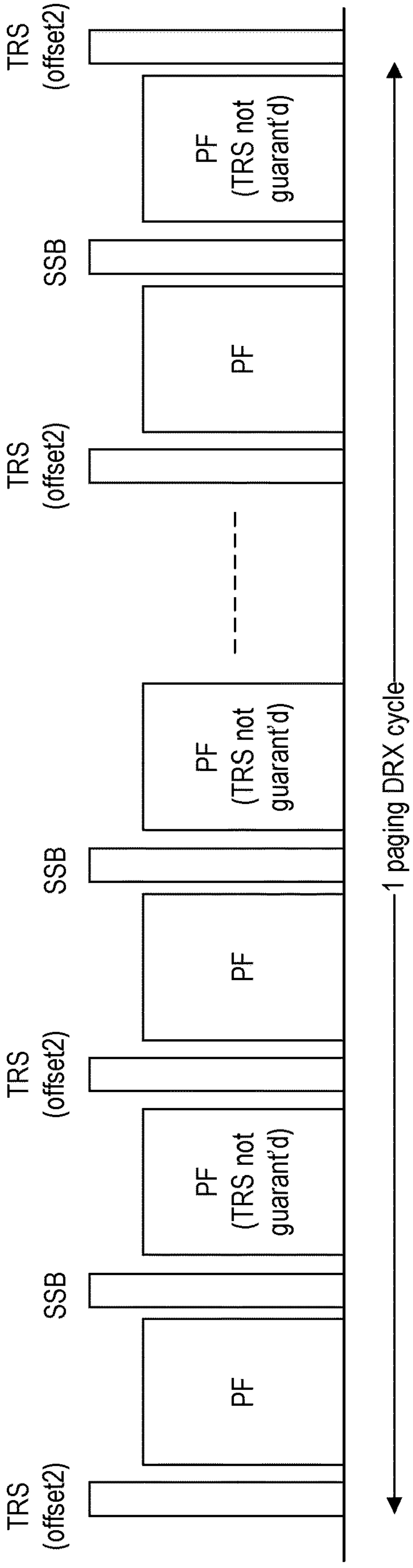

FIGS. 20A-B show another example in which different first and second characteristics are used to indicate availability and non-guarantee of availability. In particular, FIG. 20A shows a configuration in which a first slot offset (offset1) indicates that the connected-state RS (labelled as "TRS" for convenience) will be available in the next PO for a UE, while FIG. 20B shows a configuration in which a second slot offset (offset2) indicates that the TRS is not guaranteed to be available after the next PO for the UE.

In other embodiments, if a UE receives a connected-state RS transmitted according to a configured third characteristic, this can indicate that the UE can expect a paging (e.g., paging DCI, PDSCH with page, or both) within a specific duration (also referred to as "paging duration"), such as one or more upcoming POs for the UE, a specific time duration (e.g., 1280 ms), a specific number of subframes, etc. The paging duration can be part of the connected-state RS configuration (e.g., another network-configurable field in the configuration), preconfigured (e.g., specified in 3GPP standard), or otherwise associated with the first characteristic itself.

If the UE detects a TRS transmitted according to the third characteristic, the UE can remain awake during the paging duration to receive the paging DCI and/or PDSCH. However, if the UE does not detect a TRS with the third characteristic, the UE infers that there will be no paging in the upcoming paging duration and thus can remain in a reduced-energy state. This is merely one example of how a UE can interpret the presence/absence of the third characteristic; alternately, the interpretation can be specified in the connected-state RS configuration, preconfigured, or otherwise associated with the third characteristic itself.

In some embodiments, a third characteristic can include combinations of configured parameters that further distinguish different types of network behavior. For example, a third scrambling code and a first offset may indicate that the UE will be paged during UE's next PO, the third scrambling code and a second offset may indicate that the UE will be paged during the UE's next two POs, the third scrambling code and a third offset may indicate no paging in the next PO but paging in the subsequent PO, etc.

In some embodiments, the connected-state RS configuration can also include a monitoring period relative to another event, during which the UE could expect to receive, or monitor for, the connected-state RS with the one or more characteristics. Exemplary time periods include a period relative to a PO (e.g., 50 ms before), a period relative to one or more SSB transmissions (e.g., 5 ms before or after), and a period relative to a particular SFN. Once configured in this manner, the UE can wake up (or stay awake) for the indicated period to receive the expected TRS but can remain in a reduced-energy state during other periods.

In some embodiments, the validity duration can be indicated via a parameter, Z, which is input to a function known both to the network and UEs. For example, the parameter Z can indicate that the validity duration includes all SFNs that satisfy the function mod(SFN, Z)=0. Multiple Z values may be configured. For SFNs that do not satisfy the function, the UE can remain asleep or it can receive non-connected state RS (e.g., SSB) instead of connected-state RS.

In some embodiments, the network can inform non-connected state UEs about changes in configurations broadcast in SI through an SI update mechanism, such as via UE paging.

Alternatively, the network may not actively inform UEs about changes in TRS configurations via the SI update mechanism, and instead let UE determine any SI changes based on monitoring the relevant SIB in the broadcast SI. In some embodiments, the network can include, in the SI, an indication of whether changes in TRS configurations are indicated via the SI update mechanism.

If a TRS configuration change triggers the SI update mechanism, the UE monitors the relevant SIB in the broadcast SI and, when found, receives the updated configuration. In some embodiments, if the UE has not received an SI update signal (e.g., via paging) for a predetermined time, the UE may also read the current SI without receiving an SI update signal.

In general, if the SI update mechanism is not used, the UE may periodically or occasionally monitor relevant broadcast SI to determine the availability of a new TRS configuration. In some embodiments, the UE may determine whether to monitor SI for this purpose by comparing the additional energy spent for SI reception to energy saved by utilizing the TRS, and monitoring SI only when the overall energy usage is lower, e.g., by an amount that exceeds a predetermined threshold.

In any event, upon obtaining a new TRS configuration, the UE adapts the TRS utilization strategy (e.g., whether to utilize TRS in addition to or instead of SSB, or use SSBs only) to match the obtained information. Put differently, based on the received configuration, the UE can determine one or more timeslots during which the connected-state RS will be available, and determines whether to receive the connected-state RS in those timeslots instead of or in addition to receiving non-connected-state RS (e.g., SSB). These determinations can be based on relative energy consumption for the various operational options.

In some embodiments, when the network uses a particular characteristic for the TRS transmission, the UE is configured with characteristics that represent a subset of the resources used by the transmitted TRS. In this way, the network does not need to allocate additional TRS resources to be able to configure UEs with different characteristics. For example, if the network uses a particular nrofPRBs for transmitting the TRS, the UE can be configured with a set of characteristics {nrofPRB1, nrofPRB2, nrofPRB3, etc.}, each of which is associated with a different network behavior in regards to TRS availability and/or paging. Furthermore, each of {nrofPRB1, nrofPRB2, nrofPRB3, etc.} is less or equal to the particular nrofPRBs used in the TRS transmission.

In some embodiments, when the UE detects a TRS having a first characteristic (e.g., SC1) while in a non-connected state, it may initiate or continue utilizing the TRS transmitted during the associated validity duration, and may perform another TRS detection during that time. When the UE detects a TRS having a second characteristic (e.g., SC2), it may start monitoring broadcast SI or attempt layer 1 (L1) detection of the TRS after the end of the validity duration when the TRS may—but is no longer guaranteed to—be available. For example, the UE can determine presence/absence of the connected-state RS via direct detection (e.g., using a correlator receiver).

In some embodiments, the network can indicate whether it supports transmission of connected-state RS in UE non-connected states by whether or not it includes a configuration of such connected-state RS in SI provided to the UE via broadcast or unicast signaling. For example, if the network does not include such a configuration in broadcast SI, UEs can interpret this as an indication that the network does not support transmission of connected-state RS in UE non-connected states. This indication can be particularly relevant when the network does not actively inform non-connected UEs about relevant SI changes (e.g., via paging, as done for SIB1 changes).

Figure 21:
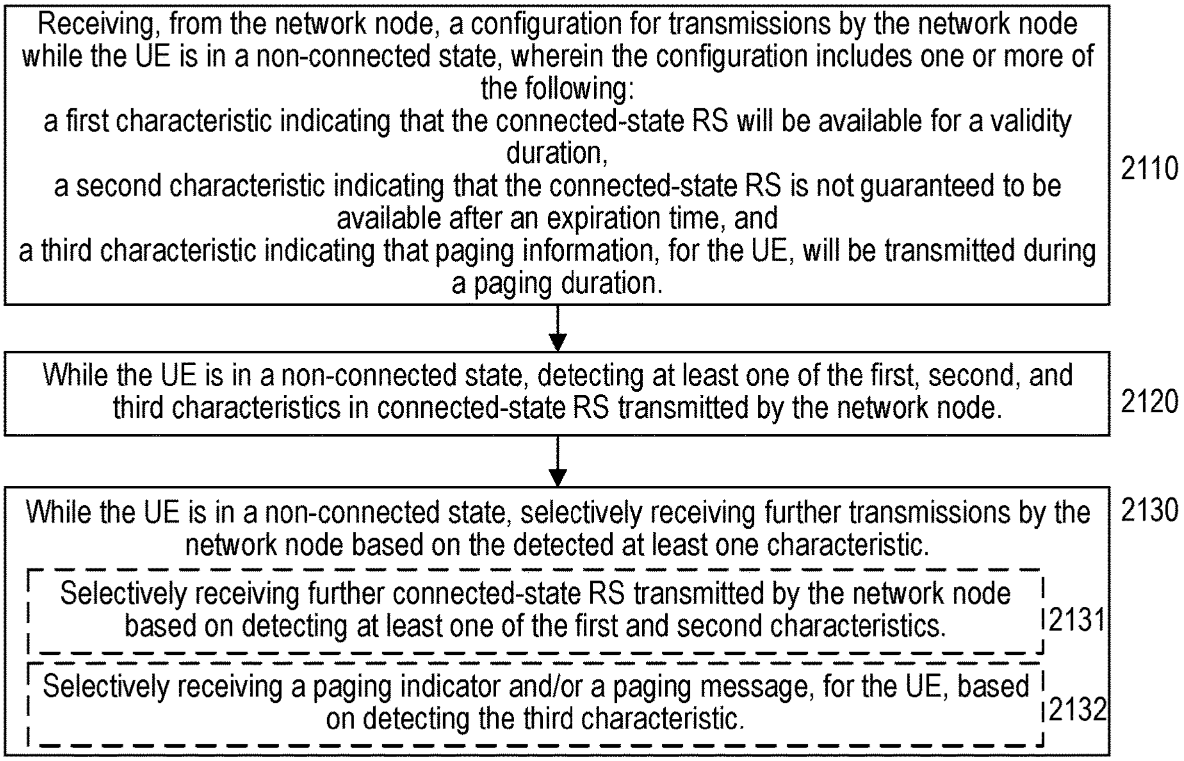
FIG. 21 shows a flow diagram of an exemplary method for a user equipment (UE, e.g., wireless device), according to various exemplary embodiments of the present disclosure.
Figure 22:
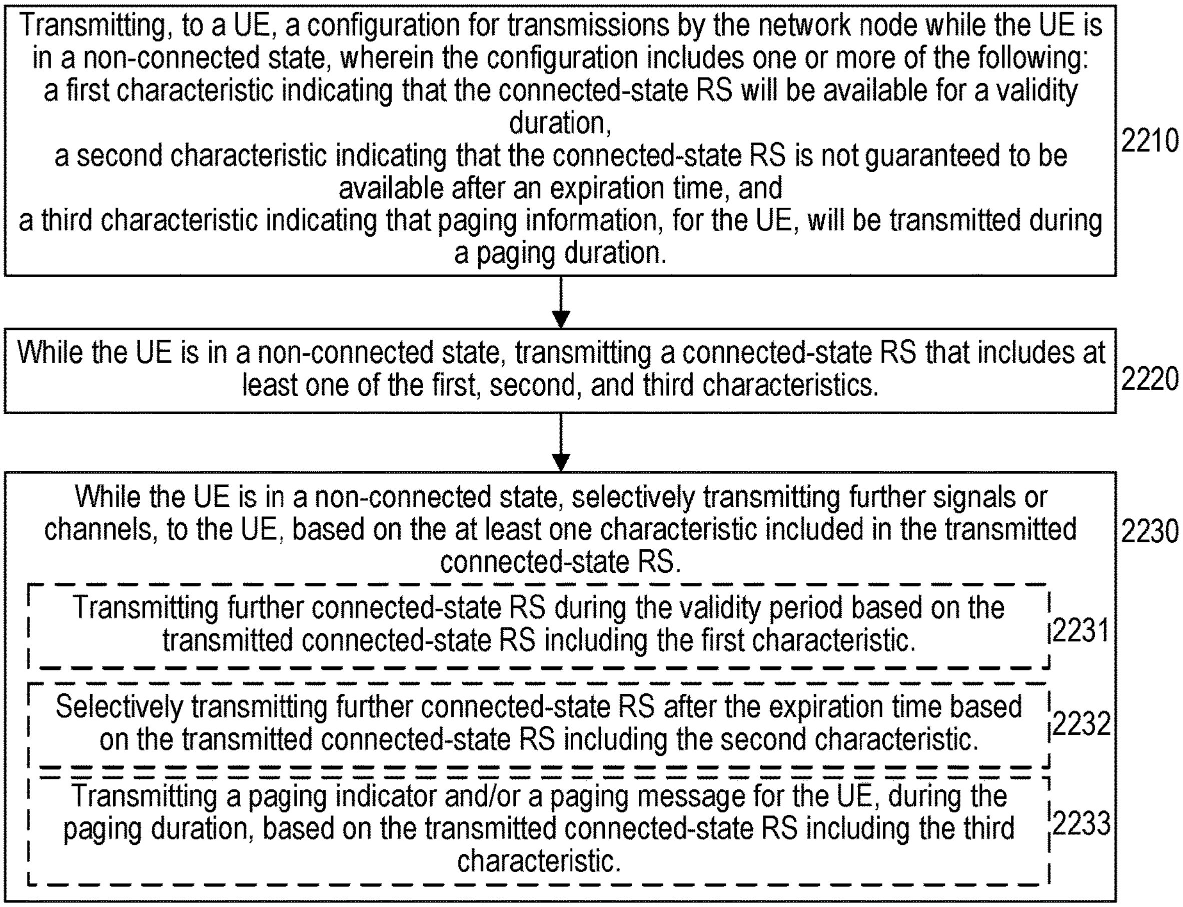
FIG. 22 shows a flow diagram of an exemplary method for a network node (e.g., base station, eNB, gNB, ng-eNB, etc.) in a wireless network (e.g., NG-RAN, E-UTRAN), according to various exemplary embodiments of the present disclosure.

Various features of the embodiments described above correspond to various operations illustrated in FIGS. 21 and 22, which show exemplary methods (e.g., procedures) for a UE and a network node, respectively. In other words, various features of the operations described below correspond to various embodiments described above. Furthermore, the exemplary methods shown in FIGS. 21 and 22 can be used cooperatively to provide various exemplary benefits described herein. Although FIGS. 21 and 22 show specific blocks in particular orders, the operations of the exemplary methods can be performed in different orders than shown and can be combined and/or divided into blocks having different functionality than shown. Optional blocks or operations are indicated by dashed lines.

In particular, FIG. 21 shows an exemplary method (e.g., procedure) to receive reference signals (RS) transmitted by a network node in a wireless network, according to various exemplary embodiments of the present disclosure. The exemplary method can be performed by a user equipment (UE, e.g., wireless device) in communication with the network node (e.g., base station, eNB, gNB, ng-eNB, etc., or component thereof) in the wireless network (e.g., E-UTRAN, NG-RAN). For example, the exemplary method shown in FIG. 21 can be implemented in a UE configured according to other figures described herein.

The exemplary method can include the operations of block 2110, where the UE can receive, from the network node, a configuration for transmissions by the network node while the UE is in a non-connected state. The configuration can include one or more of the following:

- a first characteristic indicating that the connected-state RS will be available for a validity duration,
- a second characteristic indicating that the connected-state RS is not guaranteed to be available after an expiration time, and
- a third characteristic indicating that paging information, for the UE, will be transmitted during a paging duration.

The exemplary method can also include the operations of block 2120, where the UE can, while in a non-connected state, detect at least one of the first, second, and third characteristics in connected-state RS transmitted by the network node. The exemplary method can also include the operations of block 2130, where the UE can, while in a non-connected state, selectively receive further transmissions by the network node based on the detected at least one characteristic.

In some embodiments, the selectively receiving operations of block 2130 can include the operations of sub-blocks 2131 and/or 2132. In sub-block 2131, the UE can selectively receive further connected-state RS transmitted by the network node based on detecting at least one of the first and second characteristics. For example, upon detecting the first characteristic, the UE can receive connected-state RS transmission during the validity duration. As another example, upon detecting the second characteristic indicating non-guaranteed availability after the expiration time, the UE can either attempt to detect connected-state RS transmissions after the expiration time or refrain from doing so.

In sub-block 2132, the UE can selectively receive a paging indicator and/or a paging message, for the UE, based on detecting the third characteristic. For example, the paging indicator can be a paging DCI received on PDCCH and the paging message can be received on PDSCH.

In some embodiments, the configuration can be received in one or more of the following: a unicast message while the UE is operating in the connected state; a unicast connection release message triggering UE entry into a non-connected state; and broadcast system information.

In some embodiments, each of the first, second, and third characteristics for connected-state RS can include one or more of the following parameters: scrambling code, slot timing offset, initial resource block in frequency domain, number of resource blocks in the frequency domain, and initial symbol in time domain.

In some embodiments, the validity duration can be one of the following after a transmission of a connected-state RS that includes the first characteristic: one or more paging occasions (POs) for the UE; an amount of time (e.g., 1280 ms); or a number of subframes. In some embodiments, the validity duration is indicated according to one or more of the following: by the configuration, preconfigured such that it is known to both the UE and the network node, or by the transmitted connected-state RS.

In some embodiments, the first characteristic can include first and second parameters. The first parameter indicates that the connected-state RS will be available for a validity duration, while the second parameter can take on a plurality of values, each indicating a particular validity duration for which the connected-state RS will be available. In some of these embodiments, the first parameter is a particular scrambling code applied to the transmitted connected-state RS and the second parameter is a slot timing offset for the transmitted connected-state RS.

In some embodiments, the expiration time can be one of the following after a transmission of a connected-state RS that includes the second characteristic: one or more paging occasions (POs) for the UE; an amount of time (e.g., 1280 ms); or a number of subframes. In some embodiments, the expiration time can be indicated according to one or more of the following: by the configuration, preconfigured such that it is known to both the UE and the network node, and by the transmitted connected-state RS.

In some embodiments, the second characteristic can include first and second parameters. The first parameter indicates that the connected-state RS is not guaranteed to be available after an expiration time, while the second parameter can take on a plurality of values, each indicating a particular expiration time after which the connected-state RS is not guaranteed to be available. In some of these embodiments, the first parameter is a particular scrambling code applied to the transmitted connected-state RS and the second parameter is a slot timing offset for the transmitted connected-state RS.

In some embodiments, the paging duration can be indicated according to one or more of the following: by the configuration, preconfigured such that it is known to both the UE and the network node, or by the transmitted connected-state RS. In some embodiments, the third characteristic can include first and second parameters. The first parameter indicates that paging information, for the UE, will be transmitted during a paging duration after transmission of a connected-state RS that includes the third characteristic. The second parameter can take on a plurality of values, each indicating a particular paging duration during which the paging information will be transmitted.

In some of these embodiments, a first value of the second parameter indicates that paging information will be transmitted at the UE's next paging occasion (PO), a second value of the second parameter indicates that paging information will be transmitted during at least one of the UE's next two POs, and a third value of the second parameter indicates that paging information will be transmitted in the PO after the UE's next PO. In some of these embodiments, the first parameter is a particular scrambling code applied to the transmitted connected-state RS and the second parameter is a slot timing offset for the transmitted connected-state RS.

In some embodiments, the configuration also includes a monitoring period during which the UE should monitor for connected-state RS having at least one of the first, second, and third characteristics. In such embodiments, the connected-state RS that include at least one of the first, second, and third characteristics is detected (e.g., in block 2120) during the monitoring period. In some of these embodiments, the monitoring period is indicated relative to one of the following: a paging occasion for the UE, one or more non-connected-state RS transmissions, or a particular frame number.

In some embodiments, each of the first, second, and third characteristics is indicated by a different value of a single transmission parameter associated with the connected-state RS. An example based on parameter nrofPRBs was discussed above.

In addition, FIG. 22 shows an exemplary method (e.g., procedure) to transmit reference signals (RS) to one or more user equipment (UEs), according to various exemplary embodiments of the present disclosure. The exemplary method can be performed by a network node (e.g., base station, eNB, gNB, ng-eNB, etc., or component thereof) serving a cell in a wireless network (e.g., E-UTRAN, NG-RAN). For example, the exemplary method shown in FIG. 22 can be implemented in a network node configured according to other figures described herein.

The exemplary method can include the operations of block 2210, where the network node can transmit, to a UE, a configuration for transmissions by the network node while the UE is in a non-connected state. The configuration can include one or more of the following:

a first characteristic indicating that the connected-state RS will be available for a validity duration, a second characteristic indicating that the connected-state RS is not guaranteed to be available after an expiration time, and a third characteristic indicating that paging information, for the UE, will be transmitted during a paging duration.

The exemplary method can also include the operations of block 2220, where the network node can, while the UE is in a non-connected state, transmit connected-state RS that include at least one of the first, second, and third characteristics. The exemplary method can also include the operations of block 2230, where the network node can, while the UE is in a non-connected state, selectively transmit further signals or channels, to the UE, based on the at least one characteristic included in the transmitted connected-state RS.

In some embodiments, the selectively transmitting operations of block 2230 can include the operations of sub-blocks 2231, 2232, and/or 2233. In sub-block 2231, the network node can transmit further connected-state RS during the validity period based on the transmitted connected-state RS including the first characteristic. In sub-block 2232, the network node can selectively transmit further connected-state RS after the expiration time based on the transmitted connected-state RS including the second characteristic. In other words, when the network node has indicated non-guaranteed availability by including the second characteristic in the transmitted connected-state RS (e.g., in block 2220), the network node has the discretion whether or not to transmit the connected-state RS after the expiration time.

In sub-block 2233, the network node can transmit a paging indicator and/or a paging message for the UE, during the paging duration, based on the transmitted connected-state RS including the third characteristic. For example, the paging indicator can be a paging DCI transmitted on PDCCH and the paging message can be transmitted on PDSCH.

In some embodiments, the configuration can be transmitted in one or more of the following: a unicast message while the UE is operating in the connected state; a unicast connection release message triggering UE entry into a non-connected state; and broadcast system information.

In some embodiments, each of the first, second, and third characteristics for connected-state RS can include one or more of the following parameters: scrambling code, slot timing offset, initial resource block in frequency domain, number of resource blocks in the frequency domain, and initial symbol in time domain.

In some embodiments, the validity duration can be one of the following after a transmission of a connected-state RS that includes the first characteristic (e.g., as detected by the UE in block 2120): one or more paging occasions (POs) for the UE; an amount of time (e.g., 1280 ms); or a number of subframes. In some embodiments, the validity duration is indicated according to one or more of the following: by the configuration, preconfigured such that it is known to both the UE and the network node, or by the transmitted connected-state RS.

In some embodiments, the first characteristic can include first and second parameters. The first parameter indicates that the connected-state RS will be available for a validity duration, while the second parameter can take on a plurality of values, each indicating a particular validity duration for which the connected-state RS will be available. In some of these embodiments, the first parameter is a particular scrambling code applied to the transmitted connected-state RS and the second parameter is a slot timing offset for the transmitted connected-state RS.

In some embodiments, the expiration time can be one of the following after a transmission of a connected-state RS that includes the second characteristic (e.g., as detected by the UE in block 2120): one or more paging occasions (POs) for the UE; an amount of time (e.g., 1280 ms); or a number of subframes. In some embodiments, the expiration time can be indicated according to one or more of the following: by the configuration, preconfigured such that it is known to both the UE and the network node, and by the transmitted connected-state RS.

In some embodiments, the second characteristic can include first and second parameters. The first parameter indicates that the connected-state RS is not guaranteed to be available after an expiration time, while the second parameter can take on a plurality of values, each indicating a particular expiration time after which the connected-state RS is not guaranteed to be available. In some of these embodiments, the first parameter is a particular scrambling code applied to the transmitted connected-state RS and the second parameter is a slot timing offset for the transmitted connected-state RS.

In some embodiments, the paging duration can be indicated according to one or more of the following: by the configuration, preconfigured such that it is known to both the UE and the network node, or by the transmitted connected-state RS. In some embodiments, the third characteristic can include first and second parameters. The first parameter indicates that paging information, for the UE, will be transmitted during a paging duration after transmission of a connected-state RS that includes the third characteristic. The second parameter can take on a plurality of values, each indicating a particular paging duration during which the paging information will be transmitted.

In some of these embodiments, a first value of the second parameter indicates that paging information will be transmitted at the UE's next paging occasion (PO), a second value of the second parameter indicates that paging information will be transmitted during at least one of the UE's next two POs, and a third value of the second parameter indicates that paging information will be transmitted in the PO after the UE's next PO. In some of these embodiments, the first parameter is a particular scrambling code applied to the transmitted connected-state RS and the second parameter is a slot timing offset for the transmitted connected-state RS.

In some embodiments, the configuration also includes a monitoring period during which the UE should monitor for connected-state RS having at least one of the first, second, and third characteristics. In such embodiments, the connected-state RS that include at least one of the first, second, and third characteristics is transmitted (e.g., in block 2220) during the monitoring period. In some of these embodiments, the monitoring period is indicated relative to one of the following: a paging occasion for the UE, one or more non-connected-state RS transmissions, or a particular frame number.

In some embodiments, each of the first, second, and third characteristics is indicated by a different value of a single transmission parameter associated with the connected-state RS. An example based on parameter nrofPRBs was discussed above.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 23:
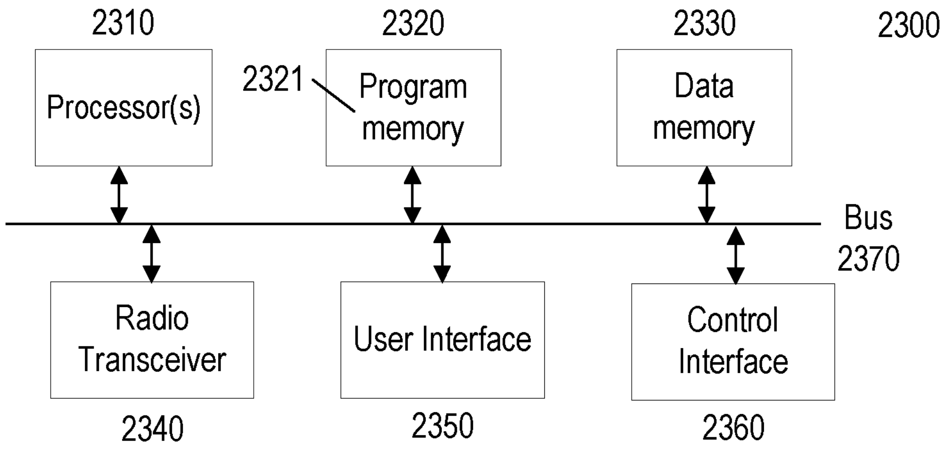
FIG. 23 shows a block diagram of an exemplary wireless device or UE, according to various exemplary embodiments of the present disclosure.

FIG. 23 shows a block diagram of an exemplary wireless device or user equipment (UE) 2300 (hereinafter referred to as "UE 2300") according to various embodiments of the present disclosure, including those described above with reference to other figures. For example, UE 2300 can be configured by execution of instructions, stored on a computer-readable medium, to perform operations corresponding to one or more of the exemplary methods described herein.

UE 2300 can include a processor 2310 (also referred to as "processing circuitry") that can be operably connected to a program memory 2320 and/or a data memory 2330 via a bus 2370 that can comprise parallel address and data buses, serial ports, or other methods and/or structures known to those of ordinary skill in the art. Program memory 2320 can store software code, programs, and/or instructions (collectively shown as computer program product 2321 in FIG. 23) that, when executed by processor 2310, can configure and/or facilitate UE 2300 to perform various operations, including operations corresponding to various exemplary methods described herein. As part of or in addition to such operations, execution of such instructions can configure and/or facilitate UE 2300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 2340, user interface 2350, and/or control interface 2360.

As another example, processor 2310 can execute program code stored in program memory 2320 that corresponds to MAC, RLC, PDCP, and RRC layer protocols standardized by 3GPP (e.g., for NR and/or LTE). As a further example, processor 2310 can execute program code stored in program memory 2320 that, together with radio transceiver 2340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 2310 can execute program code stored in program memory 2320 that, together with radio transceiver 2340, implements device-to-device (D2D) communications with other compatible devices and/or UEs.

Program memory 2320 can also include software code executed by processor 2310 to control the functions of UE 2300, including configuring and controlling various components such as radio transceiver 2340, user interface 2350, and/or control interface 2360. Program memory 2320 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 2320 can comprise an external storage arrangement (not shown) remote from UE 2300, from which the instructions can be downloaded into program memory 2320 located within or removably coupled to UE 2300, so as to enable execution of such instructions.

Data memory 2330 can include memory area for processor 2310 to store variables used in protocols, configuration, control, and other functions of UE 2300, including operations corresponding to, or comprising, any of the exemplary methods described herein. Moreover, program memory 2320 and/or data memory 2330 can include non-volatile memory (e.g., flash memory), volatile memory (e.g., static or dynamic RAM), or a combination thereof. Furthermore, data memory 2330 can comprise a memory slot by which removable memory cards in one or more formats (e.g., SD Card, Memory Stick, Compact Flash, etc.) can be inserted and removed.

Persons of ordinary skill will recognize that processor 2310 can include multiple individual processors (including, e.g., multi-core processors), each of which implements a portion of the functionality described above. In such cases, multiple individual processors can be commonly connected to program memory 2320 and data memory 2330 or individually connected to multiple individual program memories and or data memories. More generally, persons of ordinary skill in the art will recognize that various protocols and other functions of UE 2300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 2340 can include radio-frequency transmitter and/or receiver functionality that facilitates the UE 2300 to communicate with other equipment supporting like wireless communication standards and/or protocols. In some exemplary embodiments, the radio transceiver 2340 includes one or more transmitters and one or more receivers that enable UE 2300 to communicate according to various protocols and/or methods proposed for standardization by 3GPP and/or other standards bodies. For example, such functionality can operate cooperatively with processor 2310 to implement a PHY layer based on OFDM, OFDMA, and/or SC-FDMA technologies, such as described herein with respect to other figures.

In some exemplary embodiments, radio transceiver 2340 includes one or more transmitters and one or more receivers that can facilitate the UE 2300 to communicate with various LTE, LTE-Advanced (LTE-A), and/or NR networks according to standards promulgated by 3GPP. In some exemplary embodiments of the present disclosure, the radio transceiver 2340 includes circuitry, firmware, etc. necessary for the UE 2300 to communicate with various NR, NR-U, LTE, LTE-A, LTE-LAA, UMTS, and/or GSM/EDGE networks, also according to 3GPP standards. In some embodiments, radio transceiver 2340 can include circuitry supporting D2D communications between UE 2300 and other compatible devices.

In some embodiments, radio transceiver 2340 includes circuitry, firmware, etc. necessary for the UE 2300 to communicate with various CDMA2000 networks, according to 3GPP2 standards. In some embodiments, the radio transceiver 2340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 2340 can include a transceiver that is capable of wired communication, such as by using IEEE 802.3 Ethernet technology. The functionality particular to each of these embodiments can be coupled with and/or controlled by other circuitry in the UE 2300, such as the processor 2310 executing program code stored in program memory 2320 in conjunction with, and/or supported by, data memory 2330.

User interface 2350 can take various forms depending on the particular embodiment of UE 2300, or can be absent from UE 2300 entirely. In some embodiments, user interface 2350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 2300 can comprise a tablet computing device including a larger touchscreen display. In such embodiments, one or more of the mechanical features of the user interface 2350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 2300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 2300 having a touch screen display are capable of receiving user inputs, such as inputs related to exemplary methods described herein or otherwise known to persons of ordinary skill.

In some embodiments, UE 2300 can include an orientation sensor, which can be used in various ways by features and functions of UE 2300. For example, the UE 2300 can use outputs of the orientation sensor to determine when a user has changed the physical orientation of the UE 2300's touch screen display. An indication signal from the orientation sensor can be available to any application program executing on the UE 2300, such that an application program can change the orientation of a screen display (e.g., from portrait to landscape) automatically when the indication signal indicates an approximate 150-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 2360 of the UE 2300 can take various forms depending on the particular exemplary embodiment of UE 2300 and of the particular interface requirements of other devices that the UE 2300 is intended to communicate with and/or control. For example, the control interface 2360 can comprise an RS-232 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 2360 can comprise an IEEE 802.3 Ethernet interface such as described above. In some exemplary embodiments of the present disclosure, the control interface 2360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 2300 can comprise more functionality than is shown in FIG. 23 including, for example, a video and/or still-image camera, microphone, media player and/or recorder, etc. Moreover, radio transceiver 2340 can include circuitry necessary to communicate using additional radio-frequency communication standards including Bluetooth, GPS, and/or others. Moreover, the processor 2310 can execute software code stored in the program memory 2320 to control such additional functionality. For example, directional velocity and/or position estimates output from a GPS receiver can be available to any application program executing on the UE 2300, including any program code corresponding to and/or embodying any exemplary embodiments (e.g., of methods) described herein.

Figure 24:
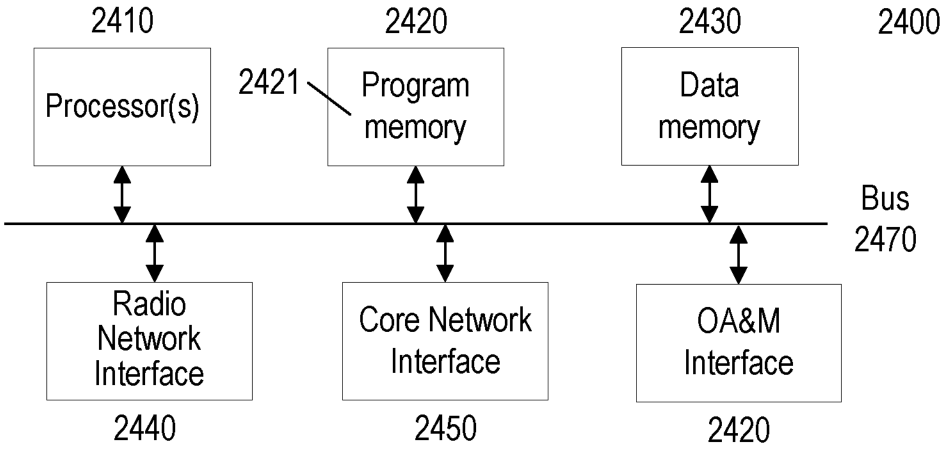
FIG. 24 shows a block diagram of an exemplary network node according to various exemplary embodiments of the present disclosure.

FIG. 24 shows a block diagram of an exemplary network node 2400 according to various embodiments of the present disclosure, including those described above with reference to other figures. For example, exemplary network node 2400 can be configured by execution of instructions, stored on a computer-readable medium, to perform operations corresponding to one or more of the exemplary methods described herein. In some exemplary embodiments, network node 2400 can comprise a base station, eNB, gNB, or one or more components thereof. For example, network node 2400 can be configured as a central unit (CU) and one or more distributed units (DUs) according to NR gNB architectures specified by 3GPP. More generally, the functionally of network node 2400 can be distributed across various physical devices and/or functional units, modules, etc.

Network node 2400 can include processor 2410 (also referred to as "processing circuitry") that is operably connected to program memory 2420 and data memory 2430 via bus 2470, which can include parallel address and data buses, serial ports, or other methods and/or structures known to those of ordinary skill in the art.

Program memory 2420 can store software code, programs, and/or instructions (collectively shown as computer program product 2421 in FIG. 24) that, when executed by processor 2410, can configure and/or facilitate network node 2400 to perform various operations, including operations corresponding to various exemplary methods described herein. As part of and/or in addition to such operations, program memory 2420 can also include software code executed by processor 2410 that can configure and/or facilitate network node 2400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 2440 and/or core network interface 2450. By way of example, core network interface 2450 can comprise the S1 or NG interface and radio network interface 2440 can comprise the Uu interface, as standardized by 3GPP. Program memory 2420 can also comprise software code executed by processor 2410 to control the functions of network node 2400, including configuring and controlling various components such as radio network interface 2440 and core network interface 2450.

Data memory 2430 can comprise memory area for processor 2410 to store variables used in protocols, configuration, control, and other functions of network node 2400. As such, program memory 2420 and data memory 2430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 2410 can include multiple individual processors (not shown), each of which implements a portion of the functionality described above. In such case, multiple individual processors may be commonly connected to program memory 2420 and data memory 2430 or individually connected to multiple individual program memories and/or data memories. More generally, persons of ordinary skill will recognize that various protocols and other functions of network node 2400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 2440 can comprise transmitters, receivers, signal processors, ASICs, antennas, beamforming units, and other circuitry that enables network node 2400 to communicate with other equipment such as, in some embodiments, a plurality of compatible user equipment (UE). In some embodiments, interface 2440 can also enable network node 2400 to communicate with compatible satellites of a satellite communication network. In some exemplary embodiments, radio network interface 2440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 2440. According to further exemplary embodiments of the present disclosure, the radio network interface 2440 can comprise a PHY layer based on OFDM, OFDMA, and/or SC-FDMA technologies. In some embodiments, the functionality of such a PHY layer can be provided cooperatively by radio network interface 2440 and processor 2410 (including program code in memory 2420).

Core network interface 2450 can comprise transmitters, receivers, and other circuitry that enables network node 2400 to communicate with other equipment in a core network such as, in some embodiments, circuit-switched (CS) and/or packet-switched Core (PS) networks. In some embodiments, core network interface 2450 can comprise the S1 interface standardized by 3GPP. In some embodiments, core network interface 2450 can comprise the NG interface standardized by 3GPP. In some exemplary embodiments, core network interface 2450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 2450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 2400 can include hardware and/or software that configures and/or facilitates network node 2400 to communicate with other network nodes in a RAN, such as with other eNBs, gNBs, ng-eNBs, en-gNBs, IAB nodes, etc. Such hardware and/or software can be part of radio network interface 2440 and/or core network interface 2450, or it can be a separate functional unit (not shown). For example, such hardware and/or software can configure and/or facilitate network node 2400 to communicate with other RAN nodes via the X2 or Xn interfaces, as standardized by 3GPP.

OA&M interface 2460 can comprise transmitters, receivers, and other circuitry that enables network node 2400 to communicate with external networks, computers, databases, and the like for purposes of operations, administration, and maintenance of network node 2400 or other network equipment operably connected thereto. Lower layers of OA&M interface 2460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 2440, core network interface 2450, and OA&M interface 2460 may be multiplexed together on a single physical interface, such as the examples listed above.

Figure 25:
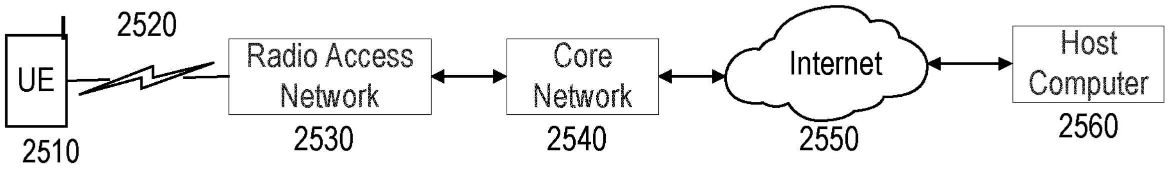
FIG. 25 shows a block diagram of an exemplary network configured to provide over-the-top (OTT) data services between a host computer and a UE, according to various exemplary embodiments of the present disclosure.

FIG. 25 is a block diagram of an exemplary communication network configured to provide over-the-top (OTT) data services between a host computer and a user equipment (UE), according to one or more exemplary embodiments of the present disclosure. UE 2510 can communicate with radio access network (RAN) 2530 over radio interface 2520, which can be based on protocols described above including, e.g., LTE, LTE-A, and 5G/NR. For example, UE 2510 can be configured and/or arranged as shown in other figures discussed above.

RAN 2530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2530 can cooperatively operate using licensed and unlicensed spectrum. In some embodiments, RAN 2530 can include, or be capable of communication with, one or more satellites comprising a satellite access network.

RAN 2530 can further communicate with core network 2540 according to various protocols and interfaces described above. For example, one or more apparatus (e.g., base stations, eNBs, gNBs, etc.) comprising RAN 2530 can communicate to core network 2540 via core network interface 2550 described above. In some exemplary embodiments, RAN 2530 and core network 2540 can be configured and/or arranged as shown in other figures discussed above. For example, eNBs comprising an E-UTRAN 2530 can communicate with an EPC core network 2540 via an S1 interface. As another example, gNBs and ng-eNBs comprising an NG-RAN 2530 can communicate with a 5GC core network 2530 via an NG interface.

Core network 2540 can further communicate with an external packet data network, illustrated in FIG. 25 as Internet 2550, according to various protocols and interfaces known to persons of ordinary skill in the art. Many other devices and/or networks can also connect to and communicate via Internet 2550, such as exemplary host computer 2560. In some exemplary embodiments, host computer 2560 can communicate with UE 2510 using Internet 2550, core network 2540, and RAN 2530 as intermediaries. Host computer 2560 can be a server (e.g., an application server) under ownership and/or control of a service provider. Host computer 2560 can be operated by the OTT service provider or by another entity on the service provider's behalf.

For example, host computer 2560 can provide an over-the-top (OTT) packet data service to UE 2510 using facilities of core network 2540 and RAN 2530, which can be unaware of the routing of an outgoing/incoming communication to/from host computer 2560. Similarly, host computer 2560 can be unaware of routing of a transmission from the host computer to the UE, e.g., the routing of the transmission through RAN 2530. Various OTT services can be provided using the exemplary configuration shown in FIG. 25 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 25 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Figure 26:
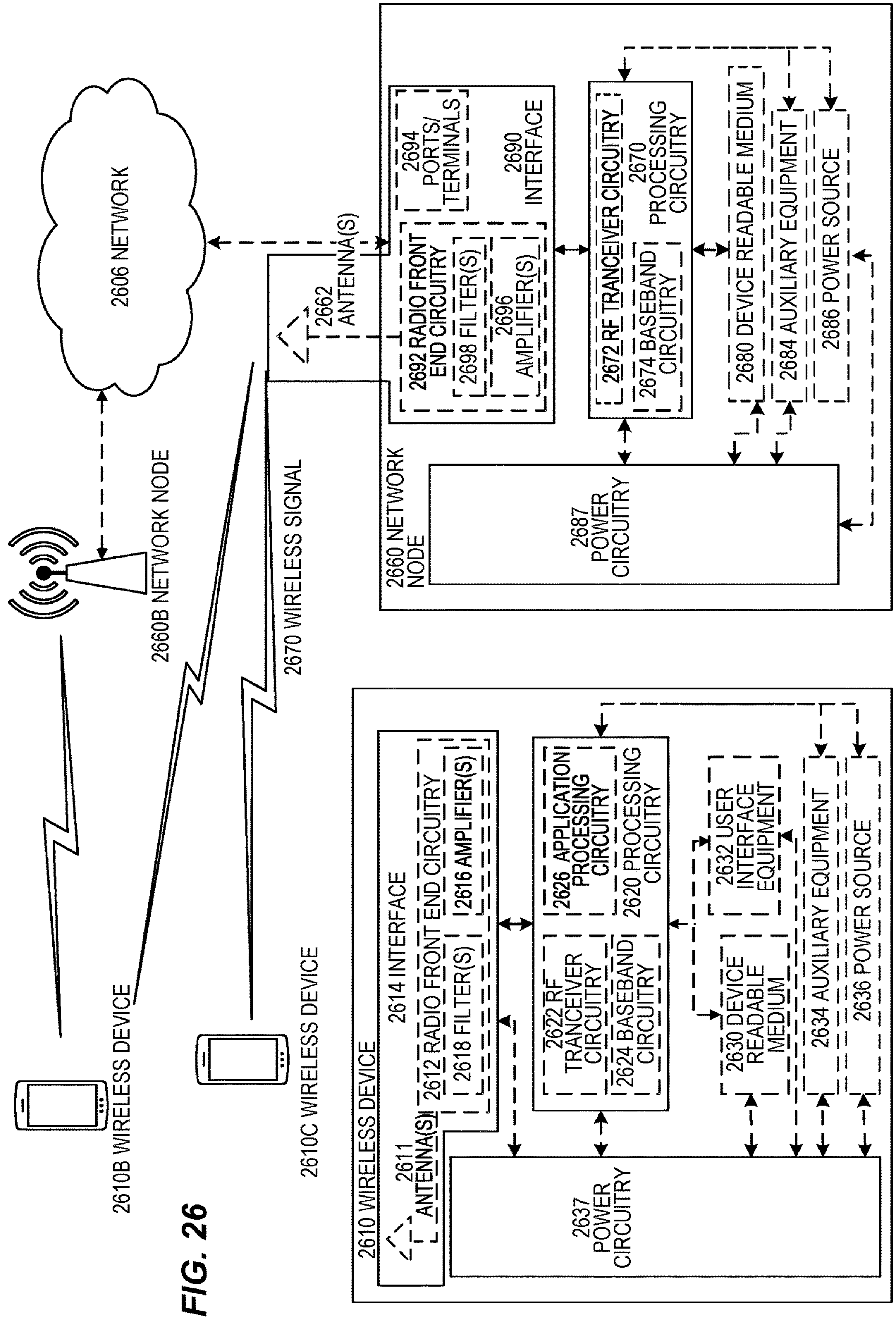
FIG. 26 illustrates components of an example wireless network, in which some embodiments of the presently disclosed techniques may be implemented.

FIG. 26 illustrates an example wireless network, which may include, for example, any of the UEs, wireless devices, and network nodes described herein. For simplicity, the wireless network of FIG. 26 only depicts network 2606, network nodes 2660 and 2660B, and WDs 2610, 2610B, and 2610C. In practice, a wireless network can further include any additional elements suitable to support communication between wireless devices or between a wireless device and another communication device, such as a landline telephone, a service provider, or any other network node or end device. Of the illustrated components, network node 2660 and wireless device (WD) 2610 are depicted with additional detail. It should be noted that the functionality of network node 2660 may be split between two or more physical nodes, such as according to the central unit (CU) and distributed unit (DU) functionality discussed above. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2660 and WD 2610 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 26, network node 2660 includes processing circuitry 2670, device readable medium 2680, interface 2690, auxiliary equipment 2684, power source 2686, power circuitry 2687, and antenna 2662. Although network node 2660 illustrated in the example wireless network of FIG. 26 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2660 are depicted as single boxes located within a larger box, or nested within multiple boxes, in practice, a network node can comprise multiple different physical components that make up a single illustrated component (e.g., device readable medium 2680 can comprise multiple separate hard drives as well as multiple RAM modules).

Similarly, network node 2660 can be composed of multiple physically separate components (e.g., a NodeB component and a RNC component, or a BTS component and a BSC component, etc.), which can each have their own respective components. In certain scenarios in which network node 2660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2660 can be configured to support multiple radio access technologies (RATs). In such embodiments, some components can be duplicated (e.g., separate device readable medium 2680 for the different RATs) and some components can be reused (e.g., the same antenna 2662 can be shared by the RATs). Network node 2660 can also include multiple sets of the various illustrated components for different wireless technologies integrated into network node 2660, such as, for example, GSM, WCDMA, LTE, NR, WiFi, or Bluetooth wireless technologies. These wireless technologies can be integrated into the same or different chip or set of chips and other components within network node 2660.

Processing circuitry 2670 can be configured to perform any determining, calculating, or similar operations (e.g., certain obtaining operations) described herein as being provided by a network node. These operations performed by processing circuitry 2670 can include processing information obtained by processing circuitry 2670 by, for example, converting the obtained information into other information, comparing the obtained information or converted information to information stored in the network node, and/or performing one or more operations based on the obtained information or converted information, and as a result of said processing making a determination.

Processing circuitry 2670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2660 components, such as device readable medium 2680, network node 2660 functionality. For example, processing circuitry 2670 can execute instructions stored in device readable medium 2680 or in memory within processing circuitry 2670. Such functionality can include providing any of the various wireless features, functions, or benefits discussed herein. In some embodiments, processing circuitry 2670 can include a system on a chip (SOC).

In some embodiments, processing circuitry 2670 can include one or more of radio frequency (RF) transceiver circuitry 2672 and baseband processing circuitry 2674. In some embodiments, radio frequency (RF) transceiver circuitry 2672 and baseband processing circuitry 2674 can be on separate chips (or sets of chips), boards, or units, such as radio units and digital units. In alternative embodiments, part or all of RF transceiver circuitry 2672 and baseband processing circuitry 2674 can be on the same chip or set of chips, boards, or units In certain embodiments, some or all of the functionality described herein as being provided by a network node, base station, eNB or other such network device can be performed by processing circuitry 2670 executing instructions stored on device readable medium 2680 or memory within processing circuitry 2670. In alternative embodiments, some or all of the functionality can be provided by processing circuitry 2670 without executing instructions stored on a separate or discrete device readable medium, such as in a hard-wired manner. In any of those embodiments, whether executing instructions stored on a device readable storage medium or not, processing circuitry 2670 can be configured to perform the described functionality. The benefits provided by such functionality are not limited to processing circuitry 2670 alone or to other components of network node 2660, but are enjoyed by network node 2660 as a whole, and/or by end users and the wireless network generally.

Device readable medium 2680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2670. Device readable medium 2680 can store any suitable instructions, data or information, including a computer program, software, an application including one or more of logic, rules, code, tables, etc. and/or other instructions capable of being executed by processing circuitry 2670 and, utilized by network node 2660. Device readable medium 2680 can be used to store any calculations made by processing circuitry 2670 and/or any data received via interface 2690. In some embodiments, processing circuitry 2670 and device readable medium 2680 can be considered to be integrated.

Interface 2690 is used in the wired or wireless communication of signaling and/or data between network node 2660, network 2606, and/or WDs 2610. As illustrated, interface 2690 comprises port(s)/terminal(s) 2694 to send and receive data, for example to and from network 2606 over a wired connection. Interface 2690 also includes radio front end circuitry 2692 that can be coupled to, or in certain embodiments a part of, antenna 2662. Radio front end circuitry 2692 comprises filters 2698 and amplifiers 2696. Radio front end circuitry 2692 can be connected to antenna 2662 and processing circuitry 2670. Radio front end circuitry can be configured to condition signals communicated between antenna 2662 and processing circuitry 2670. Radio front end circuitry 2692 can receive digital data that is to be sent out to other network nodes or WDs via a wireless connection. Radio front end circuitry 2692 can convert the digital data into a radio signal having the appropriate channel and bandwidth parameters using a combination of filters 2698 and/or amplifiers 2696. The radio signal can then be transmitted via antenna 2662. Similarly, when receiving data, antenna 2662 can collect radio signals which are then converted into digital data by radio front end circuitry 2692. The digital data can be passed to processing circuitry 2670. In other embodiments, the interface can comprise different components and/or different combinations of components.

In certain alternative embodiments, network node 2660 may not include separate radio front end circuitry 2692, instead, processing circuitry 2670 can comprise radio front end circuitry and can be connected to antenna 2662 without separate radio front end circuitry 2692. Similarly, in some embodiments, all or some of RF transceiver circuitry 2672 can be considered a part of interface 2690. In still other embodiments, interface 2690 can include one or more ports or terminals 2694, radio front end circuitry 2692, and RF transceiver circuitry 2672, as part of a radio unit (not shown), and interface 2690 can communicate with baseband processing circuitry 2674, which is part of a digital unit (not shown).

Antenna 2662 can include one or more antennas, or antenna arrays, configured to send and/or receive wireless signals. Antenna 2662 can be coupled to radio front end circuitry 2690 and can be any type of antenna capable of transmitting and receiving data and/or signals wirelessly. In some embodiments, antenna 2662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2662 can be separate from network node 2660 and can be connectable to network node 2660 through an interface or port.

Antenna 2662, interface 2690, and/or processing circuitry 2670 can be configured to perform any receiving operations and/or certain obtaining operations described herein as being performed by a network node. Any information, data and/or signals can be received from a wireless device, another network node and/or any other network equipment. Similarly, antenna 2662, interface 2690, and/or processing circuitry 2670 can be configured to perform any transmitting operations described herein as being performed by a network node. Any information, data and/or signals can be transmitted to a wireless device, another network node and/or any other network equipment.

Power circuitry 2687 can comprise, or be coupled to, power management circuitry and can be configured to supply the components of network node 2660 with power for performing the functionality described herein. Power circuitry 2687 can receive power from power source 2686. Power source 2686 and/or power circuitry 2687 can be configured to provide power to the various components of network node 2660 in a form suitable for the respective components (e.g., at a voltage and current level needed for each respective component). Power source 2686 can either be included in, or external to, power circuitry 2687 and/or network node 2660. For example, network node 2660 can be connectable to an external power source (e.g., an electricity outlet) via an input circuitry or interface such as an electrical cable, whereby the external power source supplies power to power circuitry 2687. As a further example, power source 2686 can comprise a source of power in the form of a battery or battery pack which is connected to, or integrated in, power circuitry 2687. The battery can provide backup power should the external power source fail. Other types of power sources, such as photovoltaic devices, can also be used.

Alternative embodiments of network node 2660 can include additional components beyond those shown in FIG. 26 that can be responsible for providing certain aspects of the network node's functionality, including any of the functionality described herein and/or any functionality necessary to support the subject matter described herein. For example, network node 2660 can include user interface equipment to allow and/or facilitate input of information into network node 2660 and to allow and/or facilitate output of information from network node 2660. This can allow and/or facilitate a user to perform diagnostic, maintenance, repair, and other administrative functions for network node 2660.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2610 includes antenna 2611, interface 2614, processing circuitry 2620, device readable medium 2630, user interface equipment 2632, auxiliary equipment 2634, power source 2636 and power circuitry 2637. WD 2610 can include multiple sets of one or more of the illustrated components for different wireless technologies supported by WD 2610, such as, for example, GSM, WCDMA, LTE, NR, WiFi, WiMAX, or Bluetooth wireless technologies, just to mention a few. These wireless technologies can be integrated into the same or different chips or set of chips as other components within WD 2610.

Antenna 2611 can include one or more antennas or antenna arrays, configured to send and/or receive wireless signals, and is connected to interface 2614. In certain alternative embodiments, antenna 2611 can be separate from WD 2610 and be connectable to WD 2610 through an interface or port. Antenna 2611, interface 2614, and/or processing circuitry 2620 can be configured to perform any receiving or transmitting operations described herein as being performed by a WD. Any information, data and/or signals can be received from a network node and/or another WD. In some embodiments, radio front end circuitry and/or antenna 2611 can be considered an interface.

As illustrated, interface 2614 comprises radio front end circuitry 2612 and antenna 2611. Radio front end circuitry 2612 comprise one or more filters 2618 and amplifiers 2616. Radio front end circuitry 2614 is connected to antenna 2611 and processing circuitry 2620 and can be configured to condition signals communicated between antenna 2611 and processing circuitry 2620. Radio front end circuitry 2612 can be coupled to or a part of antenna 2611. In some embodiments, WD 2610 may not include separate radio front end circuitry 2612; rather, processing circuitry 2620 can comprise radio front end circuitry and can be connected to antenna 2611. Similarly, in some embodiments, some or all of RF transceiver circuitry 2622 can be considered a part of interface 2614. Radio front end circuitry 2612 can receive digital data that is to be sent out to other network nodes or WDs via a wireless connection. Radio front end circuitry 2612 can convert the digital data into a radio signal having the appropriate channel and bandwidth parameters using a combination of filters 2618 and/or amplifiers 2616. The radio signal can then be transmitted via antenna 2611. Similarly, when receiving data, antenna 2611 can collect radio signals which are then converted into digital data by radio front end circuitry 2612. The digital data can be passed to processing circuitry 2620. In other embodiments, the interface can comprise different components and/or different combinations of components.

Processing circuitry 2620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2610 components, such as device readable medium 2630, WD 2610 functionality. Such functionality can include providing any of the various wireless features or benefits discussed herein. For example, processing circuitry 2620 can execute instructions stored in device readable medium 2630 or in memory within processing circuitry 2620 to provide the functionality disclosed herein.

As illustrated, processing circuitry 2620 includes one or more of RF transceiver circuitry 2622, baseband processing circuitry 2624, and application processing circuitry 2626. In other embodiments, the processing circuitry can comprise different components and/or different combinations of components. In certain embodiments processing circuitry 2620 of WD 2610 can comprise a SOC. In some embodiments, RF transceiver circuitry 2622, baseband processing circuitry 2624, and application processing circuitry 2626 can be on separate chips or sets of chips. In alternative embodiments, part or all of baseband processing circuitry 2624 and application processing circuitry 2626 can be combined into one chip or set of chips, and RF transceiver circuitry 2622 can be on a separate chip or set of chips. In still alternative embodiments, part or all of RF transceiver circuitry 2622 and baseband processing circuitry 2624 can be on the same chip or set of chips, and application processing circuitry 2626 can be on a separate chip or set of chips. In yet other alternative embodiments, part or all of RF transceiver circuitry 2622, baseband processing circuitry 2624, and application processing circuitry 2626 can be combined in the same chip or set of chips. In some embodiments, RF transceiver circuitry 2622 can be a part of interface 2614. RF transceiver circuitry 2622 can condition RF signals for processing circuitry 2620.

In certain embodiments, some or all of the functionality described herein as being performed by a WD can be provided by processing circuitry 2620 executing instructions stored on device readable medium 2630, which in certain embodiments can be a computer-readable storage medium. In alternative embodiments, some or all of the functionality can be provided by processing circuitry 2620 without executing instructions stored on a separate or discrete device readable storage medium, such as in a hard-wired manner. In any of those particular embodiments, whether executing instructions stored on a device readable storage medium or not, processing circuitry 2620 can be configured to perform the described functionality. The benefits provided by such functionality are not limited to processing circuitry 2620 alone or to other components of WD 2610, but are enjoyed by WD 2610 as a whole, and/or by end users and the wireless network generally.

Processing circuitry 2620 can be configured to perform any determining, calculating, or similar operations (e.g., certain obtaining operations) described herein as being performed by a WD. These operations, as performed by processing circuitry 2620, can include processing information obtained by processing circuitry 2620 by, for example, converting the obtained information into other information, comparing the obtained information or converted information to information stored by WD 2610, and/or performing one or more operations based on the obtained information or converted information, and as a result of said processing making a determination.

Device readable medium 2630 can be operable to store a computer program, software, an application including one or more of logic, rules, code, tables, etc. and/or other instructions capable of being executed by processing circuitry 2620. Device readable medium 2630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2620. In some embodiments, processing circuitry 2620 and device readable medium 2630 can be considered to be integrated.

User interface equipment 2632 can include components that allow and/or facilitate a human user to interact with WD 2610. Such interaction can be of many forms, such as visual, audial, tactile, etc. User interface equipment 2632 can be operable to produce output to the user and to allow and/or facilitate the user to provide input to WD 2610. The type of interaction can vary depending on the type of user interface equipment 2632 installed in WD 2610. For example, if WD 2610 is a smart phone, the interaction can be via a touch screen; if WD 2610 is a smart meter, the interaction can be through a screen that provides usage (e.g., the number of gallons used) or a speaker that provides an audible alert (e.g., if smoke is detected). User interface equipment 2632 can include input interfaces, devices and circuits, and output interfaces, devices and circuits. User interface equipment 2632 can be configured to allow and/or facilitate input of information into WD 2610 and is connected to processing circuitry 2620 to allow and/or facilitate processing circuitry 2620 to process the input information. User interface equipment 2632 can include, for example, a microphone, a proximity or other sensor, keys/buttons, a touch display, one or more cameras, a USB port, or other input circuitry. User interface equipment 2632 is also configured to allow and/or facilitate output of information from WD 2610, and to allow and/or facilitate processing circuitry 2620 to output information from WD 2610. User interface equipment 2632 can include, for example, a speaker, a display, vibrating circuitry, a USB port, a headphone interface, or other output circuitry. Using one or more input and output interfaces, devices, and circuits, of user interface equipment 2632, WD 2610 can communicate with end users and/or the wireless network and allow and/or facilitate them to benefit from the functionality described herein.

Auxiliary equipment 2634 is operable to provide more specific functionality which may not be generally performed by WDs. This can comprise specialized sensors for doing measurements for various purposes, interfaces for additional types of communication such as wired communications etc. The inclusion and type of components of auxiliary equipment 2634 can vary depending on the embodiment and/or scenario.

Power source 2636 can, in some embodiments, be in the form of a battery or battery pack. Other types of power sources, such as an external power source (e.g., an electricity outlet), photovoltaic devices or power cells, can also be used. WD 2610 can further comprise power circuitry 2637 for delivering power from power source 2636 to the various parts of WD 2610 which need power from power source 2636 to carry out any functionality described or indicated herein. Power circuitry 2637 can in certain embodiments comprise power management circuitry. Power circuitry 2637 can additionally or alternatively be operable to receive power from an external power source; in which case WD 2610 can be connectable to the external power source (such as an electricity outlet) via input circuitry or an interface such as an electrical power cable. Power circuitry 2637 can also in certain embodiments be operable to deliver power from an external power source to power source 2636. This can be, for example, for the charging of power source 2636. Power circuitry 2637 can perform any converting or other modification to the power from power source 2636 to make it suitable for supply to the respective components of WD 2610.

Some of the exemplary embodiments described herein provide a flexible mechanism for a network node (e.g., gNB) in a wireless network (e.g., NG-RAN) to inform served UEs about presence/absence and/or configuration of non-SSB reference signals (RS) available to the UE in a non-connected state (i.e., RRC_IDLE or RRC_INACTIVE), particularly non-SSB RS that are conventionally available to the UE only in RRC_CONNECTED state. Based on receiving such indications, the UE can maintain synchronization and/or AGC while in a non-connected state, based on receiving and/or measuring connected-state RS such that the UE does not have to remain awake to receive non-connected-state RS (e.g., SSB). When used in NR UEs (e.g., UE 1710) and gNBs (e.g., gNBs comprising RAN 1730), exemplary embodiments described herein can provide various improvements, benefits, and/or advantages in terms of reduced UE energy consumption in non-connected states.

This reduction can increase the use of data services by allowing the UE to allocate a greater portion of its stored energy for data services (e.g., eMBB) while in connected state. Consequently, this increases the benefits and/or value of such data services to end users and OTT service providers.

Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., “data” and “information”). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Notably, modifications and other embodiments of the invention(s) disclosed will come to mind to one skilled in the art having the benefit of the teachings presented in the foregoing descriptions, the associated drawings, and the following enumerated example embodiments. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device configured to communicate wirelessly with one or more network nodes in a wireless communication network, the method comprising:

receiving, from a network node, a synchronization signal block, SSB, comprising one or more synchronization signals;

receiving a wake-up signal, WUS, the WUS indicating whether the wireless device should monitor a physical channel during at least one paging opportunity associated with the WUS transmission, receiving the WUS comprising receiving the WUS in conjunction with the SSB, the WUS comprising an index identifying a group of wireless devices that includes the wireless device;

receiving the WUS in conjunction with the SSB comprising receiving the WUS in one or more symbols immediately adjacent to symbols in which the SSB is transmitted;

estimating a downlink quality;

collecting samples of the SSB and the WUS;

performing synchronization based on the samples of the SSB; and using a correction obtained from performing synchronization to correct one or both of time and frequency offsets in the samples of the WUS, prior to detecting the WUS; and using less than all of a bandwidth occupied by the WUS for detecting the WUS based on the estimated downlink quality.

2. The method of claim 1, wherein receiving the WUS comprises selecting one of a plurality of search spaces in which to receive the WUS, the selected search space corresponding to a group of wireless devices that includes the wireless device.

3. The method of claim 1, wherein the WUS indicates that the wireless device or group of wireless devices should monitor the physical channel during the at least one paging opportunity associated with the WUS transmission, and wherein the method further comprises monitoring the at least one paging opportunity associated with WUS transmission.

4. The method of claim 1, wherein the WUS indicates that the wireless device need not monitor the physical channel during the at least one paging opportunity associated with the WUS transmission.

5. The method of claim 1, wherein the at least one paging opportunity consists of all predetermined paging opportunities between the SSB and a following SSB.

6. The method of claim 1, wherein the at least one paging opportunity comprises two or more paging opportunities, and wherein the WUS comprises two or more respective indications indicating whether each paging opportunity should be monitored.

7. The method of claim 1, wherein receiving the WUS, further comprises receiving at least one of the following signals:

a Physical Downlink Control Channel, PDCCH, message;
a predetermined sequence-based signal;
a predetermined reference signal;
a synchronization signal;
a channel-state information reference signal, CSI-RS; and
a tracking reference signal, TRS.

8. The method of claim 1, wherein the method further comprises:

estimating a rate or probability of receiving a WUS indication;
estimating a power saving from monitoring for WUS indications rather than PDCCCH and/or PDSCH monitoring; and
electing to continue monitoring for WUS indications based on the estimated power saving.

9. The method of claim 1, wherein the method further comprises electing to continue monitoring for WUS indications, based on the estimated downlink quality.

10. A wireless device comprising radio circuitry configured to communicate with one or more network nodes in a wireless communication network and further comprising processing circuitry operatively coupled to the radio circuitry, the radio circuitry and the processing circuitry collectively configured to:

receive, from a network node, a synchronization signal block, SSB, comprising one or more synchronization signals;
receive a wake-up signal, WUS, the WUS indicating whether the wireless device should monitor a physical channel during at least one paging opportunity associated with the WUS transmission, receiving the WUS comprising receiving the WUS in conjunction with the SSB, the WUS comprising an index identifying a group of wireless devices that includes the wireless device;
receiving the WUS in conjunction with the SSB comprising receiving the WUS in one or more symbols immediately adjacent to symbols in which the SSB is transmitted;
estimating a downlink quality;
collecting samples of the SSB and the WUS;
performing synchronization based on the samples of the SSB;
using a correction obtained from performing synchronization to correct one or both of time and/or and frequency offsets in the samples of the WUS, prior to detecting the WUS; and
using less than all of a bandwidth occupied by the WUS for detecting the WUS based on the estimated downlink quality.

* * * * *